United States Patent
Bertram et al.

(10) Patent No.: US 9,610,715 B2
(45) Date of Patent: Apr. 4, 2017

(54) DISPENSING SYSTEM WITH MATERIAL SPILL PREVENTION SYSTEM

(75) Inventors: George Bertram, Newton, CT (US); Douglas Walker, Hamden, CT (US)

(73) Assignee: PREGIS INTELLIPACK LLC, Deerfield, IL (US)

(*) Notice: Subject to any disclaimer, the term of this patent is extended or adjusted under 35 U.S.C. 154(b) by 245 days.

(21) Appl. No.: 11/920,270

(22) PCT Filed: May 8, 2006

(86) PCT No.: PCT/US2006/017399
§ 371 (c)(1),
(2), (4) Date: Nov. 13, 2007

(87) PCT Pub. No.: WO2006/124333
PCT Pub. Date: Nov. 23, 2006

(65) Prior Publication Data
US 2009/0056286 A1  Mar. 5, 2009

Related U.S. Application Data

(60) Provisional application No. 60/679,645, filed on May 11, 2005, provisional application No. 60/679,646, filed on May 11, 2005.

(51) Int. Cl.
*B65B 1/30* (2006.01)
*B29C 44/18* (2006.01)
*B29C 44/60* (2006.01)

(52) U.S. Cl.
CPC ............ *B29C 44/182* (2013.01); *B29C 44/60* (2013.01)

(58) Field of Classification Search
CPC .. B65B 1/30; B65B 9/20; B65B 9/042; B65B 9/067; B65B 9/073; B29C 44/60; B29C 44/182

(Continued)

(56) References Cited

U.S. PATENT DOCUMENTS 4,674,268 A  6/1987  Gavronsky et al.
4,800,708 A  1/1989  Sperry
(Continued)

FOREIGN PATENT DOCUMENTS

WO  WO 2004/101245      11/2004
WO  WO 2004/101252 A2   11/2004
WO  WO 2005/090037       9/2005

OTHER PUBLICATIONS

Extended European Search Report dated Jul. 12, 2011 for Application No. EP 06 75 2312.

*Primary Examiner* — Robert Long
*Assistant Examiner* — Xavier A Madison
(74) *Attorney, Agent, or Firm* — Dorsey & Whitney LLP

(57) ABSTRACT

A material spill prevention system with feed location sensing system to reduce the possibility of material spillage relative to the film being utilized for bag formation. The material spill prevention system monitors whether there is a proper film feed situation and, if not, precludes the release of material from the dispenser as in by precluding a flow controller opening and the release of material to the bag intended to receive the release chemical (e.g., a foam packaging bag). The prevention system is applicable to a variety of film feed arrangements as in a C-fold film drawn by a nip roller arrangement from a roll source with the dispenser mechanism positioned intermediate the nip and film source relative to film travel. An embodiment of the spill prevention system also features an absolute position transducer for monitoring position of a flow controller which controls output of material from the dispenser.

28 Claims, 43 Drawing Sheets

(58) Field of Classification Search
USPC ............. 53/52, 505, 550, 547, 548, 67, 496;
493/10, 13, 14, 17–20, 22, 24, 25, 33
See application file for complete search history.

(56) References Cited

U.S. PATENT DOCUMENTS

| | | | |
|---|---|---|---|
| 4,807,420 A | | 2/1989 | Barker |
| 4,854,109 A | | 8/1989 | Pinarer et al. |
| 4,860,522 A | * | 8/1989 | Cherney ........................ 53/451 |
| 4,922,683 A | * | 5/1990 | Connolly ....................... 53/296 |
| 5,314,566 A | | 5/1994 | Gallagher et al. |
| 5,749,821 A | | 5/1998 | Simmons |
| 5,794,406 A | | 8/1998 | Reichental et al. |
| 5,941,053 A | | 8/1999 | Kotsiopoulos |
| 6,085,490 A | * | 7/2000 | Buchko ......................... 53/411 |
| 6,131,375 A | * | 10/2000 | Sperry .................. B29C 44/182 53/122 |
| 6,234,777 B1 | | 5/2001 | Sperry et al. |
| 6,472,638 B1 | * | 10/2002 | Sperry et al. ................. 219/243 |
| 6,474,048 B1 | * | 11/2002 | Metzger et al. ............... 53/493 |
| 6,502,773 B1 | * | 1/2003 | Hostettler et al. .............. 241/34 |
| 6,597,290 B2 | | 7/2003 | Mogi |
| 6,601,364 B2 | | 8/2003 | Sussmeier |
| 6,625,956 B1 | * | 9/2003 | Soudan ......................... 53/455 |
| 6,646,434 B2 | | 11/2003 | Miyata et al. |
| 6,811,059 B2 | * | 11/2004 | Piucci et al. .................. 222/148 |
| 7,013,615 B2 | * | 3/2006 | Piucci et al. .................... 53/167 |
| 7,213,383 B2 | | 5/2007 | Walker et al. |
| 2002/0088201 A1 | | 7/2002 | Siccardi |
| 2002/0092272 A1 | | 7/2002 | Sperry et al. |
| 2003/0041571 A1 | | 3/2003 | Haller et al. |
| 2005/0044818 A1 | | 3/2005 | Hayduk |

\* cited by examiner

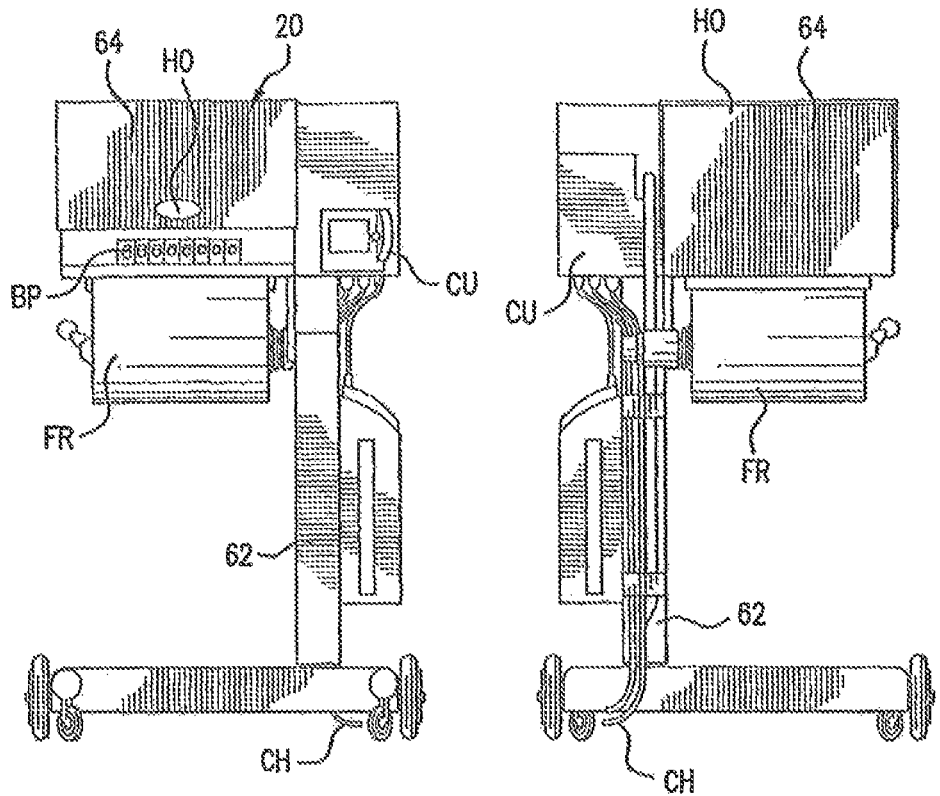
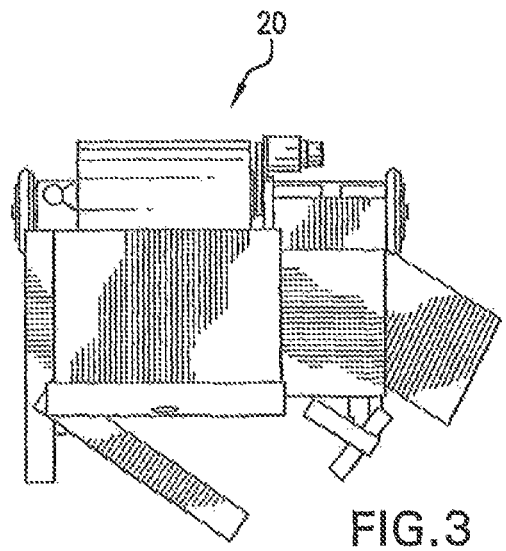

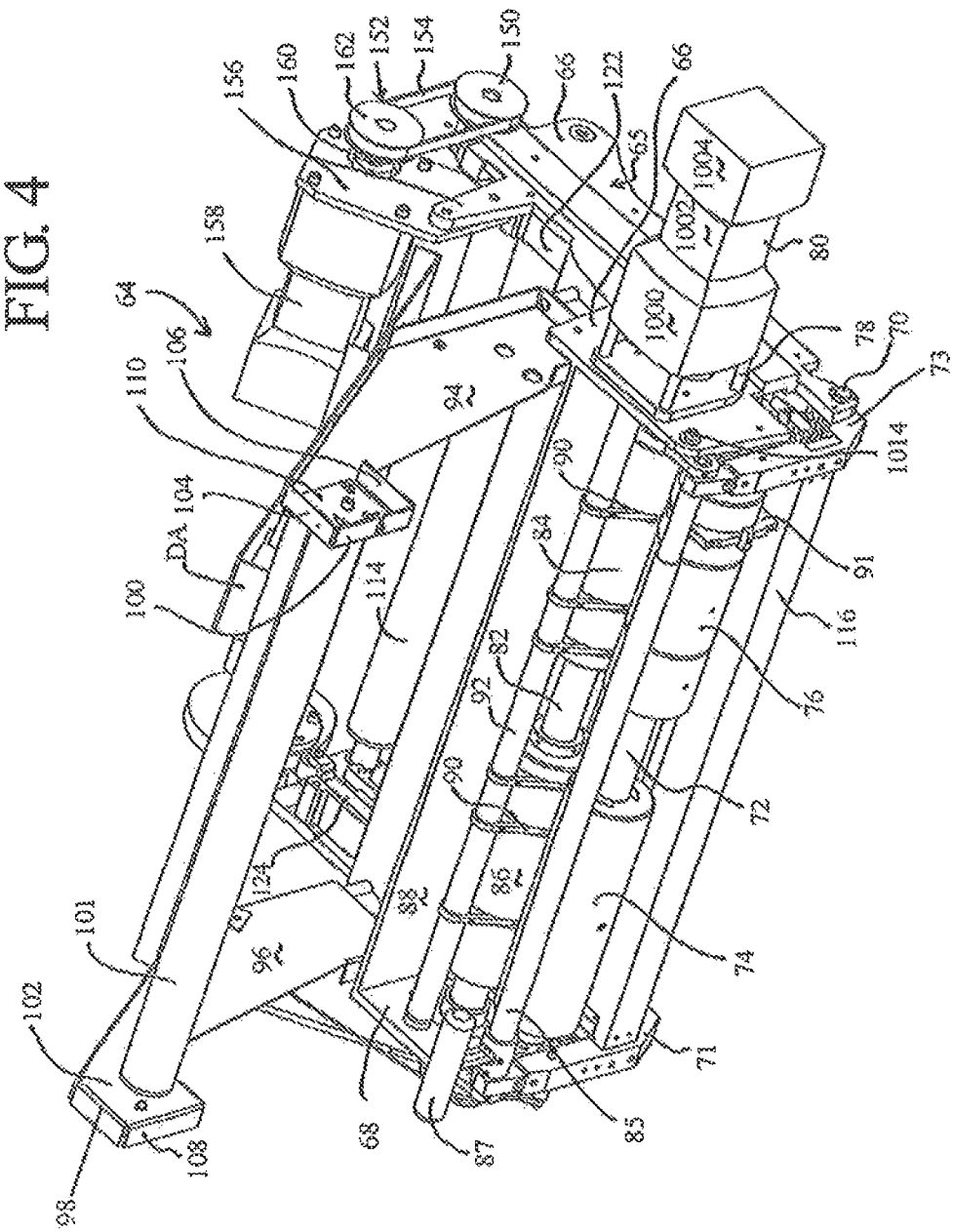

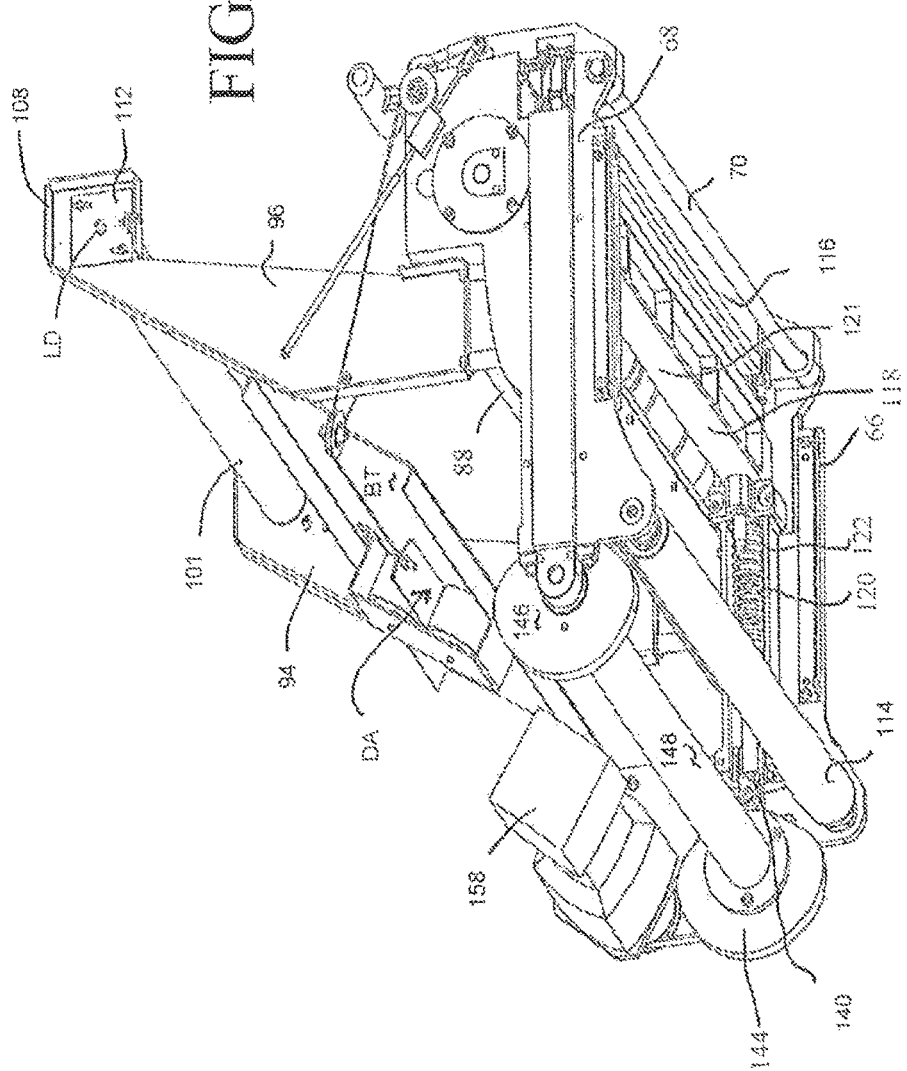

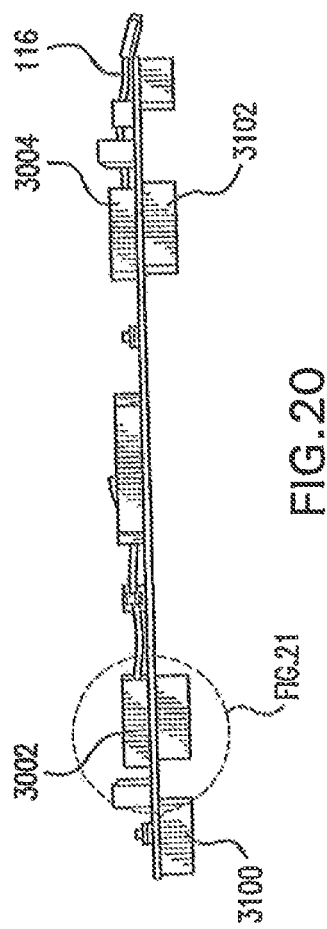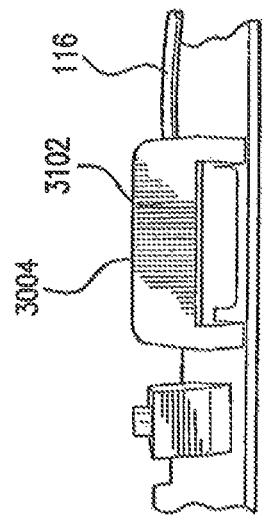

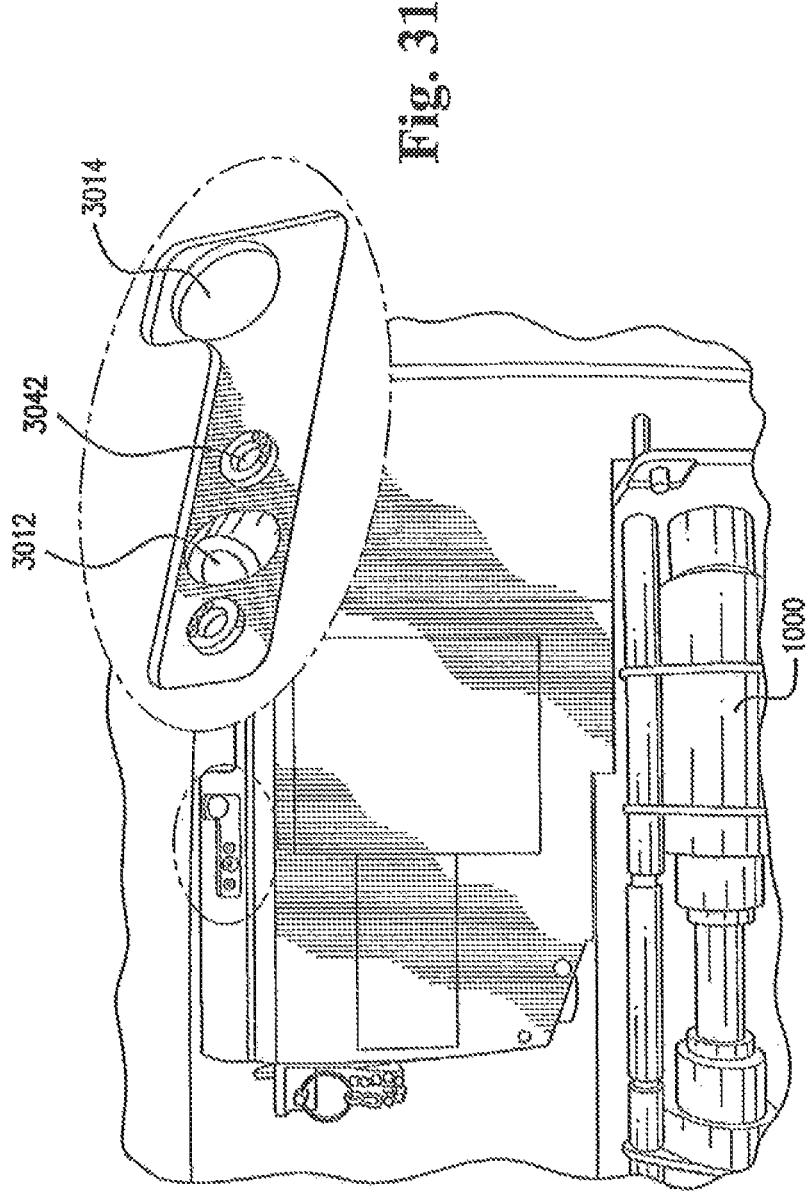

DISPENSING SYSTEM WITH MATERIAL SPILL PREVENTION SYSTEM

This application claims the benefit of U.S. Provisional Application No. 60/679,645, filed May 11, 2005 and U.S. Provisional Application No. 60/679,646, filed May 11, 2005—each of which is incorporated herein by reference.

FIELD OF THE INVENTION

The present invention is directed at a material spill prevention system, a method of using a material spill prevention system and, in one embodiment, a material spill avoiding dispensing system such as one with a material-in-bag dispensing system combined with a material spill prevention system or one with a handheld dispenser system. A preferred embodiment of the invention includes a foam up prevention system for a foam-in-bag dispensing system as in a sensing system which detects when a film material used in bag formation is not in the proper position so as to avoid extensive foam spillage and/or a foam up prevention system that includes a position monitoring system of a device associated with the dispenser's flow or no-flow status.

BACKGROUND OF THE INVENTION

Many dispensing systems are known in the art and are used in different industries. These include foam dispensing systems that are used to dispense two component polyurethane foams in various applications. Such foams are made from two reactive foam components that are mixed together to form an expansive foam. This foam has many different uses. It may be used to provide thermal insulation to apparatus, such as whirlpool or spa tubs, or it may be used to provide sound and/or thermal insulation to electronic and mechanical devices, or it can be used to provide packing cushions for the shipping of products. Taking the packing cushion industry dispenser systems, as an example, many foam injection systems utilize a hand-held dispensing gun, or unit, that is connected to remote supplies of the two foam components by a pair of hoses. This hand-held dispensing unit may be fed from a local storage supply of the two foam components by way of a pair of pumps, each of which propel foam components through their respective hoses to the dispenser. Alternatively, the dispenser may be connected to bulk supply sources of these components by lengthy pipes or tubes. Mounted dispensers including automated dispensing systems are also featured where a mounted dispenser feeds into, for example, a conveyed package for a product. A manufacturing facility may utilize multiple foam dispensing stations, each with their own dispenser. Amongst this wide variety of material dispensers there is included dispensers directed at enclosing dispensed material in, for example, a flexible bag. An example is a foam-in-bag dispensing system that forms a bag having foamable material such as polyurethane foam which typically involves mixing certain chemicals together to form a polymeric product while at the same time generating gases such as carbon dioxide and water vapor. If those chemicals are selected so that they harden following the generation of the carbon dioxide and water vapor, they can be used to form "hardened" (e.g., a cushionable quality in a proper fully expanded state) polymer foams. The cushioning quality bag can conform to a product in a package when placed in the package adjacent the product and allowed to expand (or vice versa with the product placed on a yet to fully expand bag) and avoid direct product contact with the product, which can be undesirable, particularly with dispensed material that has an adhesive quality as in polyurethane foam.

Synthetic foams (e.g., polyurethane foam) are typically formed from two mixed components as in liquid organic resins and polyisocyanates placed in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a foam-in-place bag (see e.g., U.S. Pat. Nos. 4,674,268, 4,800,708 and 4,854,109), where it reacts to form a polyurethane foam.

The above noted U.S. Pat. No. 4,800,708, which is incorporated herein by reference for background purposes, describes a method and apparatus for successively forming foam filled bags or cushions of the type wherein a foamable composition is deposited in a plastic bag. The formed bags are adapted to be placed in containers with articles being packaged, so that, when the foam expands, the bags and resulting foam conform to the configuration of the articles. The method and apparatus shown in the '708 patent includes advancing a pair of plastic webs through the nip of a pair of drive rollers, while heat sealing the opposing longitudinal side edges of the webs together. Periodically, a predetermined amount of the foamable composition is deposited between the advancing webs immediately above the nip, and the heat sealing along the side edges is periodically and momentarily interrupted to form side edge openings for the subsequent escapement of gases generated during foaming. The advance of the webs is momentarily terminated, and a heated wire then engages the webs to sever the formed bag, while forming a sealed top edge of the formed bag and a sealed bottom edge for the next succeeding bag. The advance then again commences, and the cycle is repeated to successively form the foam filled bags.

Another example of a foam-in-bag dispensing system with a film feed for bag formation and chemical dispensing system is seen in PCT/US2004/014423 filed on 7 May 2004 in the name of IntelliPack of Tulsa Okla., US, and published in English as WO 2004/101252 A2, which PCT application is incorporated herein by reference. In an embodiment of the noted PCT reference, a roll of folded continuous film (known in the art as a "C-fold film material) is drawn by downstream drive rollers so as to pass by an intermediate foam mixing/dispensing module which dispenses foam down into a partially formed bag having a bottom sealed edge formed by sealing jaws positioned below the drive rollers. In the bag making cycle disclosed, the machine (i) seals the lower edge and the open side edge of folded film from the continuous roll; (ii) fills the required length of film with a measured dose of two premixed chemicals that react to produce a urethane foam; (iii) seals the top edge of the bag producing a filled, sealed bag; (iv) and, in a preferred embodiment, cuts the finished, foam-filled bag from the roll to provide for release of a bag as well as sealing of the next bag in advance of the next cycle; and (v) drops the finished bag from the bottom of the bag-making module.

When installed properly, the foam dispenser module is inserted into the open edge of the C-fold web and film webs fold around the dispenser mechanism so that one web of the film passes along the front face of the dispenser module and one along the back; converging further below at the heated sealing jaws. Unfortunately, it is quite common for the film being fed to the nip roller or other driver to halt or jam along its path of travel during the film feed process. In so doing a foam-up condition generally occurs as the dispenser continues dispensing despite the film feed and bag formation hold up, necessitating immediate maintenance or servicing of the foam-in-bag assembly for the removal of the hardened foam which build up in numerous operational areas of the assembly (e.g., a build up that disrupts mechanical movement or electrical connections, etc.). The precision and reliability of the bag making machine and the avoidance of foam dispensing external to a bag or partially formed bag being formed is of greater concern when dealing with a multi-bag production cycle (e.g., a control unit conveying data to a foam-in-bag assembly to make a plurality of cut bags in series). For example, should bag "A" jam, bags "B", "C", "D" (or more) may still be scheduled for arrival and receipt of a dosed amount of a dispenser output. Accordingly, even though no bag is sufficiently formed to receive the output of the dispenser, the dispenser continues to output foam for each scheduled bag despite their non-presence, thus aggravating the level of foam spill. Foam, once emitted from the mixing module will quickly spread and solidify within the machine's internal cavities. Foam also tends to drop onto the floor under and around the machine. Such "foam-ups" are problematic and costly to a user. Foam-up occurrences within the dispenser typically results in problems such as those listed below:

a) Significant production downtime for the customer;

b) Time-consuming service calls involving field representatives;

c) Replacement or refurbishment of foam coated internal mechanisms;

d) Hidden, subtle or latent damage to sensitive mechanical components, wiring, or electrical connectors;

e) Permanent cosmetic damage to the painted or plated surfaces and finely machined components of the dispensing system;

f) Foam damage to the operators facility, usually to the floor, or to the products that the operator is attempting to package;

g) Foam damage to the operators clothing and/or shoes;

h) Loss of operator confidence in the foam-in-bag dispensing system.

Unfortunately, it is also quite common, for an operator to run both webs of film together along, for example, the front face of the dispenser module wherein both webs of the C-fold film (or other film type as in double individual layer on single roll film types) are positioned to a common side of the dispenser module. In so doing, the operator also may easily fail to see that both webs are not around the dispenser module properly. This failure is particularly common when both webs are fed to the front of the dispenser, because the view of the rear web is almost completely obstructed by the front web (often a non-transparent film is utilized as in a gray film roll but, even with clear film or translucent film, a misfed film may not be detected). Thus, the operator can misfeed the film without any obvious visual cue that a mistake has been made. Without film webs surrounding both front and back sides of the module, the foam injector nozzle is left open to the machine's internal mechanisms. Foam, once emitted from the mixing module will quickly spread and solidify within the machine's internal cavities. Foam also tends to drop onto the floor under and around the machine. Such "foam-ups" are problematic and costly to a user. With two separate source film feeding as in the above described U.S. Pat. No. 4,800,708, there is typically provided a first film web from a front positioner web source and a second film web from a second film source. Thus, while there is typically a lesser chance for a misfeed, there remains the potential for an undetected film misfeed and a resultant degrading foam-up.

Foam-up occurrences due to this situation of improper film feed lead to similar problems as those listed above for the foam jam situation.

Another foam up problem source is caused by the dispensing system failing to properly position (e.g., losing position control) the device used to allow or preclude dispenser output. For example, undesirable spills have occurred to a dispensing system due to the dispensing system losing control of a chemical flow shut off valving rod position, as in the position of a reciprocating valving rod provided in a mixing module of a chemical flow dispenser. For example, with reference to the crank assembly drive system for the valving rod described in PCT Publication No. WO 2004/101252 A2.

1. System's such as that disclosed in WO 2004/101252 A2 and others such as those that reciprocate a valving rod can be powered up at a time when the valving rod is in the "Open" (or chemical flow out of dispenser outlet) mode position. This allows the dispenser (e.g., the mixing module which retains the valving rod) to dispense the dispenser material (e.g., foam) immediately on system startup with a resultant spillage. Since prior art systems are ill suited for monitoring the system control processor there is not known where the valving rod is in its cycle. While the monitoring system utilized in PCT Publication WO 2004/101252 A2 is an improvement over prior art systems, it is still susceptible to such a problem. That is, unless the reciprocating valve is in it's at home position where the proximity sensor can "see" the piston, the machine cannot respond intelligently at startup, and the system does not generate a signal that foam is coming out of the mixing module at an inopportune time.

2. Also, again relative to the PCT Publication WO 2004/101252, occasionally a proximity sensor fails, and the system cannot find "home" position. When this happens the mixing module can sometimes assume an open position so as to shoot foam when it's not desired.

3. Relative to the PCT Publication WO 2004/101252, occasionally the encoder signal from the motor loses pulses or stops sending pulses altogether which can again create a potential spill situation.

All of these failure modes as well as potential others of similar nature are difficult to manage because prior art systems are lacking in the ability to know with a great deal of assurance, position of the valving rod unless, for example in the PCT Publication No. WO 2004/101252 example, the rod is at "home" and the proximity sensor is, working properly. Even in that embodiment, the control processor can only infer the position of the valving rod, at all non-home positions, by reliance on counting pulses from the motor encoder.

SUMMARY OF THE INVENTION

The present invention is directed at a material spill prevention system that is useful for use in dispensing systems. While the present invention is useable in a wide variety of dispensing devices it is particularly well suited for use in systems where spillage is highly problematic as often the case in a material-in-bag dispensing system. Some embodiments of the invention are also well suited for use with a dispenser (free of a material or foam-in-bag system) as in a hand held foam dispenser.

As an example, relative to a foam-in-bag dispensing system, in one preferred embodiment the material spill prevention system comprises a film feed location sensing system which senses whether a bag generation cycle is properly operating as in proper bag feed through the system (e.g., whether a jam up has occurred upstream precluding the proper sealing of a bag despite full foam dose input). Under the present invention, the term "bag" is used broadly to include, for instance, a partially or completely formed bag in this application. The film feed location sensory system is then able to determine if a bag is not properly being formed relative to a dispenser's material feed output or when a bag does not properly separate from a previous formed bag as to form the potential for a bad bottom seal or an unwanted chain bag with potential jam up introduction (it being noted, however, that in some instances it is desirable to form a chain of bags in which case such a bag separation sensing component would not need to be provided or could be switched over to operate in a chain bag feed mode as in a switch on and off depending on usage). The invention also includes inventive subject matter involving a method of using and manufacturing (including retrofitting) material-in-bag dispensing systems to include such a material spill prevention system.

If an improper film feed situation is sensed, there is actuated a material dispense prevention system (preferably a system that precludes a start up of a foam dispense initiation cycle and/or one that rapidly shuts down the feed or dosage cycle upon an improper bag formation feature being sensed following initiation of the foam output. The material dispense prevention system provides a spill prevention means to reduce the possibility or level of material spillage as in foam spillage. Thus, in a preferred embodiment, the sensing system is designed to detect for proper bag making functioning before the material dispenser is allowed to dispense material (e.g., upon initial start up during which the next in line bag formation is started but not completed or, depending on the type of bag formation cycle, between the completion of a first bag and formation initiation of the next in line bag) or a short time following commencement to avoid excessive spillage. Preferably there is provided a sensor system for monitoring for spillage potential criteria (e.g., points in the bag making cycle (noting that "bag" is used in the broad sense as in, for example, a receptacle material that is fed or manipulated to a desired location relative to a material dispense location in a state for receiving that material which can include, for example, bags such as those formed from webs derived from multiple sources, or from a tubular film that has an opening formed for material receipt, a single source (e.g., roll) multi-ply or folded film material, etc)). For example, in a preferred embodiment there is determined whether a partially formed bag is properly proceeding through the system as in one where one or more side seals are formed contemporaneously with film feed and preferably material, dispensing as well. A preferred embodiment of the invention also determines whether a previously formed bag has properly separated from a bag in the process of being formed in the next bag formation cycle. The subject matter of the present invention includes one or both of the above noted film presence detection techniques (as well as others as will become apparent from the illustrative examples of just some of the potential uses of the subject matter of the present invention provided below).

Also, "presence" detection includes, for example, a detection for the presence of the film material or a detection for the lack of presence of the film feed or a combination of the same (e.g., a backup alternate type sensing arrangement) with the appropriate logic control that takes in the sensor input(s) and determines whether film feed is proper for dispensing activity to proceed (e.g., commence or continue).

The sensing system preferably works with a dispense material prevention means for precluding, for example, material (e.g., foam producing chemical) flow and/or electric supply to equipment used in the supply of material to the dispenser outlet when a spillage potential criteria is sensed such as where the film is sensed as being incorrectly situated. The sensing system preferably involves utilization of a control system in communication with one or more sub-systems of the material supply system and/or electrical supply system or any other sub-system capable of functioning to preclude material flow when an improper film situation is sensed ("flow preclusion means"). In a preferred embodiment the flow preclusion means involves a controlled sub-system that has a valving unit that is positioned to allow/preclude material flow out of the dispenser. For example, a valve unit (e.g., reciprocating valve as in a reciprocating valving rod) positioned at the dispenser outlet region as in a mixing module of a foam dispenser. The valve is normally in a flow preclusion mode and when a proper film status is detected the control system allows for a shift in the valve via a driving system, for example, to a flow mode preferably in conjunction with an overall dispense timing mode and/or start trigger. Alternate or supplemental dispenser material flow preclusion or cut-off means are also featured under the subject matter of the present invention as in an overall or specific electrical system shut down, pump or other chemical flow driving means shut down (a pump shut-down is less preferred in view of the typical internal pressure of chemical already in some dispenser), a second button press requirement to enable system operation, etc. and/or a warning system (used alone without shut-off means or in combination) as in an audible and/or illumination operator signaler.

An embodiment of the inventive subject matter features a film feed location sensing system which senses whether a bag generation cycle is properly operating as in proper bag feed through the system and/or proper bag separation at the transverse cut location. In one embodiment there is provided a sensor system for monitoring one or more (preferably multiple) points in the bag making cycle as in the foam-in-bag making cycle described in the aforementioned PCT application PCT/US2004/014423. A preferred embodiment of the invention features one or more (e.g. two positioned to each respective side of the film material) photosensors for detection of film below a cut location for bags in sequence. In this way not only will a rapid determination be possible if a cut step fails to properly separate a formed bag from a still being formed bag as in, for example, where there is lacking a full bag width transverse clearance developed as the lower bag falls away from the lower edge of the still being formed bag, but also the same sensors can operate to detect whether the still being formed bag properly advances after the cut during its formation cycle (whereupon it becomes the formed bag to be cut off from a new to be formed bag above).

As an example of a mounting location for the above described photo sensing means there is featured two photosensors mounted (e.g., fixedly mounted at two respective locations) on one of the jaws (e.g., the lower planar surface of a jaw) of the aforementioned foam-in-bag system of U.S. PCT Application No. PCT/US2004/014423 (preferably the stationary one of the two jaws is utilized for added stability and accuracy enhancement). The jaws of the above mentioned application function to achieve a compression of the film between the two jaws, with one preferably moving into the other with the latter supporting one or more heated wires or other means for forming a transverse cut in the noted bag formation sequence. Alternate means are also possible to form a transverse seal as in wave generators or heated air jets, adhesive (applied directly or indirectly via strips) etc. In the noted application, the stationary jaw is deemed the "heated jaw" for ease of reference and it supports an intermediate in height higher heat level transverse cut wire and optional above and below positioned lesser heat transverse seal only wires with the lower temperature seal wires providing added security against a foam precursor chemical leak through a faulty transverse cut/seal formation by the cutting wire. The stationary heated jaw interacts with a moving jaw to produce the cross seals on the top and bottom of each bag and to cut each finished bag from, for example, a continuous supply of folded film that feeds through the foam-in-bag dispensing system or "FIB" system. By putting left and right photosensors on the undersurface of the fixed jaw, for instance, they are well positioned to detect partial separations as when one side of the transverse cut is effective while the other one is not resulting in an incomplete separation (e.g., a "point 2" detection function of whether separation has properly occurred) and the dual side sensors can also detect when the film is not being properly fed in a bag making cycle (e.g. a point 1 detection function as to whether the bag making film feed system is properly functioning while preferably using the same set of sensors involved in point 2 monitoring) even when there is a partial jam, as in one side caught up and the other one continuing for a period the sensor system can detect an improper bag formation cycle and activate the material dispense prevention system. Alternate embodiments are also featured under the present invention as in having more than two (e.g. three-left/center/right or more sensors arranged across an FIB system support means or an adjacent mounting surface with the sensors preferably extending in series between the left and right edging of the film material when the film material is properly being fed through the system). Alternatively, a single strategically positioned sensor can be relied upon as well as a single for instance, a photoeye sensor centered between the film edging and mounted on the film jaw.

As an example of the point 1 film presence detection technique involving monitoring a bag film leading edge there is featured a photosensor system that detects whether a leading edge of film is feeding through the foam-in-bag assembly at an early stage of the bag making process (e.g., less than ½ complete or less than a ⅓ complete (e.g., ¼ mark) with the percentage of bag formation preferably being in reference by the percentage of side seal formation of one or more side edge seals. That is, a monitoring of the percentage of side seal formation is typically illustrative of the percentage of overall bag making process completion for many embodiments.

A leading edge shut down sequence under an embodiment of the invention includes a machine operator depressing a bag making button to initiate the making of a bag (e.g., based on a desired parameters input submission by the operator via an interface unit associated with the control system of the FIB system). Once the bag making cycle is initiated by the operator, the film begins moving in the beginning portion of the bag making cycle. In a preferred embodiment there is avoided a slow speed build up; but, rather, once the film moving is initiated, it reaches its top speed almost instantaneously (thus facilitating a time "t" determination knowing the distance "d" between the horizontal plane of the cut off line of the heat seal and the below positioned view line of the photosensor means (e.g., points along a vertical plane represented by the tangent of the nip roller contact or some alternate film driving means contact or suitable film feed point of reference). In other words $d=vt$ with the distance known and the velocity "v" being known or monitored with the driving system or about known. Thus the monitoring system can set a time range within which the film's leading edge should break the sensed sight line of the photosensors. This determination can also be revised (e.g., at the associated logic board in the systems control unit) to take into condition, for example, variables such as a slower start up film driver system through, for example, adding in an acceleration factor into the distance within certain time parameter monitoring, or the acceptable time period can be increased to provide a added degree of insurance against a premature signaling of a bad film feed and an associated system lock down (determination revisions may be more of a need in a retrofitting situation of an older machine).

In a preferred embodiment of the present invention includes a film drive motor is equipped with an optical encoder so that the FIB control system can monitor how far the film has traveled with high accuracy (e.g., plus or minus 0.1 of an inch). Thus, a determination as to whether the film is correctly paying out and not jammed can be based on the known pay out using the encoder of the film driver motor (or other like driver operation sensing means) with sensor system confirmation that the film has traveled to the sensor sight line or some other suitable sensed sight. The utilization of the film feed length monitoring means (e.g., motor encoder) can be used as a backup or as a replacement to the above noted time range formulation based on known distance between cut line and sight line and typical film feed speed. For example, in a retrofit situation it may be desirable to utilize a preexisting driver system that may be devoid of a film feed length or payout driver monitoring means. When a driver payout monitoring means is available as described above for the system of IntelliPack Inc. with motor encoder, the use of a film feed monitoring means is preferred on the basis of, for example, there can be avoided induced time deviations as in changes in the resultant cut line level from bag to bag, the earlier noted potentially varying acceleration factors and other non-monitored film feed driver variations. Also, use of the noted driver film feed monitoring means makes it easy to adjust the distance parameter for the logic decision as to whether the film is properly feeding to allow for a determination as to whether the FIB system is suited for material dispensing or whether there may be a feed problem suggesting against material dispensing at that time. For example, if the distance between the typical cut line and the sight line is 1.25 inches an increased distance value can be set as in 1.75 inches of film feed monitoring means sensed film feed out before a decision is made to prevent material dispensing when film presence is not detected by the sensing system. In other words, there should be sensed somewhere between the anticipated last cut edge for sight line spacing (e.g., 1.25 inches), and the preset maximum payout length (e.g., 1.75 inches), a passage of film material past the sensor sight line. If not, a material feed prevention sequence is implemented via an output by the sensor system. This also provides for sensing of the leading edge at passing through at the distance between the two noted lines and the monitoring continuing for an added length following the initial sight line passage (as in the above noted 0.5 inch differential) which provides additional security that a film feed is properly proceeding and not subject to a jam after an initial start up and even after a seemingly proper start up only to have a jam up occur subsequent to that initial proper film feet payout. This distance/additional time monitoring can be adjusted (e.g. inch increase or ¼ inch decrease, etc) with an increase providing added surety that a film feed block situation has not occurred that will cause a spill of material. A distance as in 25% to 100% beyond the "line" distance "d" between the site line and the cut line is preferred, with a continued payout distance of 0.5 inches to 5 inches beyond initial sight line leading film edge passing being illustrative or 3 to 20% of the overall width of the film being fed also being illustrative.

If an improper film feed situation is detected, a preferred shutdown sequence (preferably involving a control unit with logic control and processor system) is activated that involves, for example:
 a) a closing off of the dispenser outlet as in a signal to the valving rod positioner to position the rod to close the outlets feeding into the mixing chamber opening into the dispenser outlet;
 b) turning off the material feed source as in the pump(s) feeding material to the dispenser (provides the added benefit of keeping system pressure at a desired steady state level in the lines once the value is closed off downstream);
 c) a disabling of the bag making buttons on the FIB interface preferably in conjunction with an indicator of the film feed and/or bag separation problem as in a visual signal on the control board or with light activation and/or an audible signal indicative of a problem in general or on a problem specific basis—jam up sensed or incomplete cut sensed, etc.
 d) a disabling of the transverse cut forming means as in disabling the moving jaw from moving (provides an added safety feature as there is avoided moving objects in the area where visual and hands on servicing may be required).
 e) a shut down in the film feed mechanism on the basis that until the problem is solved additional feed of the film is undesirable; and
 f) any combination of the above which preferably involves at least one material spill prevention subsystem.

In the above described embodiments, there is the possibility that even with the rapid detection and shut down outlined above some material spillage may occur as in a situation where some earlier introduced foam precursor expands out of a not completely finished side seal just after a film jam precludes the completion of the side seal. However, even in such situations, any foam up spillage will be small and any foam up level will be small and generally contained within the bottom of the bag so as to be much easier to remove and clean and much less likely to cause any damage to the FIB system.

An embodiment of the present invention has a sensing system that also features bag separation sensing means (preferably one in the same as the leading edge sensing means for leading edge detection as described above) for detection of finished bag removal. The bag separation sensing means also provides sensed data output to the dispense material preventive means via, for example, an outputted signal to an input of an associated portion of the material dispense prevention system or means for preventing material dispensing. In a preferred embodiment, the bag separation sensing means composes a photoeye sensor assembly senses whether a completed bag has cleared a bag output area (typically located at the bottom of the bag making assembly in the FIB assembly) at the completion (just at completion or at a fixed period thereafter taking into consideration any extended period works against the preferred bag cycle formation period for the to-be-formed bags). The sensor means preferably comprises left and right photosensors which detect whether or not a formed bag has cleared the area as it should do during normal operation For instance, the photosensors described above are preferably is in communication with a FIB assembly's control system which is in communication with the means for preventing material dispensing which is preferably of the same type as that described above for the point 1 or leading edge in detection system. The material dispense prevention system precludes additional material dispensing through, for example, the aforementioned dispenser valve manipulation, while also preferably triggering the control system to activate a shut down or prevention in the operation of other FIB subsystems as in preventing further film feed, as well as means for discontinuing or lowering the heat level in the heated seal and for locking down the jaw movement drive when the sensed conditions are not appropriate for material dispensing. Thus, in this embodiment the left and right photo sensors can detect whether there is a "stuck" bag (e.g., one that has an uncompleted transverse cut, or has bonded to a component such as a heat wire due to a cooling of melted film material thereto, and/or become physically stuck on some structural component of the FIB system that is a prelude to a jamming situation. Under a sensed "problem" situation, the material dispense prevention system functions to prevent the release of dispense material and at the same time prevents the continuation of the bag making process. That is, preferably both the material dispenser and film feed/bag forming cycle are not allowed until the sensing system (e.g., both photosensors to the left and right) senses a no bag presence or lower edge/upper edge bag clearance state indicative of the bag having properly separated and cleared the area. The discontinuance means thus prevents the FIB assembly from making more bags if the last bag is stuck or hung up on the jaws for any reason and therefore greatly reduces the potential for a large foam up to occur. Also, if the operator had instructed the bag making input device (e.g., a bag "make" button or setting device for multiple bag formation in one run) to make a plurality of bags in the current run, the inputted multiple bag formation command(s) is/are deleted from the FIB system memory via system detection means (e.g., part of the central logic of the control unit) whenever an improper feed or stuck bag is detected (requiring an operator to reset the system following a correction of any problem, which correction, if made, will be sensed by the sensor means during start up of the next bag making cycle).

The discontinuation means also preferably includes a restart means which works in association with the above noted detection means when active, and requires an operator having to activate a signal device as in a cancel button relative to the previously input bag(s) making input command in order to restart a bag making process. In one embodiment, the restart means includes a requirement for an operator to depress the cancel button on the user interface panel in order to proceed with normal machine operation. This allows the bag making sub-systems to be set or re-set at the appropriate coordinated timing and interfacing requirements controlled by the bag making control unit as in readjusting of the time for the side edge heat seals with the film feed, etc. A preferred embodiment of the invention also preferably includes an operator alert mechanism as in an audible or visual message or both which must be manually cleared before the FIB system will restart the process.

By adding these sensing and prevention systems there is made possible a drastic limiting of the potential for foam up conditions due to bag jam-ups, film feeding malfunctions within the FIB system and the like. A preferred embodiment of the present invention can be readily installed without disruption of other systems and also preferably is of the type that can be readily retrofitted to existing machines as in those described above FIB systems.

An alternate embodiment of a film monitoring based material spill prevention system under the present invention is described below, but is useable as well as a supplement to the above described spill prevention system as well as the flow controller position monitoring system described even further below. That is, relative to the various material spill prevention systems described in the present application, they can all be used together, used in all possible material spill prevention system subsets (e.g., two out of three or more subsets), or individually alone.

In an alternate embodiment of a material spill prevention system, there is provided a film feed location sensing system which senses whether a film feed location is misplaced so as to reduce the possibility of material spillage relative to the film being utilized for bag formation. In a preferred embodiment, the sensing system is designed to detect the presence of film relative to the dispenser such that if, for example, the sensing system detects the lack of film web presence relative to a side of the dispenser, then an appropriate material dispense prevention action is taken such as a prevention output that is generated to initiate or maintain a no dispense mode status. Preferably the dispensing system senses whether or not film material is to each side of a dispenser body (e.g., a preferred embodiment has a sensor arrangement for determining whether film webs are properly positioned to both the front and rear surfaces of the dispenser, although various other embodiments are featured under the present invention as in only a rear web presence ensuring sensing system on the notion that an error in both webs fed to the rear will be more visible then an opposite incorrect placement of both webs to the front only of the film feed path around the dispenser). Additional variations for "side" sensing include, for example, detecting a proper "V" fold section for a folded film source in front of the free end of the dispenser module, which is illustrative of the sensing means function for sensing whether or not the film material is properly situated relative to the dispenser system's dispensing outlet or, in other words, whether or not the film is properly situated in the intended film feed path for generating a bag in the bag formation operation.

The above noted "V" fold is illustrative of a proper spread to the front and back of the webs rather than a collapsed state which occurs when the webs' are both fed to only one side. Also, the "presence" detection possibilities for this embodiment are similar to that described above. If film positioning is sensed as not proper than there is initiated flow preclusion means such as those described above in the earlier featured embodiment.

An additional embodiment of a spill prevention system includes a monitoring system with means for keeping abreast of positioning of a moving object such as moving object in the form of a component for controlling flow or no flow in the dispenser system (e.g., the above described valving rod) and/or a driving component that directly or indirectly provides a drive force to the flow control means (e.g. a transmission line extending from a motor source to a connection with the flow control means). In a preferred embodiment the monitoring system includes a position monitoring device able to keep track of all positions that the monitored component assumes during operation and preferably also during operation, shut down and start up of the moving object driving system. One embodiment includes a device that gives a signal with respect to rotary (or linear position) of the moving object such as an encoder with a preferred embodiment having an absolute encoder device such as one mounted on the dispenser drive transmission line. An absolute encoder of choice provides a digital signal to the system control processor. This digital signal is related to the rotational (or linear) position of the encoder so the system processor knows where the moving object (e.g., valving rod) is at all times, even on system startup.

An absolute position encoder that provides a resolution of better than one degree (when dealing with a rotary encoder) is preferred so that the system control processor knows relatively accurately where the valving rod is at all times. Thus, relative to the above noted PCT publication having a home sensor, the use of an absolute encoder avoids a need to count pulses away from a home position (although in a preferred embodiment the home positioner can be retained as a supplement to the absolute encoder with the latter providing improved position monitoring on an absolute time basis and can be added in a retrofit provided the control board has sufficient input/output capability to handle both signal feeds). In other words, in a monitoring system using an absolute encoder technology there can still be used a proximity sensor as a means to further check on operation. For example, if a proximity sensor signals that a valving rod is in a closed (flow shut off) position, but the absolute encoder indicates a positional output that is contrary to what the proximity sensor indicates, then the means for precluding material flow is initiated and the system is shutdown until the contradiction is resolved. Alternatively or in addition, a review of the encoder output from a dispenser motor (e.g. an internalized motor encoder) can be carried out, but only as a check on the operation of the absolute encoder, which, in a preferred embodiment, would be the main source of information regarding valving rod position.

An absolute position encoder provides relatively precise positional information as soon as it's powered up. Conventional encoders, such as those that are pre-built into a dispenser motor, lack knowledge where they are on power-up. These conventional encoders have to find a home position using an external signal from something like the aforementioned proximity sensor to establish a reference point as in zero, then count pulses to establish a position from there. Relative to, for example the aforementioned PCT publication embodiment with home proximity sensor, if the encoder powers up and its not at the home position, the system is at least initially blind as to the position of the moving object such as the valving rod.

There are a variety of absolute encoder types including optical and magnetic types that are, for instance, rotary or linear based. Examples can be seen in U.S. Pat. No. 6,646,434 (magnetic encoder) and in U.S. Pat. No. 6,597,290 (optical) or in Bei Encoders Corporation linear encoders. While the subject matter of the present invention is inclusive of a variety of encoder types, preferably an absolute encoder embodiment that is a magnetic rotation based absolute encoder is utilized as opposed to, for example, an optical position encoder as the latter, is typically more fragile, more expensive (often due in part to an optical sensor having a higher precision which is not necessarily needed for the purposes of the present invention). In addition, magnetic based rotary absolute encoder sensors are generally much more compact than their optical counterpart and thus are preferable under the present invention in view of the very limited area within which to work with when dealing with dispenser's (e.g., for avoiding contact with the environment including, for example, adhesive foam material, it is desirable to position the absolute encoder of the present invention within the interior of the dispenser's housing, although external locations including those off the dispenser body (e.g. an external location as with an optical signal field, etc are featured as alternate embodiments under the subject matter of the present invention)). The encoder is preferably mounted, however, anywhere along the drive train (transmission, motor drive shaft, moving object itself) where it can sufficiently accurately sense the position of a component that will provide the information associated with an absolute encoder device as in the shaft rotation state or a non-rotative component as in a reciprocating piston/piston housing arrangement. As an illustration of an alternate mounting location, the absolute encoder can be mounted to the back side of the motor such as on an extension shaft at that location. It can also be mounted, for example, to the very end of the crank mechanism described in the above noted PCT publication such as on an extended length portion thereof. Another example, is an absolute encoder mounted to a side shaft that runs at an angle or parallel with respect to the main drive shaft such as where the side shaft is connected with a suitable gear mechanism. As can be seen there is a variety of locations that are suitable with the preferred relationship being one where there is a solid mechanical coupling between a component in the drive train as in the drive shaft and the associated signal monitoring part of the encoder which is the shaft of the encoder in many encoder designs. The absolute encoder can be either of the non-contact or contact type, which type is influenced by factors such as positioning.

A linear encoder such as a LVDT (linear variable differential transformer) absolute encoder such as one that monitors movement of a piston or something attached to it or some other linear moving component as in the valve rod of a valve rod functioning dispenser. An RVDT (rotary variable differential transformer) is another example of a position transducer device featured under the inventive subject matter. In addition to the above described position transducer devices, there is featured ultrasonic, potentiometric, cable position, magneto-restrictive, inductive and laser position transducer devices for monitoring positioning of a moving object and representing examples of the position transducer means under the present invention.

BRIEF DESCRIPTION OF THE DRAWINGS

FIG. 1 shows a front elevational view of a material dispensing system in the form of a foam-in-bag dispensing system.

FIG. 2 shows a rear elevational view of the foam-in-bag dispensing system.

FIG. 3 shows a top plan view of the foam-in-bag dispensing system.

FIG. 4 shows a front perspective view of the bag forming assembly of the system in FIG. 1.

FIG. 5 shows a rear perspective view of the bag forming assembly.

FIG. 20 shows the sensor system of FIG. 18 and its supporting mount (fixed jaw) separated from the remainder of the bag forming assembly.

FIG. 21 shows a closer view of one of the photosensors shown in FIG. 20.

FIG. 23 provides a schematic depiction of a spill prevention control system which includes a sensing sub-system and a material dispense prevention sub-system.

FIG. 30 shows a front side view of the dispenser assembly supported relative to the foam-in-bag system with spill prevention system.

FIG. 31 shows an enlarged view of the dash-line circled region of FIG. 30 showing in greater detail one of two sensors featured in FIG. 30.

DETAILED DESCRIPTION OF THE PREFERRED EMBODIMENTS

Figure 6:
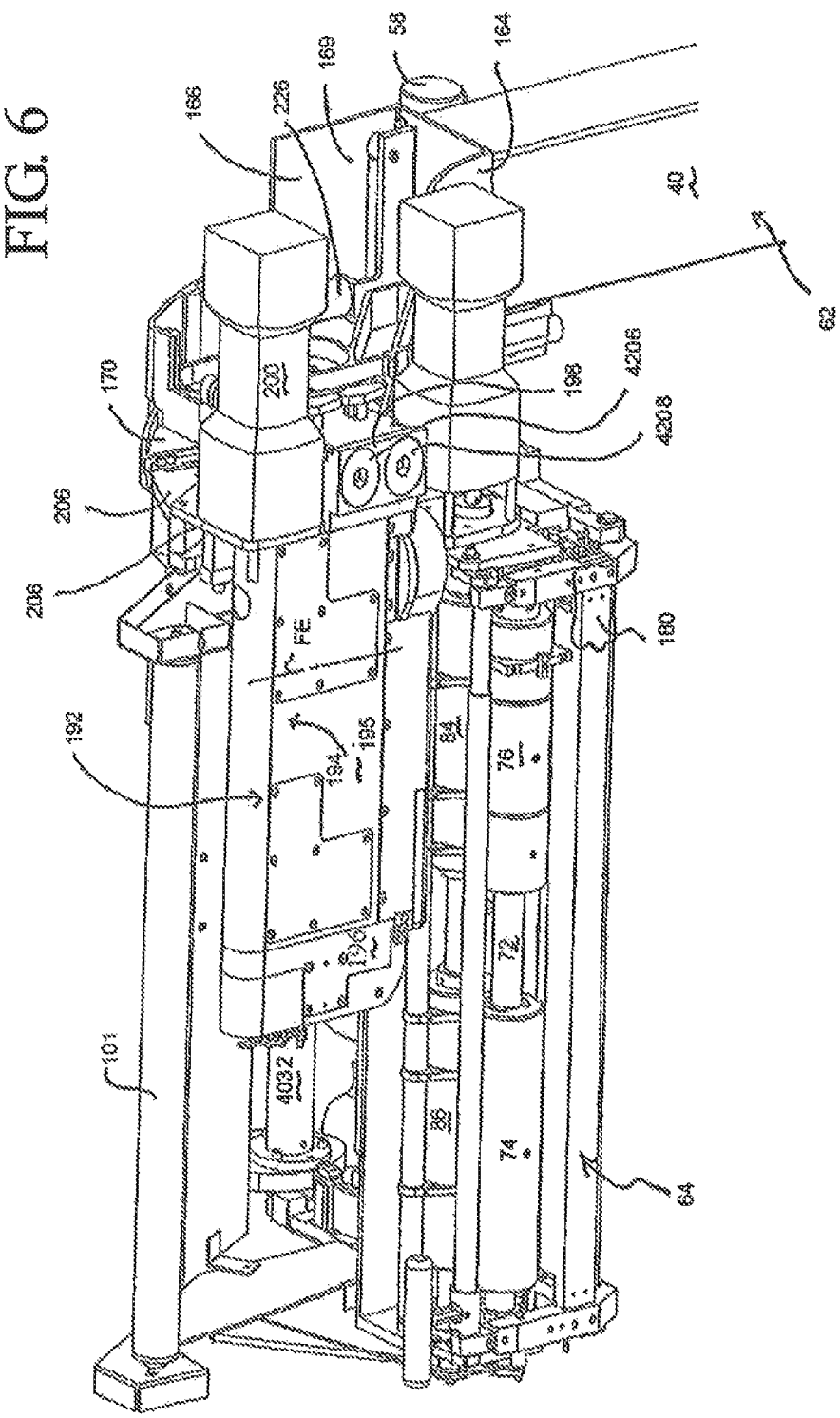
FIG. 6 shows a front perspective view of the bag forming assembly with dispenser assembly attached for dispensing into a bag being formed.

The material spill prevention system of the present invention can be utilized in a variety of dispenser systems such as a handheld dispenser (for non-film embodiments of the material spill prevention system) or in bag formation systems (with "bag being used in a broad sense as in any film (or like material) being sufficiently flexible to be formed into a material receptacle). For example, an embodiment of the present invention preferably includes bag formation systems with the bag formation being on going at the time of material dispensing (e.g., liquid or solid material) such as the foam-in-bag system of the above noted PCT Patent Application PCT/US2004/014423 filed May 7, 2004 (e.g., as part of a retrofit process or in conjunction with an initial manufacture of the foam-in-bag system). FIGS. 1 to 3 illustrate the foam-in-bag dispensing system 20 described in PCT/US2004/014423 which represents one of many possible foam-in-bag systems, or dispensers in general, suitable for use with the material spill prevention system of the present invention to provide a material spill avoiding dispensing system as in an improved foam-in-bag system. With reference to FIGS. 1-3, there is illustrated foam-in-bag dispensing system 20 which is placed in communication with a chemical supply (not shown) which typically involves a first chemical supply line from a first container source (supplying chemical component A) and a second chemical supply line from a second container source (supplying chemical component B) via respective (e.g., heated) chemical hoses CH (FIG. 2) which feed into a manifold port 198 of the dispenser assembly 192 shown in FIG. 6 having a dispenser mixing module 256 (FIGS. 16 and 17) with outlet port 258 within dispenser housing 194 that is designed to feed the mixed chemical into a bag being formed. Dispenser assembly 192 is shown to have its dispenser housing 194 supported in cantilever fashion out away from support structure 62 shown as having a post and mobile base. FIGS. 1-3 also show dispenser assembly 192 housed within accessible (e.g., hinged door) encasing housing HO.

Figure 24:
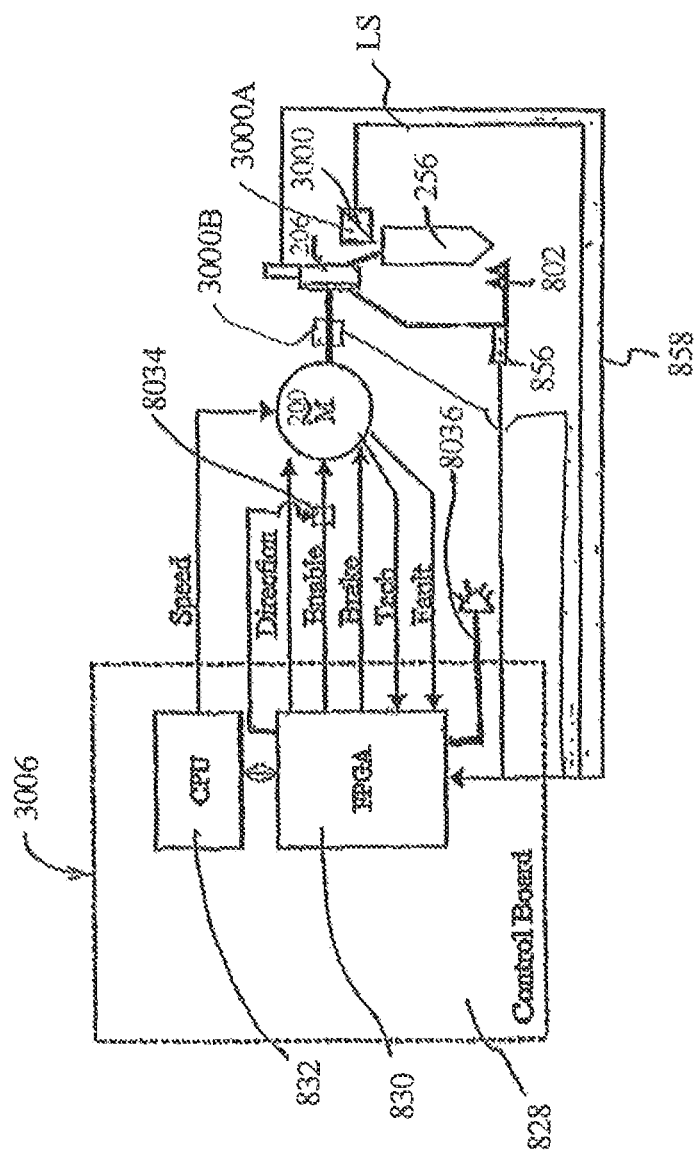
FIG. 24 provides a schematic view of modified embodiment of the present invention including a third point film feed sensing system featuring an added sensing system for determination of proper film web feed to both the front and back of the dispenser assembly main housing which works in combination with the point 1 and/or point 2 material dispense prevention sub-system of FIG. 23.

FIGS. 1-3 further illustrate a film roll support assembly FR within which a suitable roll or other source of bag formation material 216 (FIG. 7) is provided (the illustrated embodiment featuring a preferred C-fold film supply although other film source techniques are also featured under the present invention such as a single roll dual layered film supply, two separate film web rolls or a tube film supply with upstream cutting, etc.). FIG. 1 further illustrates the control unit CU (e.g., a control board in communication with an operator interface device such as the control panel shown in FIG. 1), FIGS. 23 and 24 illustrate a schematic view of a control board of a control unit CU having, for example, a processor and FPGA logic card communicating with a CPU. Various other control means can be relied upon as in those functioning to take in sensed or input information, carry out a determination or analysis sequence as to what that information conveys, and, based on that sequence, communicating with a dispenser system sub-system as to whether or not any action or whether a change may be required.

Also, in any discussion herein, a reference to "the invention" or the like should not be misconstrued as being indicative of there not being other alternate embodiments representing the invention or inventive subject matter of the present invention; nor should reference to a preferred embodiment or the preferred embodiment be deemed as precluding other alternate embodiments being equally desirable for protection under the present application.

The control unit CU thus provides means for controlling various activities which preferably includes a driver logic sub-component associated with the sensing and chemical flow prevention systems described below. The incorporated herein by reference PCT/US2004/014516 filed May 10, 2004 illustrates a control system which can be modified (e.g., retrofitted) to include, for example, the appropriate additional logic control (e.g., software and/or hardware) to accommodate the below described sensing and/or activation operation(s). The below described FIGS. 23 and 24 providing examples of such a modified control unit with added sensing and material spill prevention system activation control supplementation. In a preferred unit, the control means of the control unit CU preferably includes a material spill prevention automated sense and command component feature as in a sense for proper film presence and/or flow controller positioning and, when a proper situation is sensed, a release or enable flow signal relative to a chemical feed sub-system (which automatic sense and command feature is preferably integrated or in communication with other sub-systems as in the film feed system, and bag formation from film system as in bag heat sealing functions). The control means for controlling activities also preferably comprises a lock-out or non-enabling activation status output in communication with one or more dispensing system sub-systems for the sensed situation of an improper criteria as through a logic analysis based on the sensor signals received, for example, relative to as improper film presence, as in improper film feed (e.g. film jam) and/or lack of proper bag separation, and/or an improper feed film sensing and/or an improperly positioned dispenser flow controller. The non-enabling action status output is designed to either retain a current state of the sub-system if it favors the desired prevent chemical feed (and/or other sub-systems) or adjust to such a prevent chemical feed setting if not currently in such a setting. Preferably, when dealing with a film feed embodiment, the automated sense and command component of the control unit has a film feed sensing diagnostic cycle that starts immediately following a sensed dispense operation initiation signal, as in one triggered upon the pressing of a bag formation start button on, for example, button panel BP in FIG. 1, and prior to any chemical release via, for example, an adjustment in a dispenser material release mechanism (e.g., flow controller reciprocating valve) with associated sub-system. Thus, in a preferred embodiment, the non-enabling mode is designed to prevent chemical dispensing when an improper dispenser criteria is sensed as when an improper film situation is sensed, and to automatically allow for material dispensing and bag formation when there is sensed a proper dispenser criteria situation sensed such as a proper film presence (e.g., the film is sensed as properly situated and/or there is not sensed an improper film situation). For example, with respect to the improper film presence mode, a sensed failure of the leading edge of the film to pass from a starting location to within a sensor range of a sensing system within a predetermined time period or when a sensing system detects a bag has failed to separate from a bag to be formed, triggers the control means to activate a non-enabling mode relative to chemical dispensing. As another example (useable alone or in conjunction with other means for determining an improper dispenser criteria) there is sensed whether the operator as properly fed film in the system about the dispenser and to the film drawing assembly. The film feed sensing diagnostic cycle preferably starts and finishes prior to any chemical release as in an adjustment in a dispenser material release mechanism. The non-enabling mode is designed to prevent chemical dispensing when proper film feed presence is found lacking.

Also as explained in greater detail below the non-enabling mode is also established if, upon a start up diagnostic cycle, there is sensed a potential problem in the relative location or status of the dispenser flow controller such as a valve rod that is sensed as being out of flow stop position at start up or other state where flow can lead to spillage.

Figure 18:
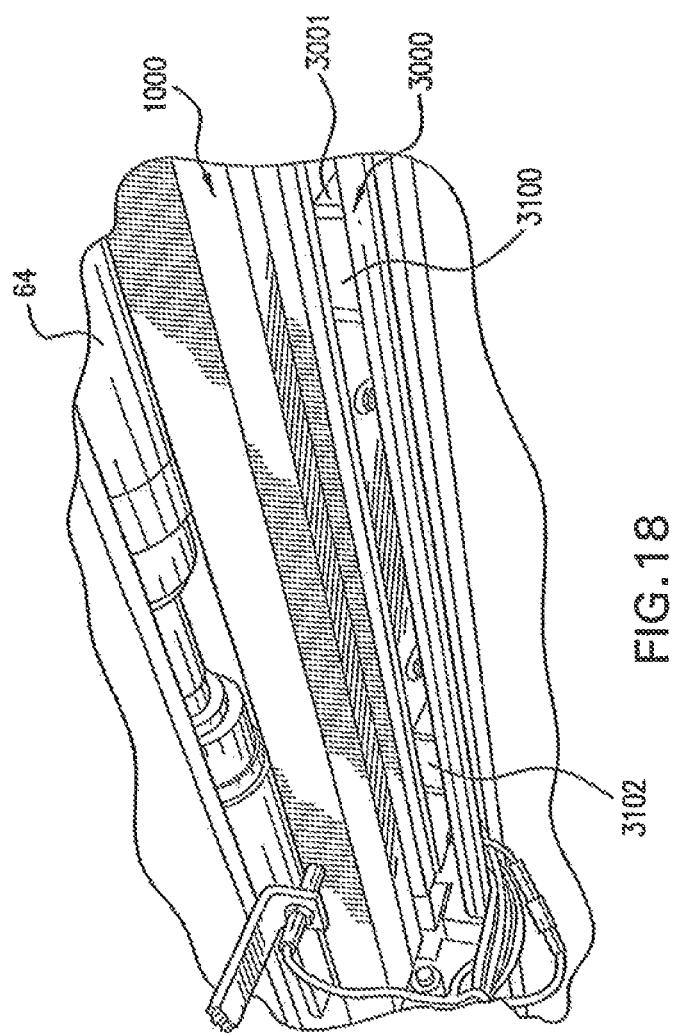
FIG. 18 shows a closer view of the central underside region of the transverse seal compression means with jaw assembly shown in FIG. 5 together with a preferred sensor system mounted in place.
Figure 19:
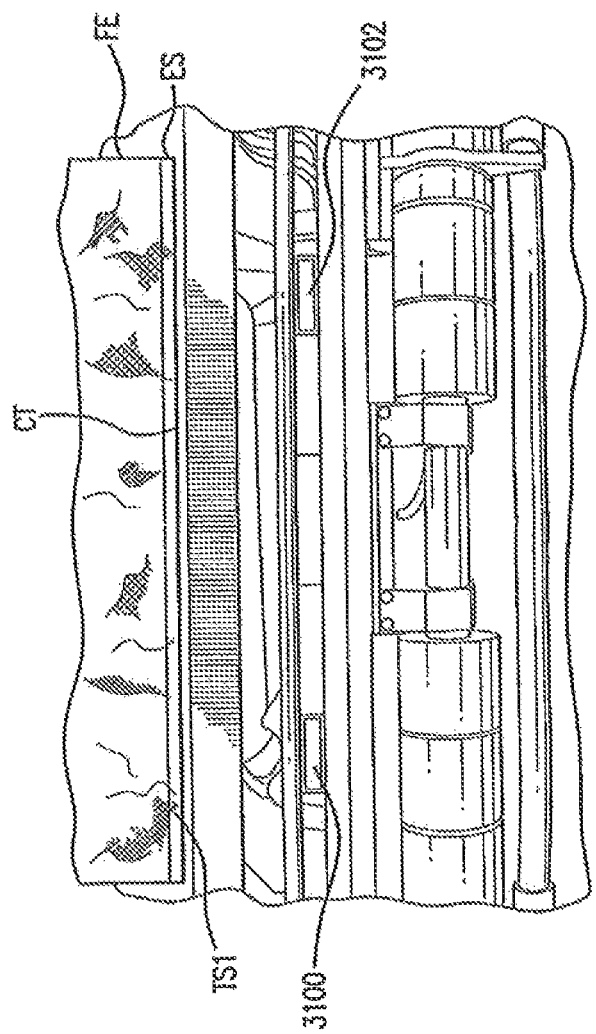
FIG. 19 shows a closer view of the central upperside region of the bag forming assembly of FIG. 4 following release of the hinged front access panel to a lower position and with film in position for bag formation and with the sensor system of FIG. 18 in position.

For a better appreciation as to operation of a material spill prevention system as in, for example, spill prevention system 3000 shown in FIG. 18 that is shown used in association with a material-in-bag dispensing system, a discussion of a foam-in-bag (FIB) system and how it interrelates with an embodiment of the material spill prevention system 3000 to provide a material spill avoiding dispensing system 1000 is provided. FIGS. 4-6 show an embodiment of a bag forming assembly 64 which forms part of an overall material spill avoiding dispensing system 1000 (see FIGS. 18 and 19 for a partial view of the overall material spill avoiding dispensing system 1000 shown to include in that embodiment the material-in-bag dispensing system illustrated in FIGS. 1 to 3 coupled with material spill prevention system 3000). FIGS. 4-6 also show an embodiment of a bag forming assembly 64 which is suited for use in 'an overall material spill avoiding dispensing system 1000A (see FIGS. 29 to 36 for a view of the material spill avoiding dispensing system 1000A with the housing and support, etc illustrated in FIGS. 1 to 3 removed for added clarity). As seen in FIGS. 4-6, bag forming assembly 64 is mounted in cantilever fashion on support structure 62 best shown in FIGS. 1 and 2. Bagger assembly 64 comprises framework 65 having first side frame 66 (shown on the right side relative to a front view in FIG. 4) and second side frame 68 (shown on the left side in the front view FIG. 4). Side frame 66 has means for mounting bag forming assembly 64 to support structure 62 (e.g., a set of bolts). Framework 65 further includes front pivot rod 70 extending between the two interior sides of side frames 66, and 68, as well as front face pivot frame sections 71 and 73 which are pivotally supported by pivot rod 70. Rod 70 also extends through the lower end of front face pivot frame sections 71 and 73 to provide a rotation support for sections 71, 73. Driver roller shaft 72, supporting left and right driven or follower nip rollers 74 and 76, also extends between and is supported by side frames 66 and 68. While in a latched state the upper ends of pivot frame sections 71, 73 are also supported (locked in closed position) by door latch rod 85 with handle latch 87.

First frame structure 66 further includes mounting means 78 for roller shaft drive motor 80 in driving engagement with drive shaft 82 extending between and supported by frame structures 66 and 68. Drive shaft 82 supports drive nip rollers 84 and 86. Framework 65 further comprises back frame structure 88 preferably formed as a single piece unit with side frame structures 66 and 68. Driven roller shaft 72 and driver roller shaft 82 are in parallel relationship and spaced apart so as to place the driven nip rollers 74, 76, and drive nip rollers 84, 86 in a film drive relationship; with a preferred embodiment featuring a motor driven drive roller set 84, 86 formed of a compressible, high friction material such as an elastomeric material (e.g., synthetic rubber) and the opposite, driven roller 74, 76 is preferably formed of a knurled aluminum nip roller set (although alternate arrangements are also featured as in both sets being formed of a compressible material like rubber). Alternate film drive means including, for example, conveyor belt arrangements or link plate arrangements are also featured under the present invention as roller sets. The illustrated roller sets are shown placed in a state of compressive contact by way of the relative diameters of the nip rollers and rotation axis spacing of shafts 72, and 82 when pivot frame sections 71, 73 are in their roller drive operation state. FIG. 4 further illustrates door latch rod 85 rotatably supported at its opposite ends by pivot frame sections 71, 73 and having door latch (with handle) 87 fixedly secured to the left end of door latch rod 85. Latch 87 provides for the pivoting open of pivot frame sections 71, 73 of the hinged access door means about pivot rod 70 into an opened access mode. While in a latched state, the upper ends of pivot frame sections 71, 73 are also supported (locked in closed position) by door latch rod 85. This ability to open the front of the drive roller combination facilitates film feed; as during roll replacement or relative to corrective action in a jam up situation, but there still remains the potential for a misfeed of film relative to the dispenser housing above the film drive means.

Figure 13:
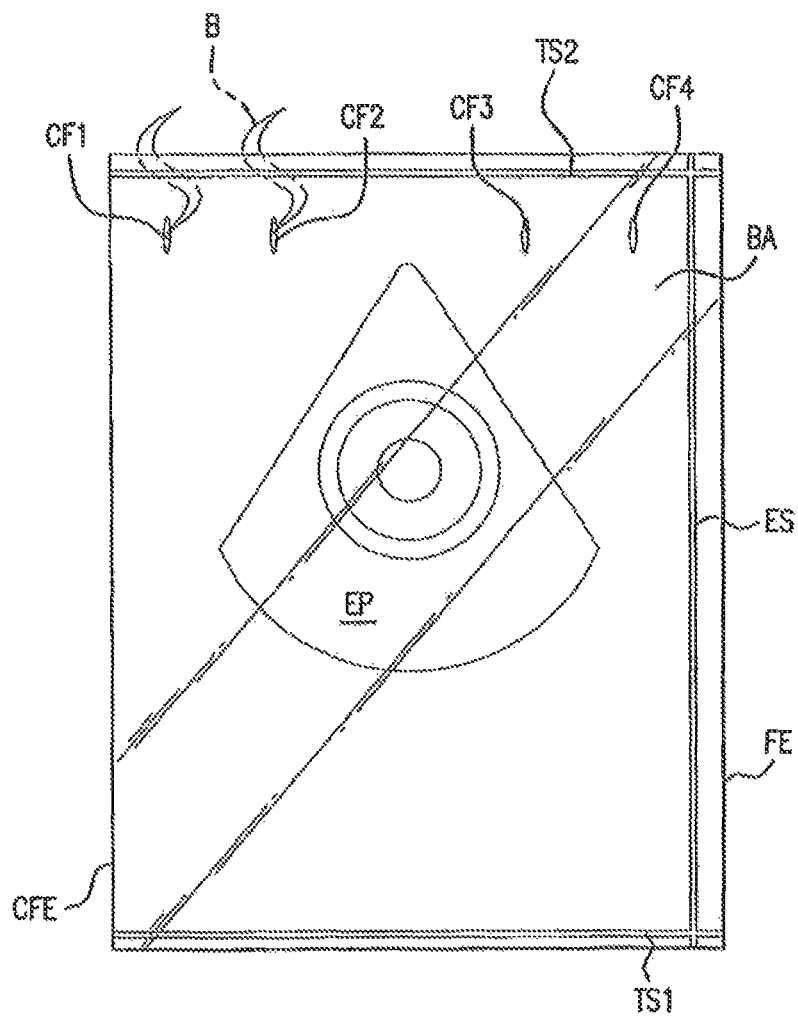
FIG. 13 shows a completed bag with received foam producing chemical (not yet in a fully expanded state which typically occurs in less than 30 second).

Drive nip rollers 84 and 86 have slots formed for receiving film pinch preventing means 90 (e.g., canes 90) that extend around support rod 92 with rod 92 extending between first and second frames 66, 68 and parallel to the rotation axes of shafts 72 and 82 (or alternatively cutting mechanisms for forming vent cuts in the film material for foam generation gas release are placed in position to cut the film at the appropriate time). FIG. 4 further illustrates bag film edge sealer 91 shown received within a slot in roller 76 and positioned to provide edge sealing to a preferred C-fold film supply. FIG. 13 illustrates the resultant edge seal ES produced by edge sealer 91 which is shown as a continuous edge seal in the "C-fold" film based bag BA. In the above noted PCT/US2004/014423 venting preferably takes place on the side with the edge seal ES through a temporary lowering of heat below the sealing temperature as the film is fed past. This venting technique can be supplemented or replaced with an alternate venting system embodiment as in a mechanical cut venting system (e.g., heat cut or blade cut) such as a blade unit with a sheathing similarly shaped as the cane's contact surface for insertion as a cane replacement.

To facilitate film feed through the system and proper bag orientation to provide for accurate formation of the edge and transverse sealing, rear frame structure 88 has secured to its rear surface, at opposite ends, idler roller supports 94 and 96 extending up from the nip roller contact location. Idler roller supports 94, 96 include upper ends 98 and 100 each having means for receiving a respective end of upper idler roller 101 (e.g., a roller shaft reception aperture or bearing support). As shown in FIG. 4, ends 98, 100 present opposing parallel face walls 102, 104 and outward flanges 106, 108. Within the confines of flanges 106, and 108 there is provided first and second idler roller adjustment mechanisms 110, and 112 (FIG. 5). In a preferred embodiment, one of the adjustment mechanisms provides vertical adjustment as to the rotation axis of idler roller 101 while the other provides front to back horizontal adjustment to the same idler roller 101 rotation axis. FIG. 5 illustrates the horizontal track adjustment means 112 of the present invention which, in combination with the opposite vertical adjustment track plate 110, helps ensure the film properly tracks through the nip roller (e.g., retains a right angle film edge relationship to the roller axis while traveling a pre-set preferably generally centered or intermediate path through the nip roller set with "FE" in FIG. 6 illustrating the preferred non-fold side edge of the C-fold film). Also, idler roller 101 is preferably a steel or metal roller and not a plastic roller to avoid static charge build up relative to the preferred plastic film supplied. Idler roller is also preferably of the type having roller bearings positioned at its ends (FIG. 7) for smooth performance and smooth, unwrinkled film feed.

Figure 7:
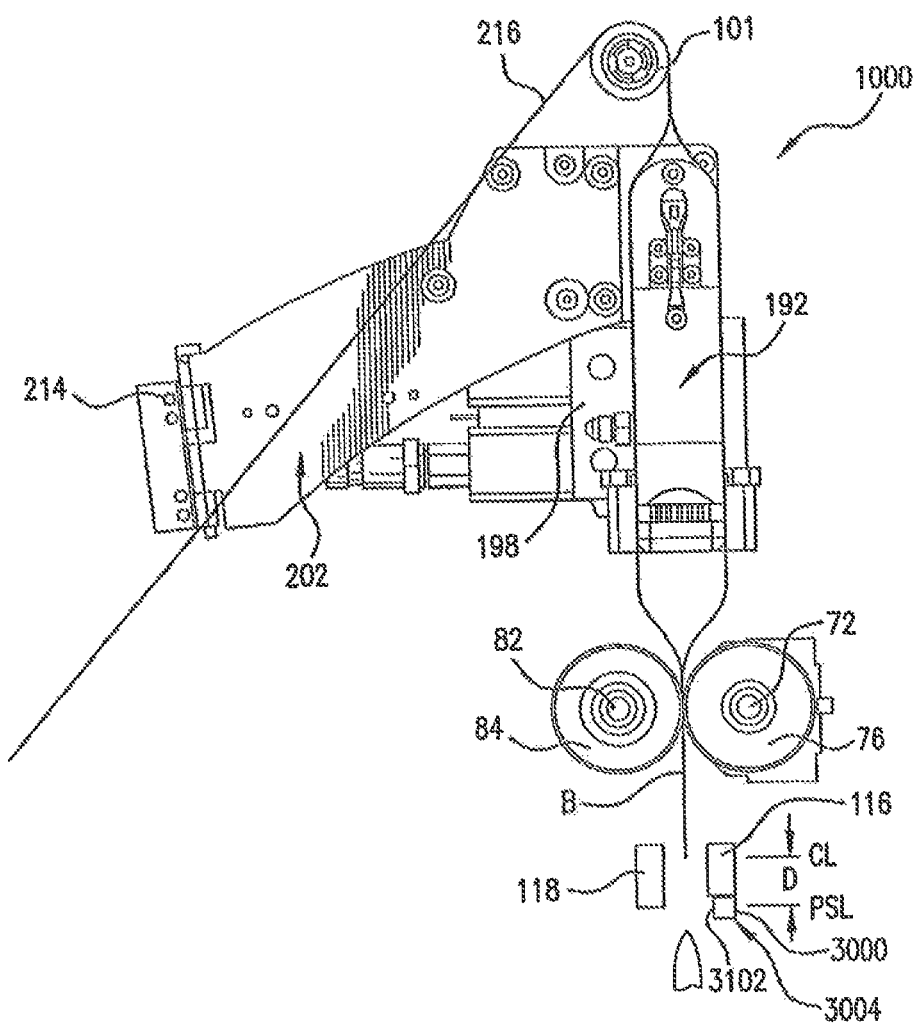
FIG. 7 shows film feed through the bag forming assembly and about the mounted dispenser of the dispenser assembly featuring an embodiment of a material spill prevention system associated with film travel downstream of a transverse seal region.

With reference particularly to FIGS. 4 and 5, second or lower idler roller 114 is shown arranged parallel to drive roller shaft 82 and supported between left and right side frames 66 and 68. Idler roller 114 preferably has a common roller/bearing design with that of idler roller 101. Also, these figures show first (preferably fixed in position when locked in its operative position) end or cross-cut seal support block or jaw 116 shown positioned forward of a vertical plane passing through the nip roller contact location and below the axis of rotation of drive shaft 82. End seal jaw 116, which preferably is operationally fixed in position, is shown having a solid block base of a high strength (not easily deformed over an extended length) material that is of sufficient heat wire heat resistance (e.g., a steel block with a zinc and/or chrome exterior plating), and extends between left and right frame structures 66, and 68, but again, like driven shaft 72 and rollers 74, 76, is preferably supported on pivot frame sections 71, 73 and extends parallel with driven shaft 72. FIG. 7 illustrates block 116 rigidly fixed at its ends to the opposing, interior sides of pivot frame sections 71, and 73 for movement therewith when latch 87 is released.

Movable end film sealer and cutter jaw 118 (FIG. 5) is secured to end sealer shifting assembly 120 and is positioned adjacent fixed jaw 116 with fixed jaw 116 having sealer and cutter electrical supply means 119 with associated electric connections supported on the opposite ends of jaw 116 positioned closest to the front or closest to the operator. End sealer shifting assembly 120 is positioned rearward and preferably at a common central axis height level relative to end seal contact block 116. During formation of a bag with the embodiment shown, heater jaw 116 supports a cutter heater wire in-between above and below positioned seal forming wires (e.g., for a total of three vertically spaced apart heater wires designated SE1, CT and SE2 in FIG. 8) with, for example, ⅛ to ¾ inch equal spacing with ¼ to ½ inch spacing being well suited for providing the seal (TS1) cut (CT) seal (TS2) sequence in the bag just formed and the bag in the process of being formed. The inner face of jaw 116 is thus formed of a sufficient height (e.g., 1 to 4 inches) to accommodate the wire spacing and, as explained below, the undersurface provides a good mount location for the sensing means which can, for instance, detect the leading edge of the to be formed bag as the bag cycle renews following the cutting of the transverse seal (usually when the film feed is in a stoppage mode, although a continuous mirror image belt drive set up or the like bringing sealing jaws into abutment is also featured, in which case, an alternate mount location may be desirable).

FIG. 13 illustrates bag BA with transverse seals TS1 (first formed) and TS2 (second formed) following formation of the SE-CT-SE sequence (for each earlier formed/currently being formed bag combination) and subsequent to the separation at the cut of an earlier formed bag and a currently being formed bag. With the SE-CT-SE arrangement there is provided a more assured bottom bag formation and there is avoided the problems associated with prior art devices that rely on the end or cross-cut only as the means for sealing. For example, if for any reason a perfect end seal is not secured during the cut formation, there can result massive foam spillage and build up as the foam mix is at its most liquid and least foam development stage when the dispenser first shoots the shot into the just formed bag bottom (i.e., another potential source for a foam-up problem in addition to an initial or developed during a bag forming film misfeed or a bag separation problem and/or an initial or developed during operation misfeed situation in the film feed path and/or a spill due to an improperly positioned dispenser flow closure means). An alternate embodiment of the present invention features, however, a bag forming system relying on a single wire induced seal and cut or any other transverse or bottom of receptacle bag seal formation mechanism.

A preferred embodiment features a combination end film sealer and cutter means 119 having three independently controlled cross-cut/cross-seal resistance wire mechanisms preferably extending across the full length of the face of block 116. These wires are connected at their ends with quick release wire end holders. The end seal and cutter means on the fixed block 116 (after the access structure is locked in place) works in conjunction with movable sealer shifting assembly or jaw support assembly 120 shown in FIGS. 5, 8 and 9. The heater and sealer wires are sensed and thus in communication with a controller such as one associated with a main processor or a dedicated heater wire monitoring sub-processor of the control unit CU. By varying the heat levels of the cutting device it is also possible to produce a chain series of bags which can be controlled by the control unit CU and adjusted by the operator through the button interface shown in FIG. 1 (in which case the bag separation sensor system if present can be toggled to an off mode while the leading edge sensor system can be altered to detect variations in the bag chain characteristics (e.g., the heat seal pattern, added indicia on the original film material etc.)). The jaw movement is also preferably coordinated with the heat sealing function (as well as other functions as film feed, chemical dispense, etc.) via control unit CU.

Figure 8:
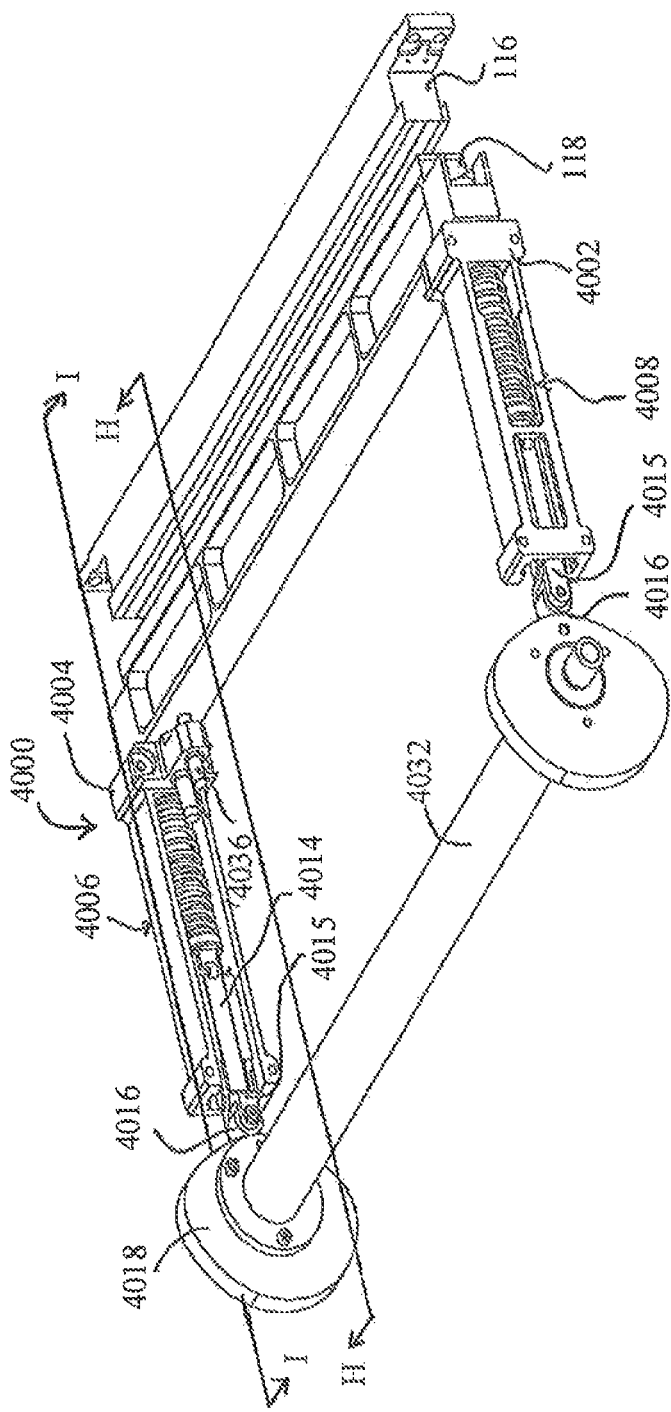
FIG. 8 shows the transverse seal forming device of the bag forming assembly in a retracted state.
Figure 9:
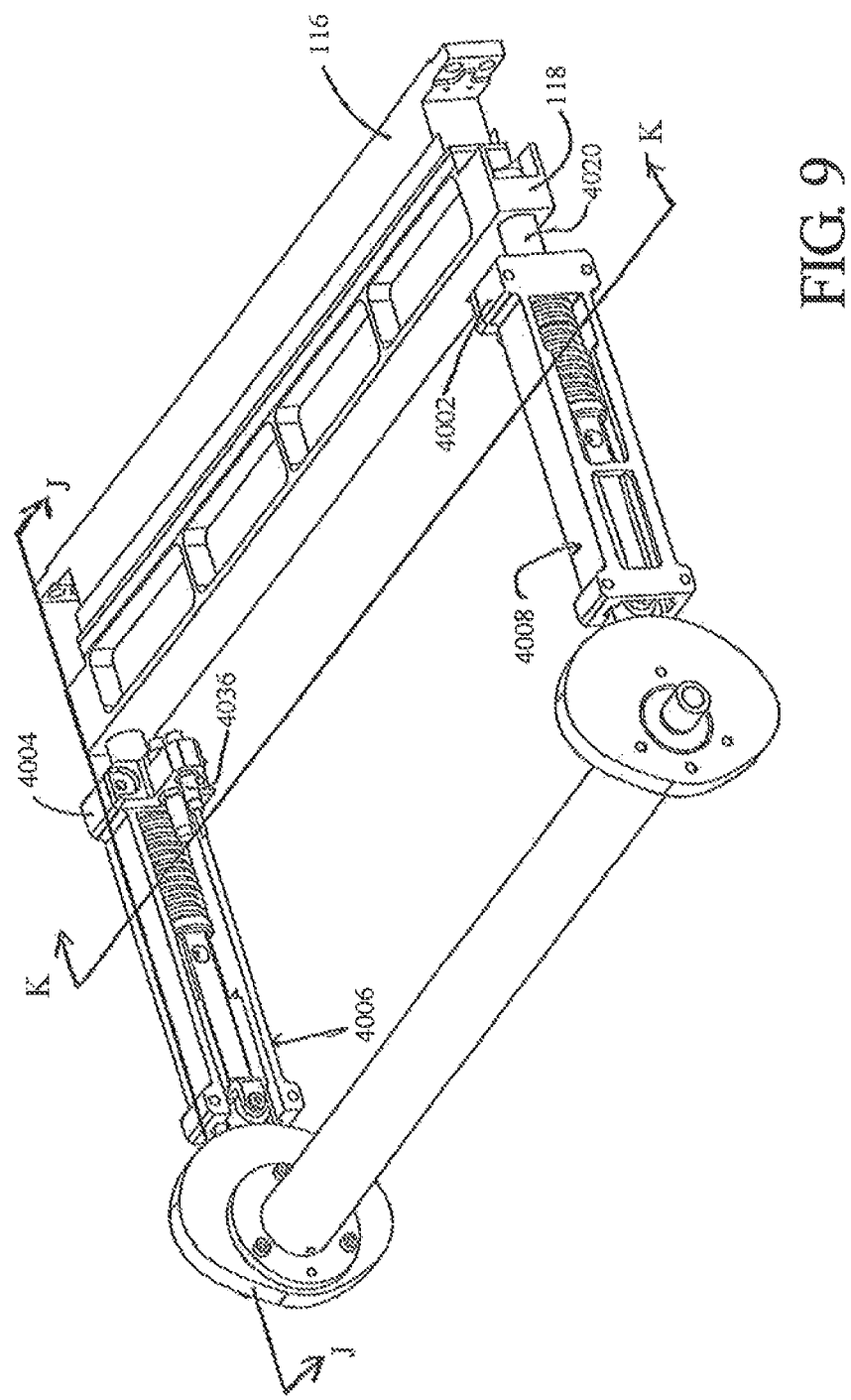
FIG. 9 shows the transverse seal forming device in a sealing state (with film material removed for added clarity).

Block 118 also has a forward face positioned rearward (farther away from operator) of the above mentioned nip roller vertical plane when in a stand-by state and is moved into an end seal location when shifting assembly is activated and, in this way, there is provided room for bag film feed past until end sealer shifting assembly 120 is activated. FIGS. 8 and 9 show a perspective view of an embodiment of a moving jaw assembly 4000 which retracts and pushes forward jaw block 118 against the preferably stationary jaw 116 with heated cross cut and seal wires. The rear end of block 118 is connected at opposite ends to respective casings 4002 and 4004 with these casings forming a part of the cam force transmission devices 4006 and 4008. Cam force transmission devices 4006 and 4008 are the same except for their mirror image positioning (and below described home positioner) and thus the discussion focuses on transmission device 4006 alone. Casing 4004 is secured to frame structure 66 of bagger assembly 64 at its expanded ends and has an interior reception chamber formed along its inner side. As seen from FIG. 9, within this chamber is positioned bearing plates 4010 and 4012 which receive in sliding fashion cam rod 4014. The rear end of cam rod 4014 includes cam yoke 4015 which supports cam roller 4016 which rides along cam 4018 having an eccentric shape with a minimum contact thickness shown in contact with roller 4016 in FIG. 8 and a maximum thickness shown in contact with roller 4016 in FIG. 9.

The forward end of cam rod 4014 includes a threaded center hole receiving push rod 4020 having a first end extending into threaded contact with the center hole and a second end that extends through an aperture in block 118 and has enlarged head 4022. Push rod 4020 is encircled by rod sleeve 4024 having a forward end received with a pocket recess in block 118 and a rearward end in contact with first (inner) biasing member 4026, which is preferably a coil spring, compressed between a forward end of push rod 4014 and a rear end of sleeve 4024. Surrounding inner spring 4026 is a second (outer) biasing member 4028, also preferably in the form of a coil spring, received by a flanged end of cam follower 4014 at one end and in contact with an outer flanged sleeve 4030 in contact with the forward enlarged end of casing 4004. Outer spring 4028 is designed to hold the cam follower or cam rod 4014 against the cam, while the inner spring 4026 produces the compression for sealing the jaws at the time of forward extension. In view of these different functions, outer longer spring preferably has a much lower spring constant as compared to the inner shorter spring having a higher spring constant. Cams 4018 and 4018' are interconnected by cylindrical drive sleeve 4032 with annular flanges 4034 and associated fasteners providing a means of securement between the sleeve 4032 and a respective eccentric cam, with the cams being driven by cam motor 158 and associated drive transmission.

FIG. 9 illustrates home sensor 4036 which is connected to an extension of casing 4004 and is positioned for monitoring the exact location of the moving jaw 118 at all times and is in communication with the control and monitoring subsystem of control unit CU and provides position feedback which is useful, together with the encoder information generated by the cam motor 158 in determining current and historic location data.

Figure 15:
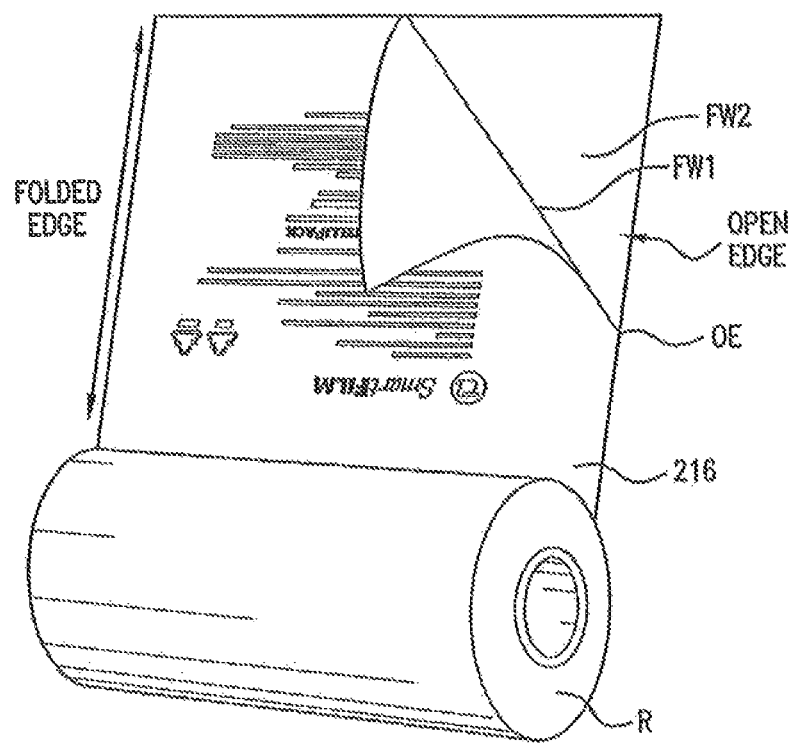
FIG. 15 shows the C-fold film roll alone.

FIG. 7 provides a side elevational view looking in at the free end of cantilever dispenser assembly 192 and bracket assembly 202 in relationship to film 216 which in a preferred embodiment is a C-fold film featuring a common fold edge and two free edges at the opposite end of the two fold panel. FIG. 15 illustrates a roll R of C-fold film 216 having folded edge FE, open edge OE and above and below film webs FW1 and FW2. While a C-fold film is a preferred film choice, a variety of other film types of film or bag material sources are suitable for use in the present invention including gusseted and non-gusseted film, tubular film (preferably with an upstream slit formation means (not shown) for passage past the dispenser) or two separate or independent film sources (in which case an opposite film roll and film path is added together with an added side edge sealer) or a single film roll comprised of two layers with opposite free edges in a stacked and rolled relationship (also requiring a two side edge seal not needed with the preferred C-fold film usage wherein only the non-fold film edging needs to be edge sealed). For example, in an alternate embodiment, a gusseted or expandable in width C-fold film, with planar front and back surfaces, is utilized to provide a larger resultant volume bag and is provided with the same left to right edge film travel width (e.g., 12 inch or 19 inch). The interior edges each have a V-fold that is preferably less than a third of the overall width of the sheet (e.g., 2½ inch gussets) and the venting system can either avoid contact with the folded gusseted insert or slice through the gusseted fold extension to increase the number of vent holes formed.

As shown in FIG. 7 after leaving the film roll and traveling past lower idler roller 114, the film is wrapped around upper idler roller 101 and exits at a position where it is shown to have a vertical film departure tangent vertically aligned (although angled relationships are also featured under the present invention as in plus or minus 30 degrees from a true vertical) with the nip contact edge of the nip roller sets. Because of the C-fold arrangement, the folded edge is free to travel outward of the cantilever supported dispenser assembly 192. That is, depending upon film width desired, the folded end of C-fold film 216 travels vertically down to the left side (when viewing the front face of dispenser assembly 192) of dispenser end section 196 for driving nip engagement with the contacting, left set of nip rollers (74, 86). As further shown in FIG. 7 the opposite end of film 216 with free edges travels along the smooth surface of dispenser housing (along interior edge travel line FE) whereupon the free edges are brought together for driving engagement relative to contacting right nip roller set (76, 84) whereupon the contacting free film edges are subject to edge sealer 91 to complete the side edge sealing for the bag being formed.

Figure 10:
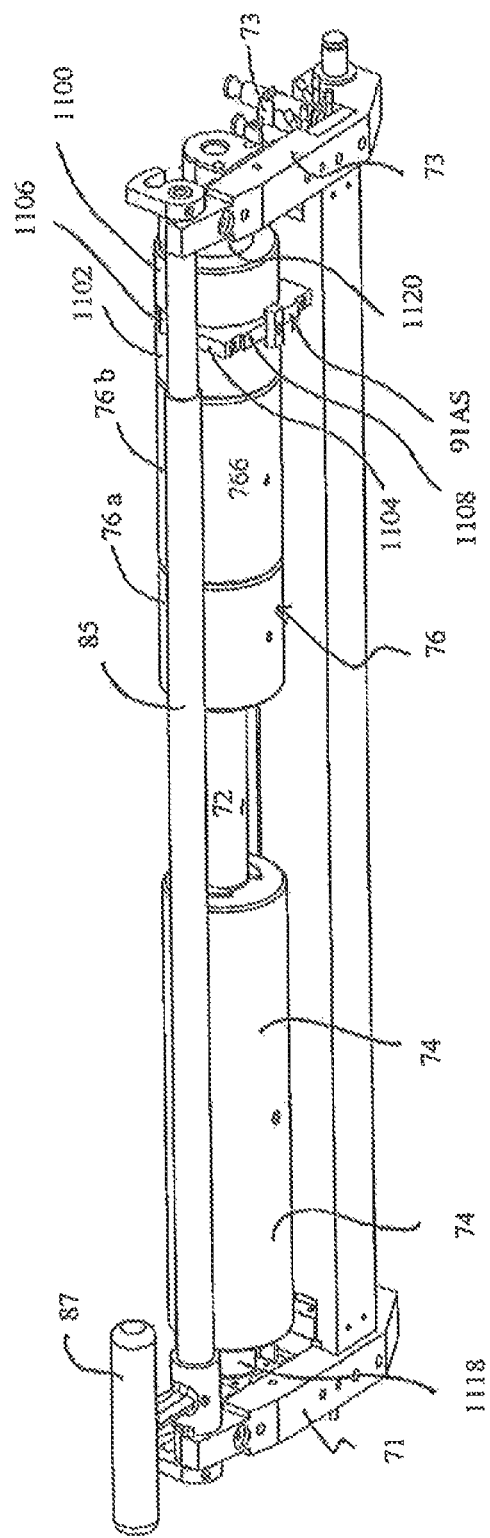
FIG. 10 shows a nip roller assembly of the bag forming assembly supporting an edge seal assembly.

FIG. 10 illustrates the front access door support structure (the paneling shown in FIG. 1 being removed showing the framework only which includes components 71,73 and intermediate cross bar or jaw 116) together with door movement limitation means or door stop shown in FIG. 5. The hinged access door is precluded from rotating freely down into contact with fixed frame structure of the bagger assembly via the door stop. Additional damping means DA is preferably also provided as illustrated in FIG. 5.

Figure 14:
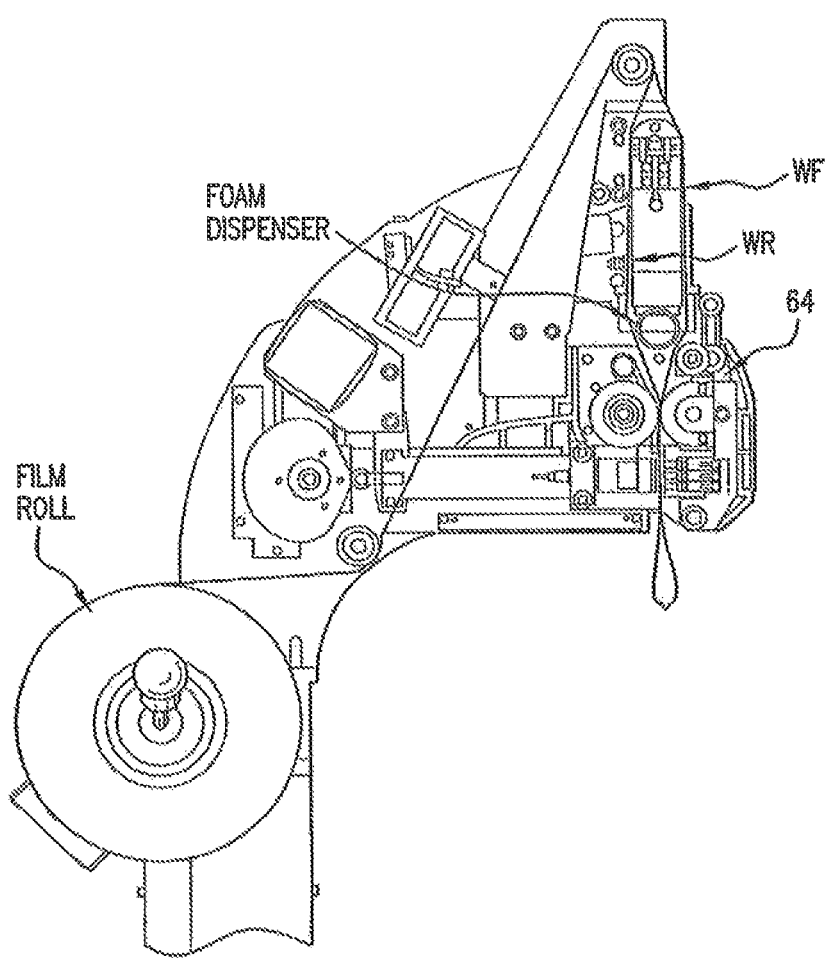
FIG. 14 shows a schematic side view of the foam-in-bag system with film being fed from a supported C-fold film roll source (the film fold being cut away for improved viewing of the dispenser assembly).

An advantage provided by hinged access door is the ease in which the film can be threaded through the nip rolls (or released as, for example, when a change in film size is desired or when an upstream tear or jam occurs). The threading of film through the rolls is simplified, as the operator now has an easy way to separate the nip rolls as opposed to the difficult threading or pushing and drawing of film between the fixed roller sets of the prior art which prior art technique leads to a significant amount of film being wasted before a smooth and hopefully properly aligned/tracking film threading is achieved. Under the present invention, the access door can be opened to further separate apart the nip roller sets and the film played out into position (e.g. by hand or by using a feed button on the control panel) between the nip rollers and the film tends to naturally stay flat or, if not flat, a quick wiping action will achieve the same whereupon the operator merely needs to close the access door (using the handle 87 to lift up and then rotate the access door's cam latch into locking position). The only film wasted is the length of film that extends beyond the cutting wire, prior to the first cut being made. With reference to FIG. 14 there can be seen properly fed film webs WF, WR to opposite sides (front and back) of the dispenser assembly 192 before both webs WF, WR are brought back together at the nip roller region.

An addition advantage of the access door flip open feature is easy access to the edge sealer assembly 91 (see U.S. application Ser. No. 10/623,100 filed Jul. 22, 2003 for additional discussion of this edge sealer which application is incorporated herein by reference). Edge sealer assembly 91 comprises replaceable edge seal arbor mechanism 1104 featuring arbor base 1108 and a heater wire supporting arbor assembly 1106 with, for example, plug in ends similar in fashion to those described above for the end sealer and cutter wires. Thus the access provided by the door allows for either replacement, servicing or cleaning of the entire edge sealer assembly 91 or individual components thereof such as the arbor or just the double pin and heater wire combination or the below described high temperature heater wire under support.

Figure 11:
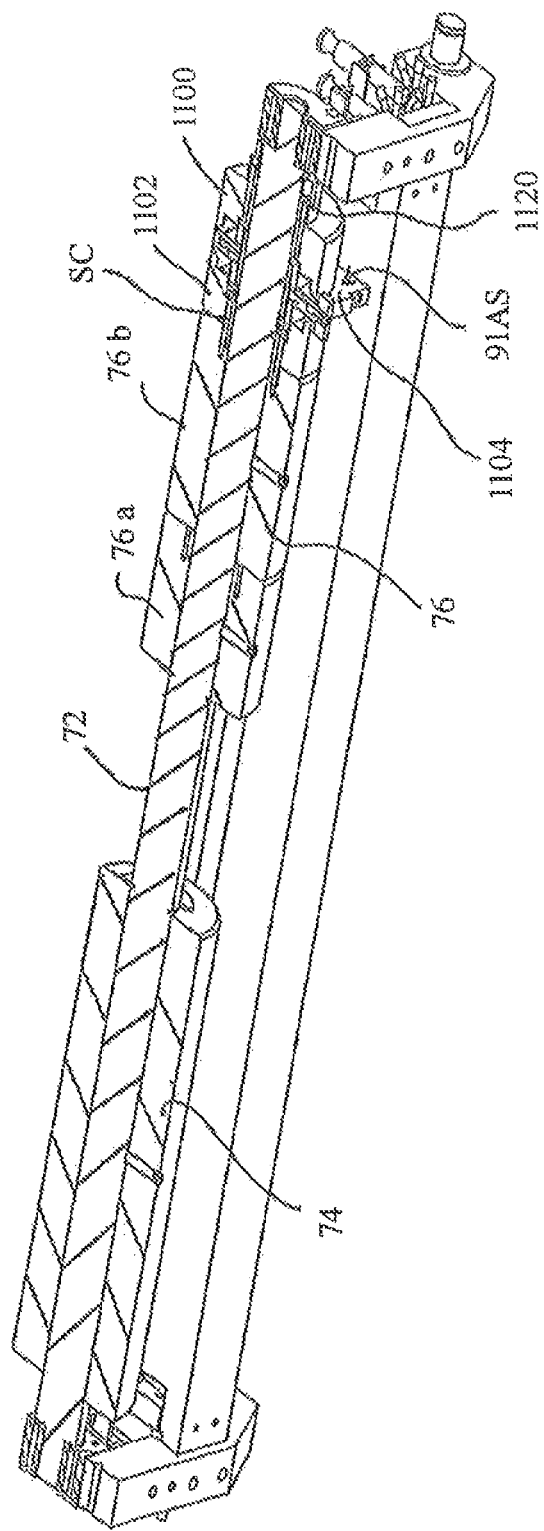
FIG. 11 shows that nip roller assembly of the bag forming assembly in cross-section.
Figure 12:
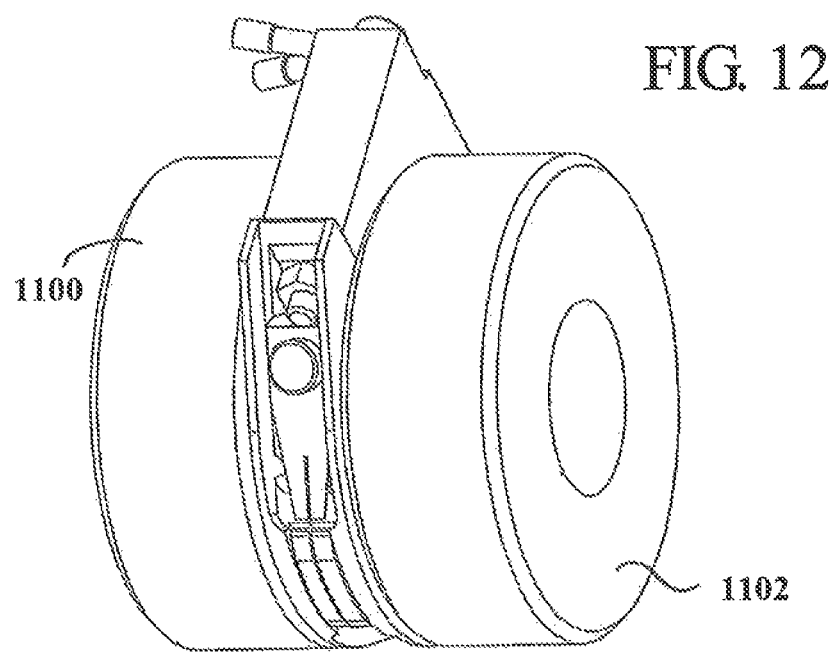
FIG. 12 shows in greater detail the edge seal formation device shown in FIG. 10.

As seen from FIGS. 9, 10 and 11, edge seal assembly 91AS is mounted on shaft 72 which is preferably a precision ground steel support shaft supporting aluminum (knurled) driven rollers 74 and 76. Edge seal assembly 91AS is shown as well in FIG. 6 on the right side of driven shaft 72 (viewing from the front of the bagger) in a side abutment relationship with driven roller 76. The cross sectional view of FIG. 11 shows driven roller 76 preferably being formed of multiple sub-roller sections with driven roller 76 having three individual sub-roller sections including sections 76a and 76b which are included with edge seal assembly 91. Edge seal assembly 91AS includes edge sealer 911 and roll segments 1100 and 1102.

Thus with this positioning, edge seal assembly 91AS is the sealer that seals the open edge side of the folded bag. The open edge side is produced by folding the film during windup of the film on a roll support core R (FIG. 15), so the folded side does not need to be sealed and can run external to the free end of the suspended dispenser. The open side edge side of the film is open for accommodating the suspended or cantilevered dispenser housing and is sealed both along a direction parallel to the roller rotation axis via the aforementioned heated jaw assembly and also transversely thereto via edge sealer assembly 911. The arrangement of the edge sealer 911 relative to shaft 72 ensures that the sub-roller 1102 will not drag with the edge seal unit, causing it to rotate more slowly than the rest of the driven nip rollers. Sub rollers 76a and 76b are each secured to shaft 72 with a fastener as shown in FIG. 11 as is roller 74. The edge seal sub-roller 1100 positioned on the outer side closest to the adjacent most end of driven shaft 72 is attached to the closest of the shaft collars 1120 positioned at the end of driven shaft 72 and secured to the shaft to rotate together with it. Shaft collar 1120 forces edge seal sub roller 1100 to also rotate as a unit with the shaft 72 in unison with sub-roller 1102 but is independent of that sub-roller except for the common connection to shaft 72.

FIGS. 7 and 18 to 22 illustrate a first embodiment of material spill avoiding dispensing system 1000 shown as comprising foam-in-bag dispensing system 20 with FIB assembly 64 and material spill prevention system 3000. Spill prevention system 3000 is particularly useful in systems such as the above described "FIB" dispensing system where there might be a highly disruptive foam-up situation (since typical foams are fast adhering, difficult to remove once set, and, due to their expansion, expand throughout the various nooks and crannies of the system), although any spill of material whether adhering or not is undesirable. In a preferred embodiment, wherein material spill prevention system 3000 is used in conjunction with a foam-in-bag dispensing system 20 to provide material spill avoiding dispensing system 1000 (only partially shown in FIGS. 7, 18 and 19), spill prevention system 3000 preferably comprises one or more sensors as in the left and right sensors 3100 and 3102 shown in FIGS. 18-21. Sensors 3100 and 3102 are preferably photoelectric sensors and are preferably mounted to a suitable material-in-bag dispensing system support means as in a support location positioned below the cut offline representing the transverse film separation cut line for separation of the formed bag from the to be formed bag (or an intermediate seal location in a chain-bag pair). A preferred embodiment features placing the sensor system on a non-moving component having lower position relative to the bag cross-cut, with the fixed jaw 116 being well suited for such a mounting location. For example, a pair of sensors mounted on the undersurface of the jaw 116 and to opposite end regions thereof are shown aligned (shown located on a common horizontal plane below the jaw) to sense film edge CT passage as when edge CT passes thereby and then below a central sensor range axis of the sensors. The transverse cut line is preferably in an intermediate region of the jaw 116 (e.g., cut line CL shown in FIG. 7) such that the sensors central axis falls, for example, 1 to 4 inches below the transverse cut line represented in a preferred embodiment by the line of compression contact for the central heated wire mounted on jaw 116. The sensors include mounting housings 3002 and 3004 which place the central sensor axis farther below the undersurface of the jaw 116 at photosensor line PSL which falls on a horizontal plane where the sensor senses whether there is an edge of the bag being formed passing across the level of line PSL. The illustrated mounting arrangement thus provides a suitable distance D for detecting whether a film jam or the like has occurred upstream and also is a good location for sensing whether the bag just formed has properly separated from the bag being formed above (e.g., the aforementioned points 1 and 2 film presence detection techniques).

Figure 17:
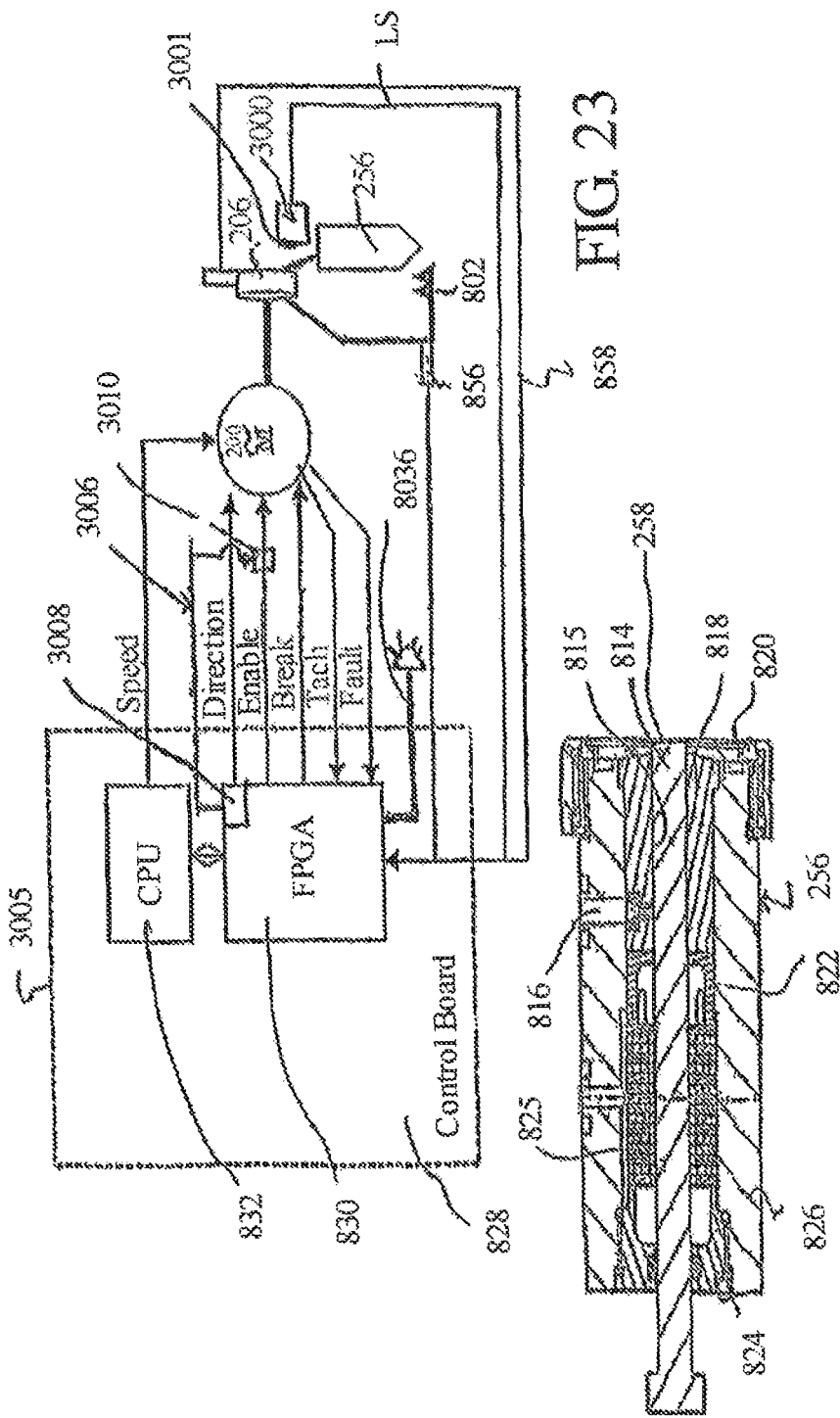
FIG. 17 shows a cut-away view of the mounted mixing module of FIG. 16.

FIGS. 18-21 and 23 illustrate spill prevention system 3000 having sensor system 3001 mounted relative to dispenser assembly 192 and in communication via line LS (FIG. 23) which can be hardwire or wireless and with spill prevention action means 3006 shown being in communication with control means 3005 having an information take in means, an analyzing means and an output means as schematically represented by the control board sub-system 3008, although a variety of alternate control means arrangements are also contemplate as in relying on software or alternate hardware alone or more integrated with a processor as in the CPU illustrated in FIG. 23. The analyzing portion 3008 of control means 3005 (e.g., a designated portion of the control board 828 of the control unit) to analyze sensed data received from the sensors, and if a no-dispense determination is made this information is communicated to shut down means 3010 to initiate appropriate sub-system(s) shut down or system alteration control measures to prevent or lessen the spillage potential in the system as in upon detection of an improper bag film travel and/or improper or incomplete bag separation. In a preferred embodiment, the shut down means when activated results in a disruption or prevention of material flow out of the dispenser as in activation or maintenance of the valving rod 814 shown in FIG. 17 in a chemical flow blockage into mixing chamber mode (e.g., non-retracted state as shown in FIG. 17).

The illustrated mounting of the sensors 3100 and 3102 of sensor system 3001 on jaw 116 is a preferred mounting as it facilitates an early stage sensing of the aforementioned potential problems, does not interfere with film and formed bag travel/separation, and provides a stable sensor platform and provides for easy retrofitting in pre-existing dispenser assemblies. The subject matter of the present invention includes, however, other mounting techniques that are suitable for sensor detection as to whether the film is properly positioned and/or moving for bag formation and/or has properly separated. For example, while the above situated mounting with left/right sensor positioning is preferred, other set ups as in a single sensor embodiment (e.g., a centralized sole use photosensor) mounted on, for example, the undersurface of jaw 116 or at another suitable location (e.g., on a component of the material-in-bag dispensing system or as an independently mounted device (e.g., a dedicated stand-alone mount or reliance on an environmental support structure) for detection of, for example, the to-be formed bag during its formation cycle) is featured as well.

Figure 21A:
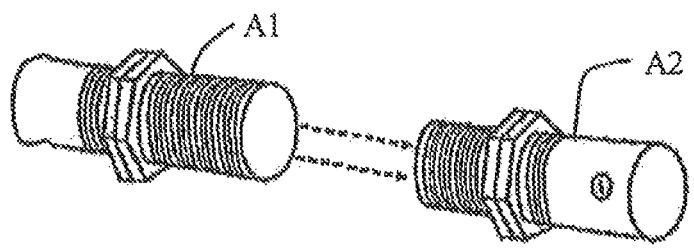
FIG. 21A-D show various photoelectric sensor types.

Also, the preferred sensing means is a photoelectric sensor when, in general terms, is a device that uses the light emission principle, and is often combined with an electronic circuit and typically comprises an emitter or luminous source (typically a visible (e.g., red) light or infra red wave length emitter), the rays of which are detected by a receiver. The variation in luminous signal, obtained upon interrupting or blocking free dissipation or extension of the generated rays, is converted into an electrical signal and is measured and used by the electrical circuit. Photoelectric sensors come in a variety of forms. For example, FIGS. 21A to 21D illustrate some featured embodiments for sensors 3100, 3102. FIG. 21A illustrates a through beam type sensor wherein the emitter and receiver are contained in separate housings. When properly aligned, the light beam travels from the emitter to the receiver. An object breaking the light beam causes the receiver to change the state of the output contacts. While this embodiment is available for use under the present invention, in view of the two independent housings requirement A1 and A2, this is less preferred relative to preferred embodiments of the invention.

Figure 21B:
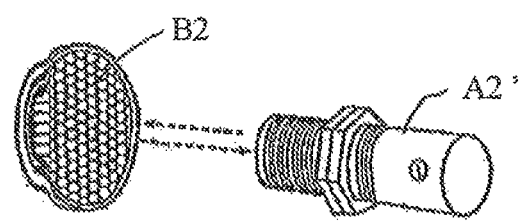

FIG. 21B shows a retro-reflective type sensor wherein the emitter and receiver are contained in the same sensor housing. This type of sensor uses a reflector to reflect the light beam back to the sensor. When an object passes through the light beam, the receiver changes the state of the output contacts. This type of sensor has the potential for being "fooled" when sensing highly reflective materials. If this is a suspected environmental problem a polarizing filter can be placed in the light beam in an effort to prevent false light signals from the reflective materials triggering the sensor. For example, when detecting shiny objects with retro-reflective type sensors, a polarizing filter can be helpful in preventing "false" tripping. Polarizing filters are transparent to light in only one plane and absorb light in all other planes. When using the retro-reflective type sensors and polarizing filters, the two filters should be set at 90 degree rotation in relationship to each other. This facilitates the light beam reaching the sensor receiver. However, from the standpoint of having an added external reflective component as part of the sensor assembly, it is also not the most preferred embodiment of the present invention for most intended uses.

Figure 21C:
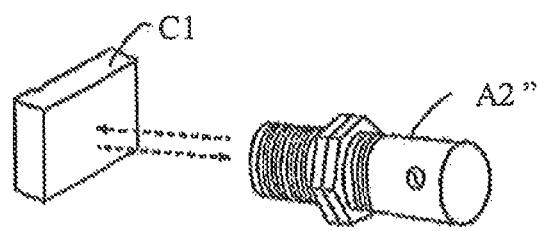

FIG. 21C shows a diffuse type sensor wherein the emitter and receiver are contained in the same housing. This type of sensor emits a beam of light which is not returned to the sensor. When the target is placed in the light beam the beam is "diffused" in many different directions. One of the directions is back to the sensor. If the intensity of the return beam is sufficient, the receiver "senses" the light and transfers the output contacts. As explained below, this type of sensor represents a preferred embodiment for sensing whether or not the film of the bag being formed is passing along past the dispenser main housing as in most embodiments of the invention the avoidance of a separate sensor component which, relative to FIB systems, avoids presenting an additional component that might be subject to in the harsh environment associated with an FIB system.

Figure 21D:
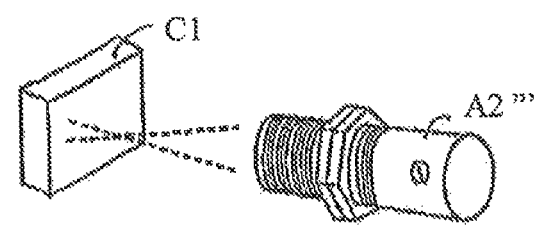

FIG. 21D shows a convergent type sensor wherein the emitter and receiver are contained in the same housing. This type of sensor is a specialized version of the diffuse type sensor. The emitted light beam is tightly focused at a fixed distance from the sensor. This type sensor can be used to detect transparent objects and thus is also suitable for sensing film web and may be desirable for some material spill avoiding dispenser system 1000 set ups.

Fiber optic type sensors are also illustrative of the subject matter of the present invention although not shown in FIGS. 21A to 21D. Fiber optic sensors are used where space is at a premium or the environment is hostile and thus are illustrative of a possible sensor type. Plastic fibers have the unfortunate characteristic of absorbing most bands of infrared light and are thus more applicable for transmitting visible light.

Figure 22A:
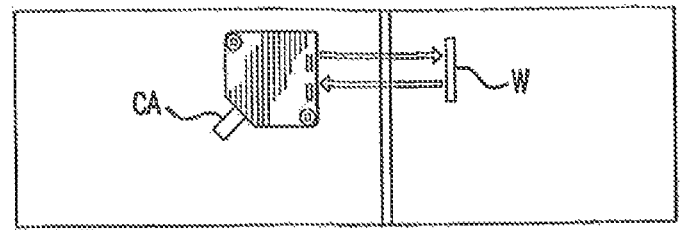
FIG. 22A-D show additional views of photoelectric sensor types in association with a film web material (e.g., a schematically shown partially formed bag)

FIGS. 22A to 22D illustrate relationships of film web presence in the field of a variety of photoelectric sensor types such as those described above. FIG. 22A illustrates the film web (e.g., that used in forming the bag material being detailed) as the reflecting surface (or diffusion generating surface) in the illustrated direct reflection type photoelectric sensor which represents a preferred embodiment as it provides for a minimization, of components (e.g., components that could be subjected to a foam up due to some other error than a film feed error) while being sufficiently sensitive to pick up film web presence or non-presence. Thus when the film web is not present the diffusion or reflection feedback is not sensed triggering a signal as described below.

Figure 22B:
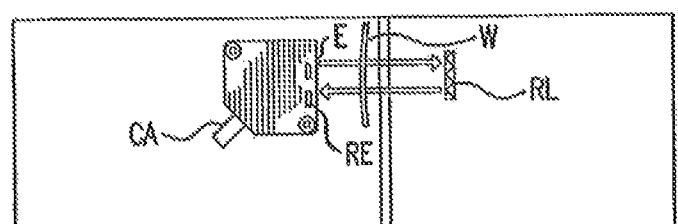
Figure 22C:
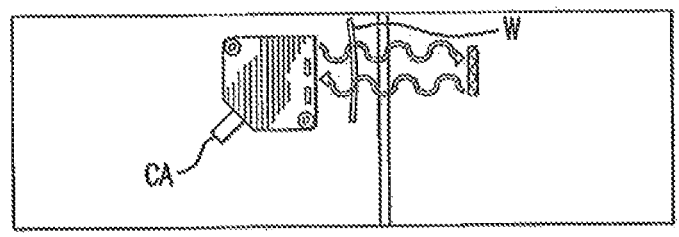

FIG. 22B illustrates an alternate embodiment featuring an emitter E and receiver which receiver RE receives reflected back electromagnetic waves as in light or infra red rays from the reflector RL. Thus when the web is positioned in front of the emitter the amount of reflected back energy is at a reduced level as compared when there is no film and there is a direct reflect back arrangement which is detected by the electrical circuit of the sensor. This embodiment involves the placement of a reflector on a support structure of the dispenser system as on a frame structure supporting the dispenser housing. FIG. 22C is similar to FIG. 22B but has a polarized arrangement having the benefits described above.

Figure 22D:
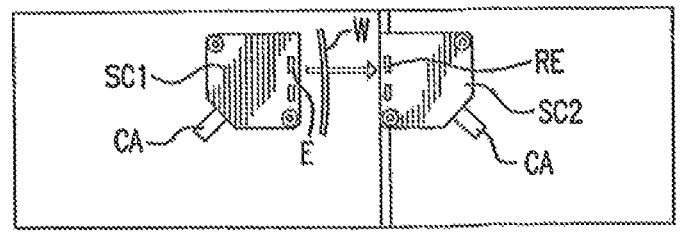

FIG. 22D shows an additional embodiment wherein the emitter E is on one of the sensor components SC1 and the receiver is on a second sensor component SC2 with each preferably having its own communication and power source cable CA. Again the presence of web W lessens the energy transference level to the receiver RE which can be detected so as to enable the appropriate logic sequence for the dispense material blockage logic control as described below.

As noted above, FIG. 14 shows a proper feeding of the front and rear web sheets WF and WR relative to the dispenser housing 194. As seen from these figures, the film is either touching or closely draped (less than 2 inches and more preferably 1 inch or less as in 0 inches representing a direct housing surface contact in the sensing area range) over the front and rear surfaces of dispenser housing 194. The film webs then converge into the nip location.

FIG. 17 shows a cross-sectional view of mixing module cartridge 256 having reciprocating rod 814, which, in this embodiment, functions as both a valving rod and a purge rod relative to chemical flow entering via chemical passageway 816 (only one of the two being shown in FIG. 17 although dispensers with only one type of source material are also featured under the present invention) into mixing chamber 815 of mixing chamber housing 818 preferably formed of Teflon material and compressed between the removable front cap with solvent feed passageway 820 and ported compression disk 822 that is placed in compression by stack 825 of Bellville washers held in position by rear cap 824 threaded into a threaded recess of mixing module housing 826. Thus upon motor 200 and the associated transmission functioning to reciprocate rod 814, it can be retracted back to open passageway 816 whereupon foam precursor chemicals A and B are mixed and then dispense out of outlet opening 258. A controlled return of the rod leads to a closing off of the chemical passageways as well as a cleaning or purging out of any remaining chemical in mixing chamber 815.

FIG. 23 illustrates an example of a chemical dispensing and tip cleaning control sub-system utilized in a material spill avoiding dispense system 1000 and having spill prevention control means 3005 for providing material spill prevention aspects in conjunction with, for example, a FIB system. In a preferred embodiment spill prevention control means includes control board 828 with logic board 830 and processor 832 which receive inputs as in FIB operation associated inputs such as signals or information as to motor 200 status (tach and fault detectors) and, direction of motor travel (e.g., facilitates having a single transmission system 206 function to reciprocate the rod during one direction of travel and reciprocate a cleaning brush BR during another direction of rotation), motor braking when, for example, a different subsystem (not shown) detects an upstream film jam or run out of film, based on, for example, web tension and a motor enable output. In the illustrated embodiment both the brush position and rod position in mixing module 256 are intended to be monitored at all times once operating as in direction of travel and position unless there is an error in the system as described above. Also home sensors (856 and 858) are preferably mounted to monitor the position of the brush and rod relative to a home position (preferably through sensing corresponding transmission sections and their position relative to a pre-set home position). FIG. 23 further illustrates the inclusion of the above described material spill prevention system 3000 and its association with for example, spill prevention action means (e.g., a chemical flow preclusion output generator 3006 communication with shut down means 3010 to prevent chemical flow when the film positioning is determined not to be in accordance with preset specifications). In the illustrated embodiment, shut down means 3010 provides a non-enablement director signal for precluding motor running (and reciprocation of rod 814 into a chemical release into mixing chamber state when the rod is already in the blocking state (which is typical for most start ups but can be a problem as described above) or is moved to that position if not presently in that state)) when the film positioning is deemed not sufficient to provide for a non-spill situation or potential spill situation. This being despite an operator directing a start up of a dispensing cycle which includes motor enablement. Preferably the non-enablement or chemical flow prevention state is supplemented with, for example, problem communication means 8036 as in a written (display screen), audible and/or illuminated signal as to status of no chemical flow due to sensed improper film set up relative to dispenser release. A variety of other spill prevention control systems are also featured under the present invention which as explained above can be used to prevent the release of material out of the dispenser (e.g., an electrical system shut down, upstream blockage of chemical flow, a control routine requiring a second push button pressing with prior indication of need for operator film feed check, any combination of the above etc.)

As an example of a foam up prevention system in operation, there is described below a bag forming start sequence and an associated detection sequence designed to preclude foam dispensing when the proper positioning of the film material is not sensed. That is, at the start of a bag making cycle (e.g., upon an operator depressing a selected bag size button as described in PCT Publication No. PCT/US04/ 14516 which is incorporated herein by reference), the machine control unit checks the sensor status. Again, there is preferably one sensor for each side of the film's width on a common side and if either one fails to detect the proper film presence situation the machine goes into non-dispense mode). Correct passage (and/or separation of film within the machine) will result in both sensors "seeing" a reflection of their emitted light off the film as shown in FIG. 17 (or a clear spacing). If both sensors detect the proper film situation, the machine will continue its bag making cycle and, if not, the bag making cycle and chemical feed system are precluded from activation until the system is deemed to be properly operating. For example, a sequence of steps that are monitored by the control unit in a preferred embodiment of the present invention include:

1) Has the bag making cycle been initiated by the operator (e.g., has the operator initiated the start button)?

2) If so, is each sensor of the spill prevention system sensing the presence of film material (e.g., has the film passed by the sensor(s) within a preset period of time and/or has a clearance region been shown to the sensor(s) to confirm proper bag separation)?

3) If not, preclude initiation or discontinue precursor chemical to bag supply cycle and send out warning signal (e.g., preclude rod movement from a closed state in not yet opened or move valve rod back to a closed state if foam precursor supply cycle has started and shut down other supply sub-systems).

4) If so, allow chemical precursor supply means and film feed and edge sealing formation cycles to continue.

As seen, the above sequence operates under the notion of the material dispenser having a closed or shut dispenser outlet passage (advantageous in systems such as the described FIB system with pressurized lines) and at initiation and thus there is not needed a shut-off dispenser outlet step upon problem detection or if foam precursor supply has started the valve rod is rapidly moved to shut off. The system can be made to work in either fashion with the former providing added security against spillage but at the expense or a reduction in the bag making cycle time which the other technique favors.

If a problem is detected, the initial enablement or initiate cycle turn on button is reset requiring a similar run through of 1-3 or 1, 2 and 4 above depending on whether the film feed or other problem associated with the lack of proper film passage sensing has been corrected after the above discontinuation. If there is required, for example, more than 2 resets a service signal is preferably generated as there is likely an internal problem with the sensing system assuming the film is fed correctly in accordance with for example the schematic of proper film feed provided in sticker form on the front of the dispenser housing as shown in FIG. 20. In addition, there is preferably a self diagnostic system interfacing with the sensor(s) and the control unit which also triggers a non-enablement mode until the sensing system is properly operating.

In a preferred embodiment, two sensors are utilized to provide the vision intelligence necessary to monitor the process in the bag making cycle as in points 1 and/or 2 described above. Sensors 3100 and 3102 are for example miniature Keyence Model PZ-V12 state sensors which are connected via wiring (e.g., pigtail connection) to the control unit. These solid state sensors have either an NPN (current sinking) output cabled hook up or are sensors with an PNP (current sourcing) output cabled hookup and which come in either light operate (N.O.) or dark operate (N.C.) models. In a preferred embodiment a diffusion sensor utilized as in one that involves visible red light and also features a red LED signal means which signals when film is present (or, optionally, when film is not present) by way of the LED light that is provided on the rear side of the main body.

The photoeye sensor system 3001 offers two modes of protection in a preferred embodiment which includes the above described point 1 leading edge detection and a point 2 detection of finished bag removal.

As an example of point 1 leading edge detection, the photoeye sensor system 3001 detects that the leading edge of the film bag making process, with the leading edge of the film corresponding to the bottom of the bag that is being made, is properly moving through the system in a timely fashion.

As a more specific example of a point 1 leading edge detection shut down system operation in an FIB system, the following example is provided. At the start, a machine operator depresses a bag making button to initiate the making of a bag, the leading edge of the film is located about 1.25 inches above the sight line of each photoeye. Once the film starts moving at the beginning of the cycle, it achieves a top speed of about 12 inches per second almost instantaneously, as the film drive motor accelerates to full speed in less than 40 milliseconds. At this rate, the leading edge of film should cross the line-of sight of both photo-eyes about 100 milliseconds after the bag making cycle is initiated. Thus, after the leading edge of the bag moves at least 1.25 inches, if the film feed is properly functioning, the leading edge should cross the sight line of both photoeyes, and both sensors should detect the presence of film. In a preferred FIB embodiment the film drive motor is equipped with an optical encoder, so that the FIBs CPU or control unit knows how far the film web has traveled with an accuracy of about +/−1 inches. If both photoeyes detect the presence of film after the web is considered to have moved 1.75 inches per the encoder output, then the bag making cycle is considered normal and will be allowed to continue to completion. Preferably the system is designed to wait for an extra amount of payout beyond the distance between the leading edge of film and photosensor plane, before deciding whether to initiate a shut down, as in an embodiment wherein the system awaits for an extra 0.5 inches after the 1.25 inch minimum before deciding whether or not to activate the shutdown. Thus, in a preferred embodiment, system software or hardware is programmed to wait for an additional 0.50 inches of film travel, past the 1.25 inches which is the above noted minimum travel required to the sight line each photoeye, before activating the controlled shutdown procedure. If one or both photoeyes do not detect the presence of film after the leading edge should have traveled 1.75 inches, the system will perform a rapid and controlled shutdown.

A preferred shutdown procedure is as follows:

1. The dispenser mechanism closes the valving rod on the mixing chamber as quickly as possible (or precludes pull back of the valve to an open state if the foam precursor supply is delayed after the to be formed bottom of bag seal is formed—although an immediate supply start just after the bag bottom is formed and during the movement of the bag leading edge down is preferred relative to the need for rapid production versus the % of time a jam or improper separation occurs).
2. The Pumps Motors are turned off.
3. The Bag Making Buttons are disabled.
4. The film Feed is halted.
5. The Moving Jaw Motor is disabled.

This early detection and rapid shutdown will not prevent a foam-up completely in all instances, but any foam-up that does occur will be very small, generally contained within the bottom of the bag, easy to remove and clean, and will not extensive damage the machine as in a typical uncontrollable foam-up. Again, this trade off is deemed desirable in most instances where speed of the bag making cycle outweighs the potential for spillage, which spillage level is reduced by way of the present invention if not entirely prevented.

In the second or point 2 detection there is also preferably involved the same photoeye sensor system 3001 is utilized (preferably the same sensor system relied upon for both point 1 and point 2 detection as in a sequential logic review or a more simultaneous logic review by the control unit). In a point 2 detection sequence, sensor system 3001 is used to detect whether the completed bag has cleared or not cleared from the bag output area (located at the bottom of the bag making module) as bag clearance should occur upon completion of the last bag making cycle. In the instance where proper bag clearance is not sensed by the two sensors, the machine will not make another bag, until both photoeye sensors detect that the "stuck" bag has been removed from the bag output area by seeing "clear". This will prevent the marked dispensing system from making more bags if the last bag is stuck or hung up on the jaws for any reason so as to greatly minimize the risk of massive foam-up. In addition, in a preferred embodiment if the operator has depressed the bag buttons multiple times to obtain more than one bag, the bag button commands will be deleted from system memory whenever a "stuck" bag is detected. In a preferred embodiment, after the "stuck" bag is removed and both photoeyes are clear again, the operator is made to depress the "Cancel"

button or similar clearing of former commands means on, for example, the user interface panel, in order to proceed with normal machine operation. When this shutdown occurs, the operator is alerted by a text message at the control panel (or alternate communication technique), which must also should be manually cleared before the machine will restart the process.

New machines in production can easily be equipped with the material spill prevention system 3000 of the present invention. Additionally, retrofit assemblies are available for easy and quick installation on existing machines.

Figure 25:
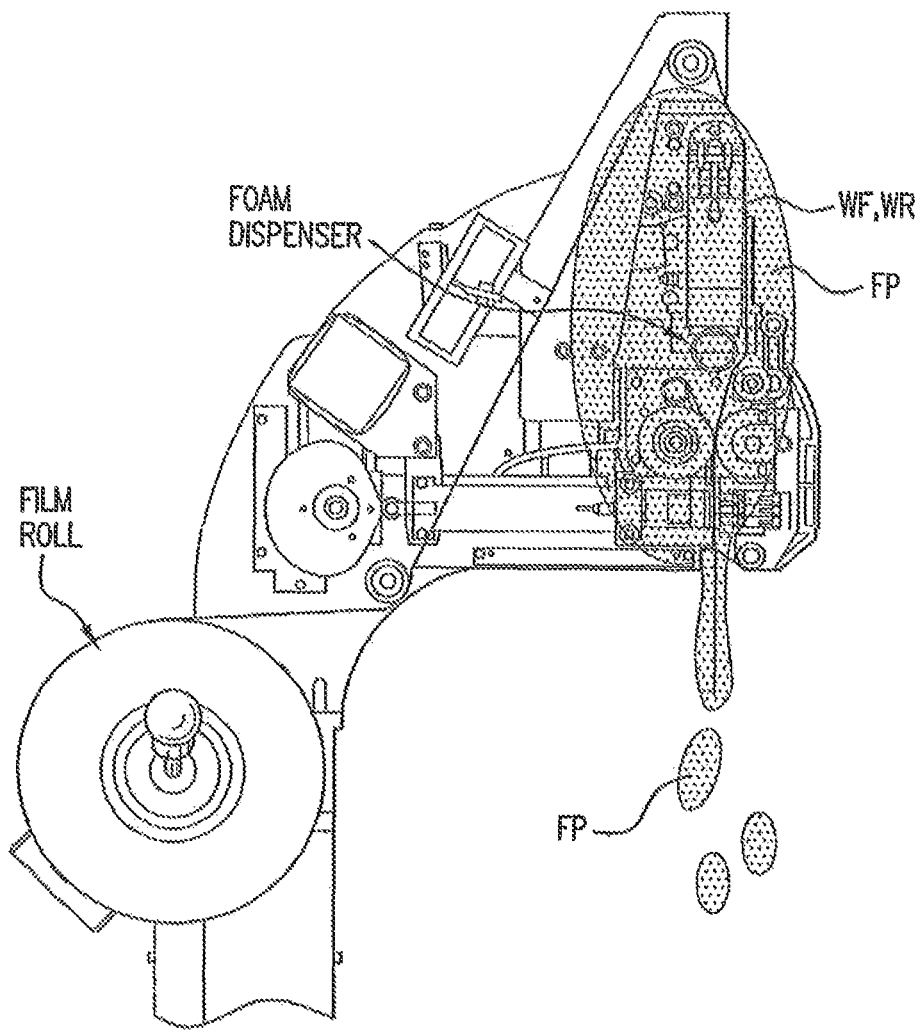
FIG. 25 shows a schematic end view of an improper film feed for a C-fold film source and an on going foam-up.
Figure 26:
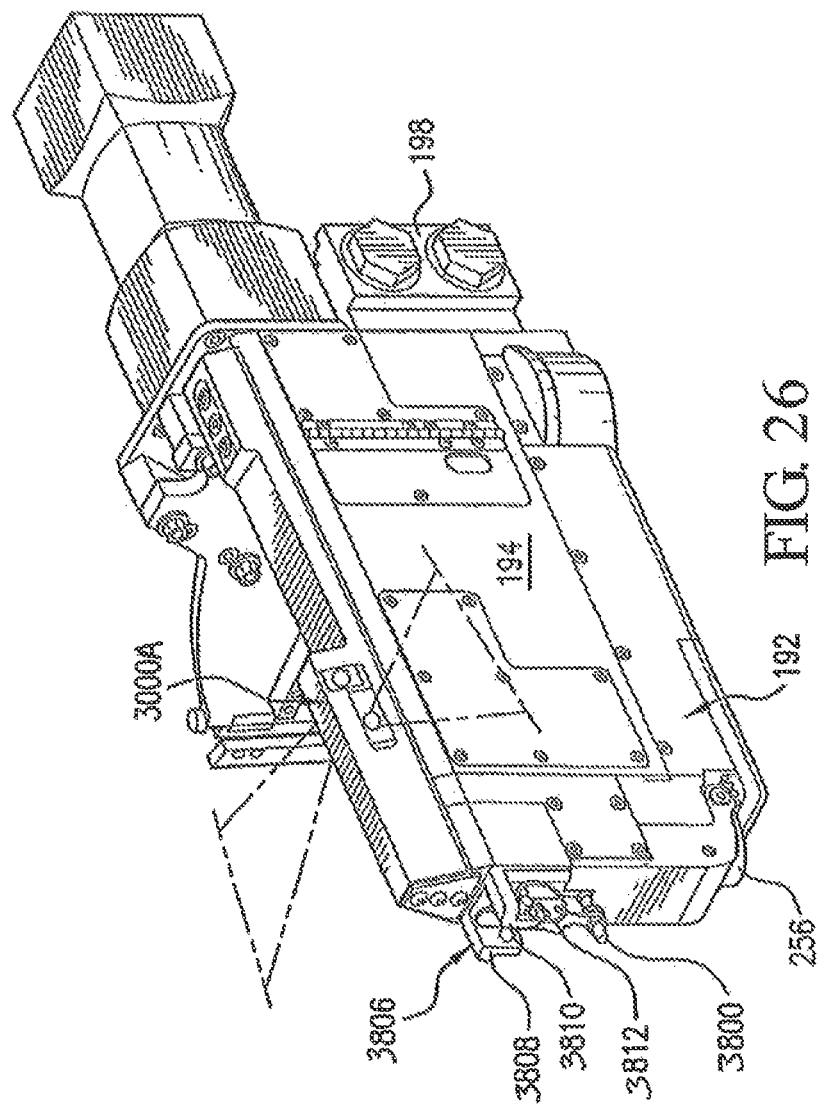
FIG. 26 shows a perspective view of the dispenser assembly with installed material spill prevention system showing proper positioning sensing by the material spill prevention system.

A second embodiment of the present invention features material spill prevention system 3000A (FIG. 26). To better appreciate features of material spill prevention system 300A reference is made to FIGS. 14 and 25 wherein there can be seen properly fed film webs WF, WR to opposite sides of the dispenser assembly 192 (as shown in FIG. 14) versus an improperly fed film web set wherein, as shown in FIG. 25, both webs WF, WR are fed to only one side of the dispenser (typically the misplacement is at the front of dispenser assembly 192 as there cannot be readily seen (particularly when opaque or darker web film is utilized) the relationship of the rear web relative to the dispenser housing).

FIG. 25 also illustrates the problematic release of foam precursor FP to regions external to a non-formed bag due to the film web misplacement and into the other components of the foam-in-bag ("FIB") dispensing system 20 as in the film driving and electrical components for seal formation and sensing means for sensing various parameters of the foam-in-bag dispensing system. While the above correct feed/incorrect feed comparison is made with respect to a C-fold film a similar feed "incorrect feed" problem can exist with other film types as where a two roll, independent film web arrangement has both webs fed to only one side of the dispenser or a similar incorrect feed for a post slit to be film material source or two independent webs rolled together on a single, common roll.

FIGS. 26 to 35 illustrate material spill avoiding dispensing system 1000A comprising material spill prevention system 3000A in use with a material-in-bag dispensing system as in the foam-in-bag (FIB) dispensing system comprising dispenser assembly 192 and bag forming assembly 64. It should be noted that while the various material spill prevention systems described herein are generally described alone on a dispenser they can be used alone as part of a dispensing system or in any of the potential sub-combinations of the various types of material spill prevention systems described herein (above and below) or all together on a common dispenser system. Spill prevention system 3000A is particularly useful in systems such as the above noted "FIB" dispensing system where there might be a highly disruptive foam-up situation (since typical foams are fast adhering, difficult to remove once set, and, due to their expansion, can extend throughout the various nooks and crannies of the system), although any spill of material whether adhering or not is undesirable. In a preferred embodiment, wherein material spill prevention system 3000A is used in conjunction with a FIB dispensing system 20 having bag forming assembly 64 to provide material spill avoiding dispensing system 1000A, spill prevention system 3000A is, preferably, mounted to an upper region UR of the main body 194 of dispenser assembly 192.

Figure 35:
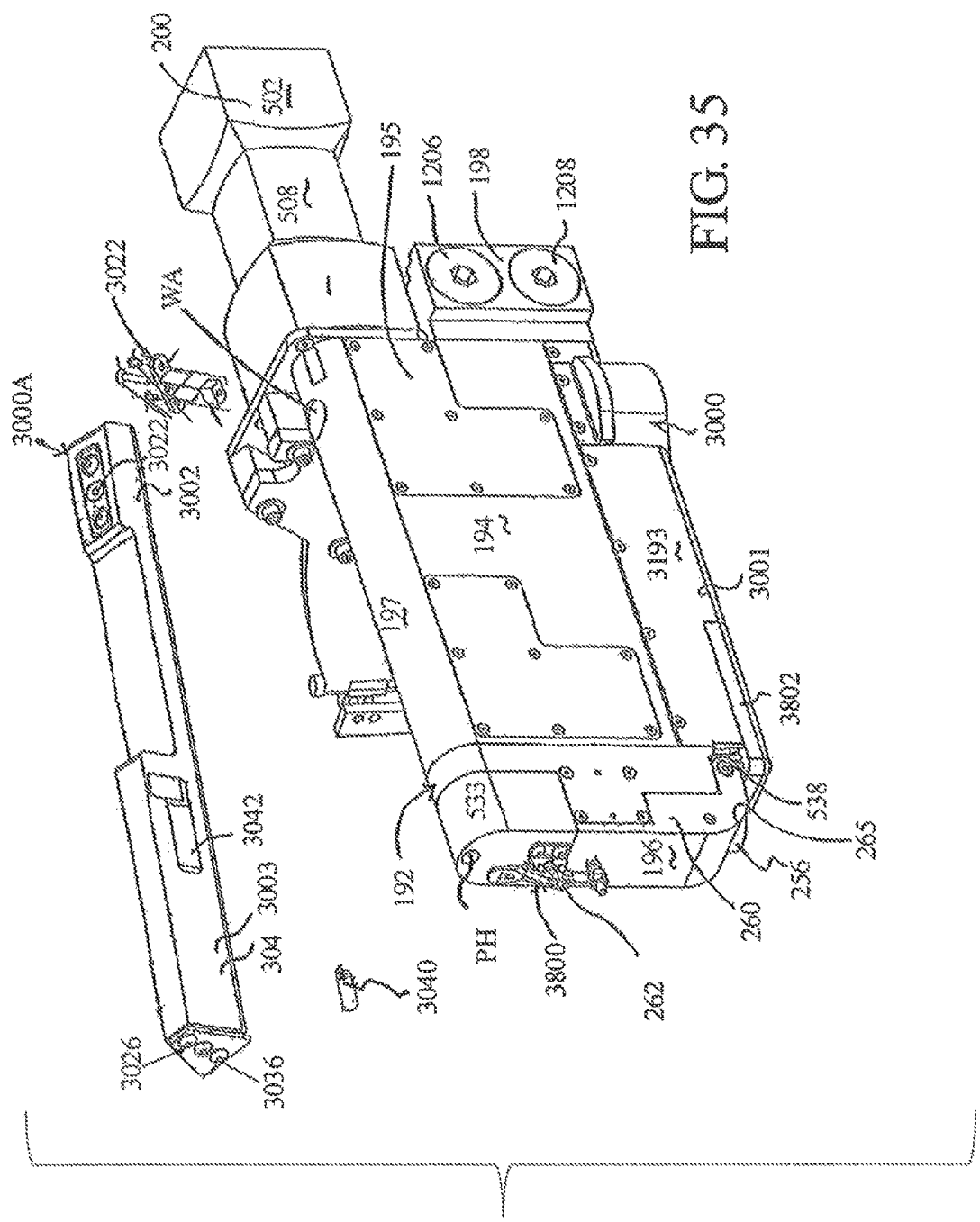
FIG. 35 shows in exploded view the attachment relationship between the sensor assembly and the dispenser housing's main body.
Figure 36:
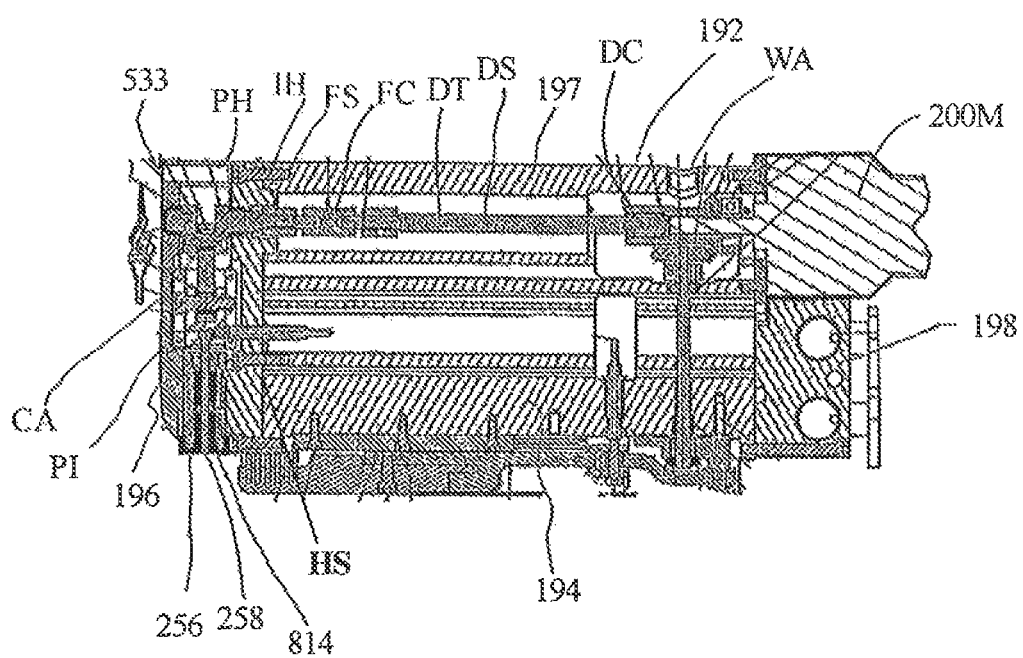
FIG. 36 to shows a cross-sectional view through the main body of the dispenser in FIG. 35.

FIG. 35 illustrates spill prevention system 3000A in a to-be-mounted state relative to main body 194 of dispenser assembly 192 (or a just released state). This mounting technique for spill prevention system 3000A is preferred as it facilitates early stage sensing and allows for unobstructed film travel and is a web separation promoting placement (as well as an easier retrofitting of pre-existing dispenser assemblies position). FIG. 36 shows a preexisting dispenser assembly configuration to which an embodiment of the material spill prevention system can easily be retrofitted. The subject matter of the present invention includes, however, other mounting techniques that are suitable for sensor detection as to whether the film webs are properly positioned for bag formation. For example, while the above situated mounting with front/back sensor orientations is preferred (e.g., provides a more universal film type embodiment) a forward looking sensor orientation (e.g., directed at the inside "V" surface of the separated C-fold film running past the forward free end of the dispenser) is an example of another representation of subject matter of the present invention.

Figure 32:
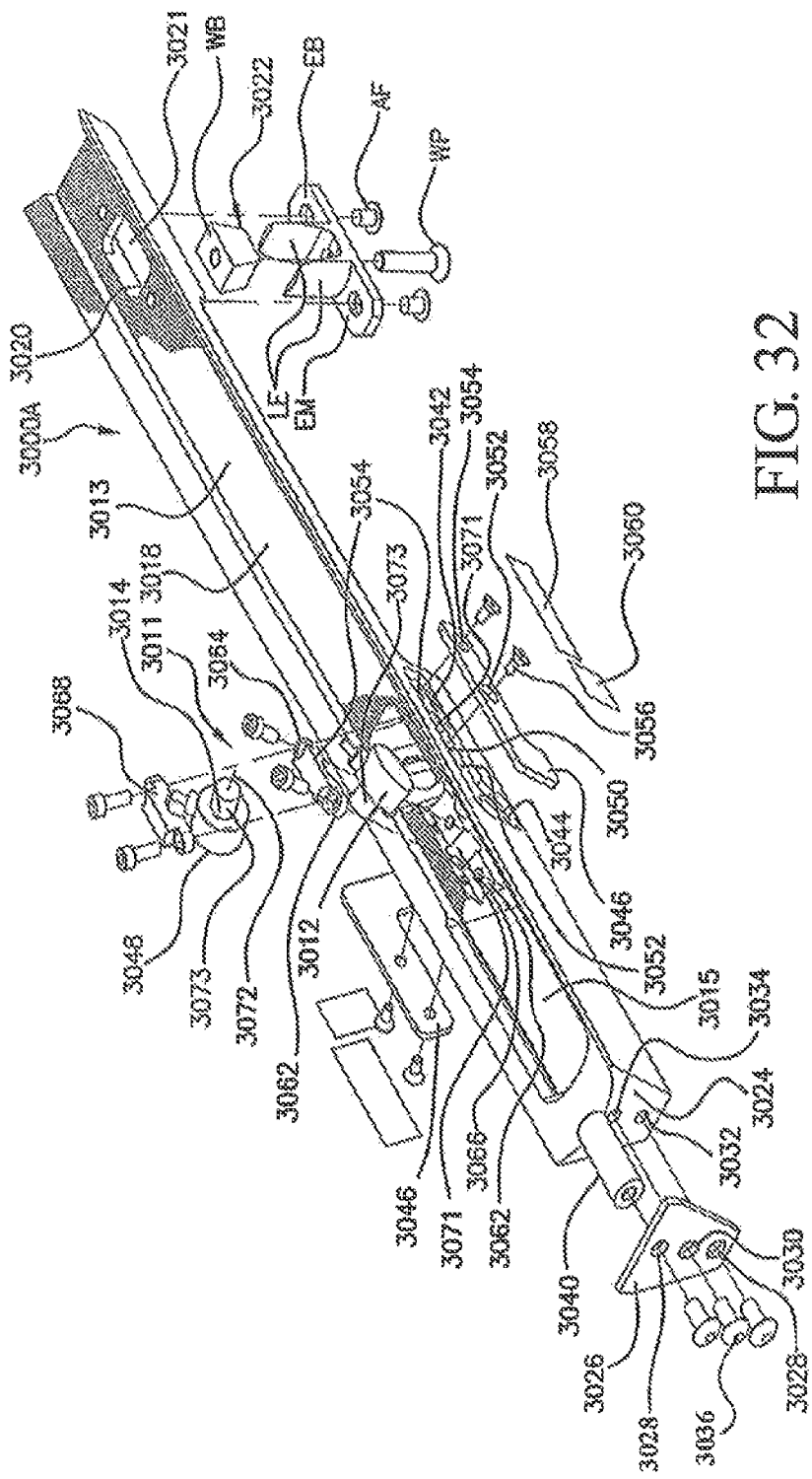
FIG. 32 shows an exploded view of an embodiment of the spill prevention system of the present invention.
Figure 33:
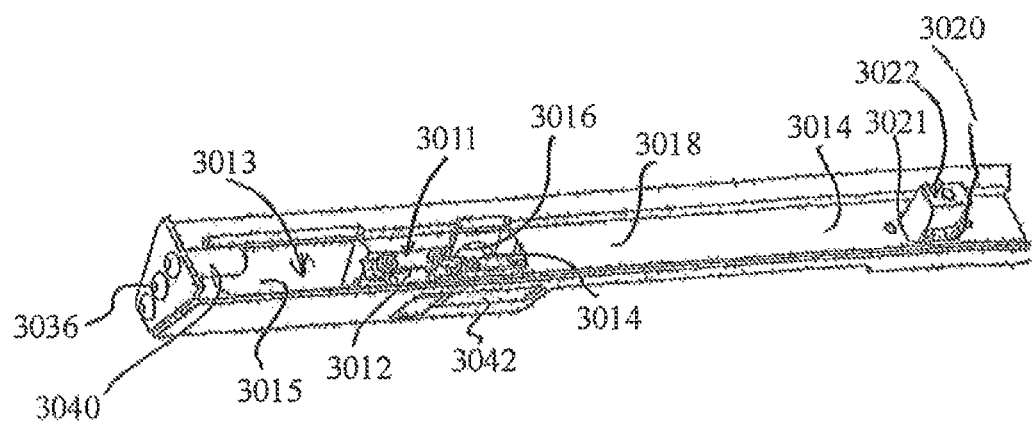
FIG. 33 shows a perspective bottom view of the spill prevention system of FIG. 32 in an assemble state.
Figure 34:
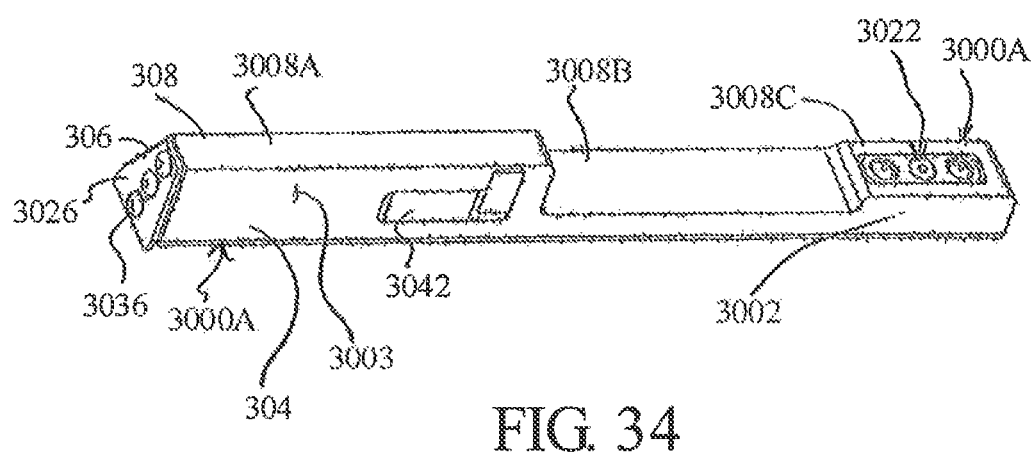
FIG. 34 shows a top perspective view of that which is shown in FIG. 33.

FIGS. 26 to 30 illustrate spill prevention system 3000A following its mounting on main body 194. As seen from FIGS. 32 to 34 showing prevention system 3000A alone, spill prevention system 3000A includes casing 3002 with the casing shown featuring an up-to-down expanding surface as in a downwardly diverging structure 3003 or a convex structure which facilitates the proper front/back feed separation of the film webs in going from an upstream web-to-web direct contact state to a downstream first web to front dispenser housing surface and a second web to rear dispenser housing structure state. Thus, the present invention's casing structure is designed so as to maintain the advantages described in U.S. patent application Ser. No. 10/623,720 filed Jul. 22, 2003 and entitled Exterior Configuration of A Foam-In-Bag Dispenser Assembly of facilitating a smooth separation period of film travel relative to the dispenser housing, which is incorporated herein by reference. Casing 3002 is shown as having tapering walls 304 (illustrated front sloped wall) and 306 (illustrated rear sloped wall) extending down from top wall 308 having various top wall sub-sections 3008A, 3008B, and 3008C defining various height levels with section 3008A providing the top for a casing sub-section designed for film web sensing assembly 3011 which provides sensing means for detecting the proper presence of film webs to the front and rear of the casing 3002 (or alternatively film web sensing assembly 3011 can rely on a rear film presence sensor in conjunction with an operator visual confirmation of front film location or a forward for V-shaped cover over sensing when using C-fold and the like as well as other detection arrangements such as the above noted V-fold monitoring). In a preferred embodiment featuring a non-operator reliance based safety film feed start-up preclusion system, there is provided both front and back film web sensors as in film web sensors 3012 (front) and 3014 (rear). This allows for an added degree of assurance as to a proper feed system and can sense the web presence and proper feed positioning particularly even when there is featured an outer housing or casing over the dispenser assembly that covers over the film feed at some point as illustrated by HO in FIG. 1.

As best seen from FIGS. 32 to 35, the tapering walls and various levels of the top wall sections 3008A, 3000B and 3000C define interior hollow 3013 which includes free end sub-casing section 3015, sensor sub-casing section 3016, intermediate sub-casing section 3018 and locking sub-casing section 3020. As seen from FIGS. 22 and 23, the respective depths of the various sub-casing sections vary across the elongation direction of the casing 3002 with free end sub-casing section 3015 which facilitates hand manipulation during installation or servicing of sensors 3012, 3014. Sub-casing sections 3015 and 3016 extend the deepest (and thus represent the highest extending outer, upper portion of the sensor system 3000 when the casing is mounted). Sensor sub-casing 3016 has sufficient space to accommodate the sensor assembly 3012 and has internal mounting projections for receiving the sensors and their respective securement means. Intermediate sub casing section 3018 is the one least in depth and thus lower in height. The locking subsection 3020 is the thickest in material and has a centralized aperture 3021 for receiving a component of mounting assembly 3022. Casing 3002 further includes free end section 3024 covered over by end plate 3026 having a pair of holes 3028 and 3030 that align with holes 3032 and 3034 in free end section 3024 for securement via fasteners 3036. End plate 3026 further includes aperture 3038 for receiving one of fasteners 3036 for securement of pilot 3040 extending inward in cantilever fashion below the casing 3002. That is, as shown, pilot 3040 extends off of its attachment location with the free end of plate 3026 back toward the opposite end of casing 3002 so as to extend in cantilever fashion at a location spaced from the rim region of the casing defining the mouth opening of cavity 3015. This spacing of pilot 3040 from the bottom rim region (when in its final securement position) of casing 3002 is designed to provide for ready insertion of pilot 3040 into pilot hole PH shown in FIGS. 35 and 36. Pilot hole PH is a feature of the preexisting dispenser housing design shown in FIG. 35 and in the preexisting design functioned as a securement access hole for fastener FS. In the present invention, pilot hole PH provides a convenient location for the partial lock down provided by pilot 3040 upon insertion into hole PH either during a retrofit process or a new product manufacture process. Casing 3002 is further locked down onto the upper wall region 197 of dispenser housing 194 by way of mounting assembly 3022 which conveniently is insertable into access aperture WA formed in the preexisting dispenser main housing as an access port for the illustrated transmission in FIG. 25A. In a preferred embodiment, illustrated in FIG. 22, mounting assembly 3022 comprises expansion means EM having expansion base EB and wedge block WB with casing attachment fasteners AF and wedge pull fastener WP. When mounting assembly 3022, casing 3002 can be readily locked in position by inserting pilot 3040 and lowering mounting assembly 3022 through aperture WA while the wedge is not yet tightened down. Once inserted, the threading of fastener WP causes the legs LE of expansion base EB to widen and fix casing 3002 into position relative to dispenser housing 94. Various other mounting means other than the combination of pilot 3040 and mounting assembly 3022 are also featured under the present invention as in an integrated or monolithic casing with, preferably, hatch ports for sensor insertion, direct threaded fastening, adhesion expansion plugs, any combination of the same, etc.

With casing 3002 properly mounted to the sensor system by the above described mounting means comprising mounting assembly 3022 and pilot 3040 is ready for operation. That is in the section of wall 3006 extending with top wall section 3008A there is provided sensor view window 3042 which provides a view port for the preferred photoelectric sensor technique although alternate sensing means (e.g. a magnetic or sound wave or heat dissipation or vibration sensor or electromagnetic wave generator, etc sensor) are featured under the present invention and which may or may not involve a sensor window (e.g., a magnetic wave sensor behind a solid casing wall 3006). In a preferred embodiment, sensor view window 3042 comprises view recess section 3044 which has an "L" shape in the illustrated embodiment and view insert 3046 conforming in shape and thickness to recess section 3044 and formed of a material well suited for the sensor involved (e.g., a transparent plastic view plate for a photoelectric sensor). A direct access of sensor to environment without cover represents an alternate embodiment of the present invention with there preferably being some sort of protective covering as in one integral with the sensor itself and a suitable uncovered access aperture provided in casing 3002.

As seen from FIGS. 32 and 33, the view output of sensor 3014 (front side oriented in FIG. 24) with central view axis line 3072 has its housing extension 3073 received within casing port 3071 formed in the base or backing wall 3050 of the long leg recess section 3044 (one on each side only one visible). Also, the rear surface 3048 of the main body of front sensor 3014 is aligned such that the extension of central line 3072 to the rear of the sensor is centered within the short leg section of L-shaped view window 3042 (see FIG. 31). Backing wall 3050 has fastener thread holes 3052 and 3054 that are aligned with thread holes 3052' and 3054' for securement of view insert 3046 via fasteners 3056. The thickness of view insert 3046 is designed to present a smooth surface to a web traveling over a face of dispenser 192 (either a recessed or co-planar arrangement that avoids a step-out) to enhance the low friction relationship between the sliding web and the dispenser (see the discussion in PCT publication No. PCT/US04/014423 which is incorporated by reference). For example, in a preferred embodiment, the long and short leg extensions of the L-shape view insert 3046 conform to the periphery of the recessed section 3044 and the depth of the recessed section 3044 conforms or is more than the thickness of the view insert. That is, the depth of the recess in the casing is such that an essentially flush arrangement is provided so as to avoid a disruption in the film material sliding thereover in the preferred embodiment. Also, in a preferred embodiment there is further provided window taping as in the illustrated tape layers 3058 (long leg conformance) and 3060 (short leg conformance) which is of a low friction material to enhance the noted low friction, wrinkle development free environment for the film web being passer thereover. The tape also covers over screw fasteners 5056 to avoid any sharp edge surfaces and is preferably transparent such that an operator can see the preferred rear of sensor light (e.g., LED) which is indicative of, for example, film material detection by the applicable sensor(s) (while one sensor to the front and back is considered sufficient for most uses, additional sensors having, for instance, a common direction of view are featured (e.g., an added back up sensor on a common side) of the dispenser housing.

In the opposite wall 3004 a similar "L" shaped sensor view window 3042' is provided which is the same as that of 3042 with the exception that it is arranged such that its short leg (upward extending) is closer to end plate 3026 rather than the opposite arrangement for the view window 3042 on opposite wall 3006. In this way, the shorter leg for each window is aligned with the corresponding sensor's central axis extending out away from the rear surface of the main body and the sensing axis of the sensor extends through the central region of the long leg extension. A similar conforming view insert and taping arrangement is also provided as explained above for the view window 3042 provided in front wall 3006.

FIGS. 32 and 33 illustrate the sensor and sensor mounting arrangement for the illustrated preferred embodiment of the present invention. As seen, front wall sensor 3012 is held in place by a securement device 3064 which in the preferred embodiment is represented by a clamping assembly comprising base support 3066 which is preferably an integral component of casing 302 (e.g., molded together with the casing or machined out of a larger casing material block) within the floor of the cavity in sensor sub-section 3016 in combination with clamp yoke 3068. Base support 3066 is shown as having a depression designed to conform to the sensor's smaller housing extension cylindrical extension 3073 configuration. Clamp yoke 3068 also includes a depression designed to conform to and receive the cylindrical extension 3073 of sensor 3048. Both yoke 3068 and base support 3066 have facing wing extension sections 3062, 3062'. Each wing extension in the yoke and casing base section features threaded apertures for releasable securement of the yoke (and hence the sensor) via fasteners 3070.

Sensors 3014, 3016 are thus firmly held in place via their respective yoke and base combinations so as to avoid vibration loosening and misalignment of the view axis and yet each is readily removable for servicing. In addition, with the above described arrangement, the view lens of the preferred photoelectric sensor is kept free of contamination. Sensor 348 is preferably a photoelectric sensor although other sensing means for sensing the presence or not of a properly fed film web is also featured under the present invention such as an induction sensor, pressure sensor, heat sensor, etc. In a preferred embodiment the sensor 3048 is a photoelectric sensor.

As noted above, FIG. 14 shows a proper feeding of the front and rear web sheets WF and WR relative to the dispenser housing 194. As seen from these figures, the film is either touching or closely draped (less than 2 inches and more preferably 1 inch or less as in 0 inches representing a direct housing surface contact in the sensing area range) over the front and rear surfaces of dispenser housing 194. Accordingly, photoelectric sensors as in a diffusion type sensor (relies on only one sensor component that can be internalized within casing 3002) are well suited for sensing misfed film in a foam-in-bag assembly.

Figure 16:
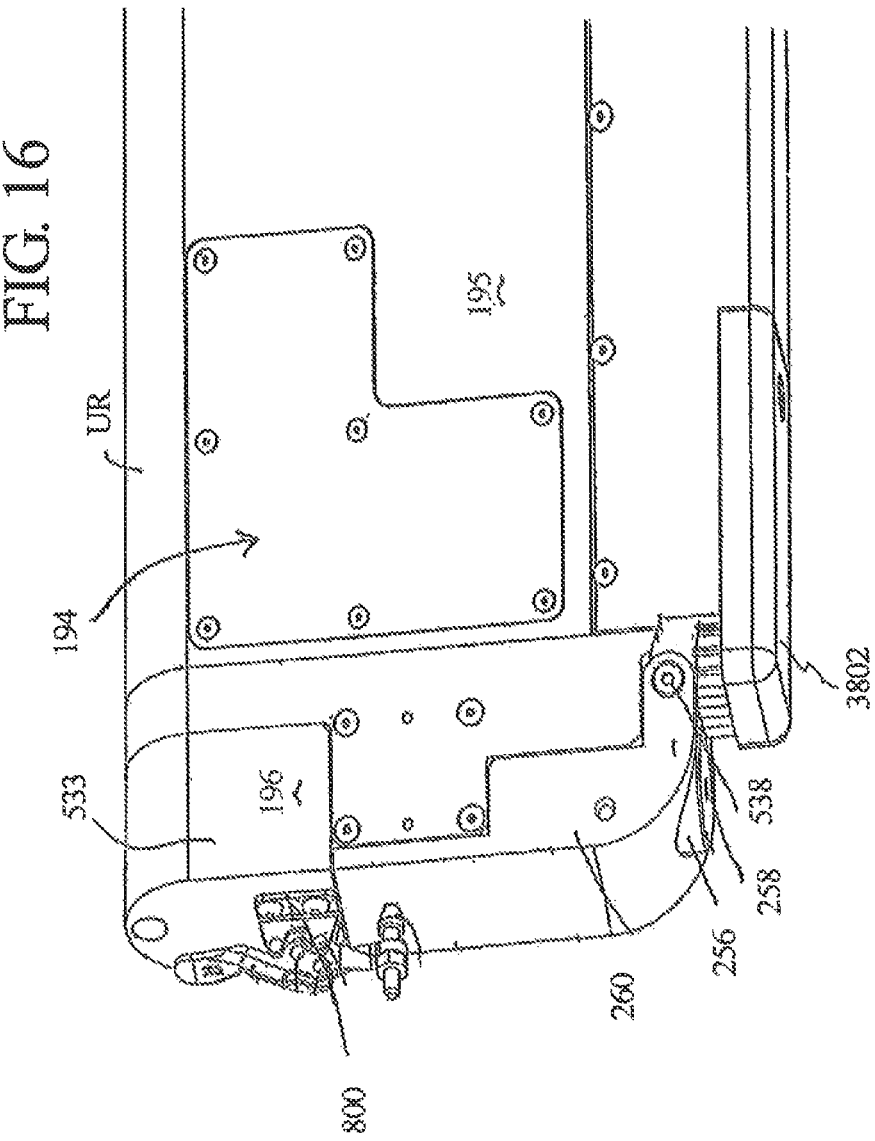
FIG. 16 shows an enlarged view of the dispenser assembly free end with mounted mixing module.
Figure 28:
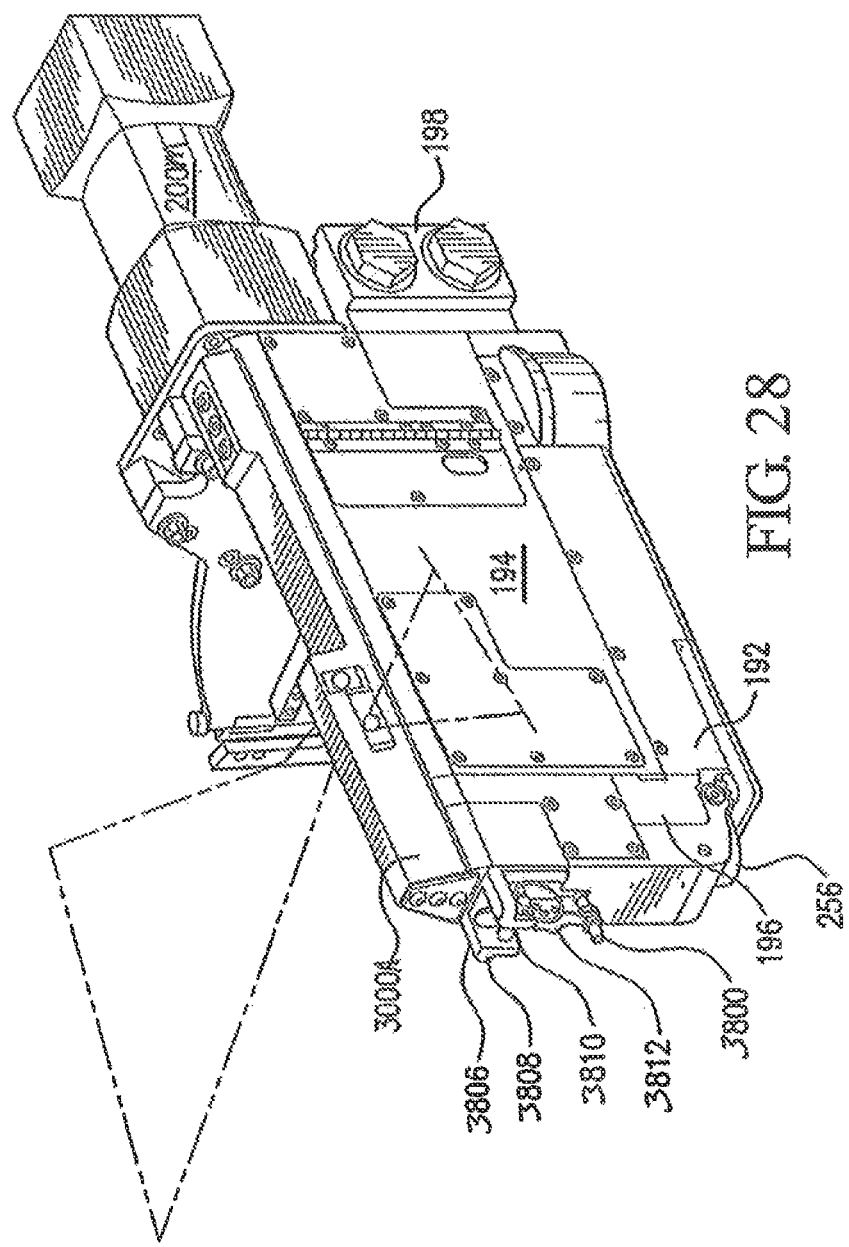
FIG. 28 shows a view similar to FIG. 26, but for a sensed improper film feed sensing mode.

FIGS. 26 and 28 illustrate the different detection modes when the film is in a proper opposite side of dispenser housing feed state (FIG. 26) and when in an improper feed state (FIG. 28) as in both film webs running along the front of the dispenser housing or both running along the rear of the dispenser housing (while utilizing a preferred diffusion photoelectric sensor). FIGS. 26 and 28 further illustrate the revised dispenser housing 194 into a state having an overlying spill prevention system 3000A secured to the upper region UR or 197 of a preexisting dispenser housing as shown in FIGS. 35, 36 and 16 which represents a region where drive transmission DT, extending off from motor 200, is housed before reaching crank assembly CA encased within removable cover 533 at the forward, free end 196 of dispenser housing 194 having front dispenser housing face 195. Positioned below cover 533 is mixing module 256 wherein, for example, two chemicals A and B are received after having traveled within passageways provided in housing 194 following entering intake manifold 198. Mixing module 256 is preferably in cartridge form and insertable and removable following retraction of pivoting cover 260 having an opening at, its base 265 through which the dispensing end of cartridge 256 extends having dispensing outlet 258. Cover 260 is preferably releasably locked in a closed, mixing module fixation state through use of latch assembly 800 and pivotable about shaft 538. The material spill prevention system 3000A is useable however in a variety of other dispenser systems having, for example, only a single material fed in or more than two to be mixed or disposed separately materials as well as other dispensing means whether in cartridge form or not.

Figure 27:
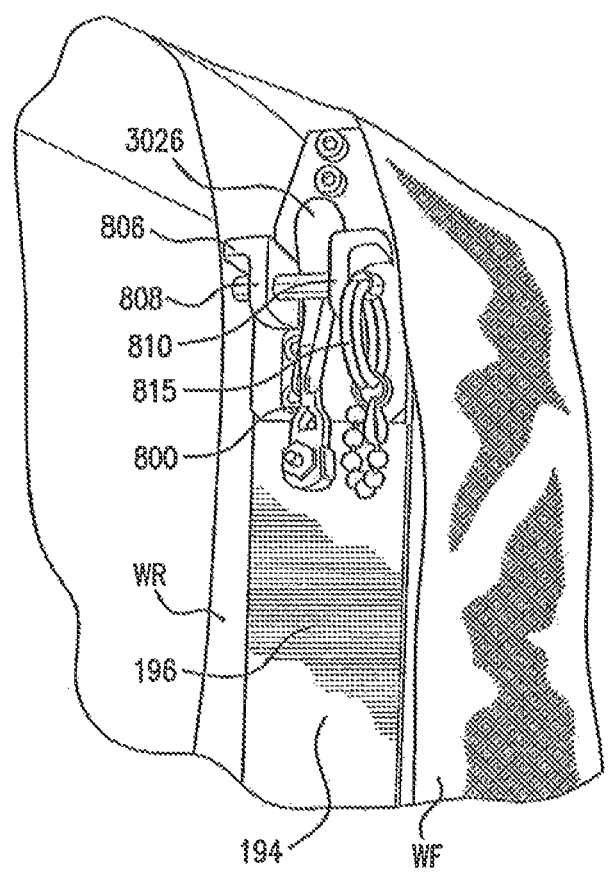
FIG. 27 shows an enlarged view of the film feed about the dispenser assembly of FIG. 26 (with the C-fold film fold edge being cut away for viewing the free end of the dispenser housing).

FIGS. 35 and 16 also show dispenser tip brush 3802 which is designed for cleaning the tip of cartridge 256 upon reciprocation by driver motor 200 and the dual functioning transmission DT. FIGS. 26 to 28 show the addition of an added latch release mechanism comprising pin assembly 3806 having a lock pin reception base 3808 and a hand removable pin 3810 with capture ring 3812 which can be readily pulled out at any time access to the finger triggerable latch 3800 is desired and yet precludes advertent in catching of the latch and release at a non-desired time.

FIG. 17 shows a cross-sectional view of mixing module cartridge 256 having reciprocating valve rod 814, which upon motor 200 and the associated transmission DT functioning is reciprocated such that it can be retracted back to open up passageway 816 (and a second one not shown in FIG. 17) whereupon foam precursor chemicals A and B are mixed and then dispense out of outlet opening 258. A controlled return of the rod leads to a closing off of the chemical passageways as well as a cleaning or purging out of any remaining chemical in mixing chamber 815.

When an error is detected by material spill prevention system 3000A similar steps are taken to preclude chemical spillage as in the above described spill prevention system 3000.

Figure 29:
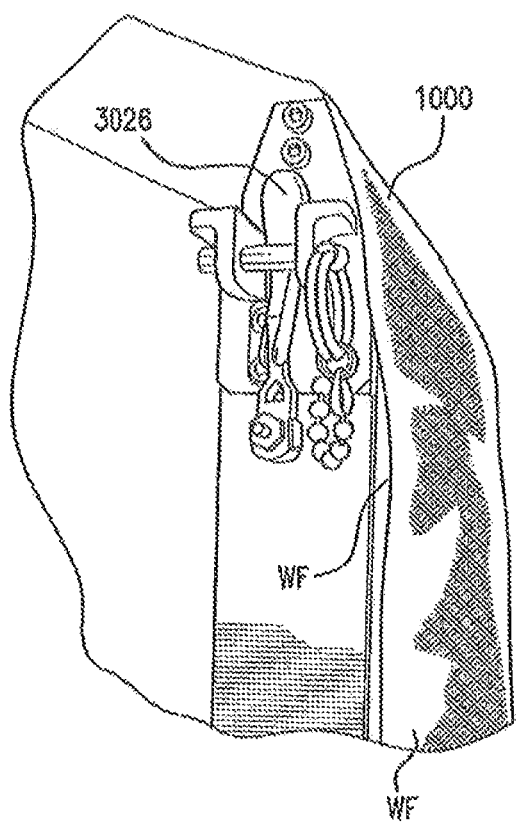
FIG. 29 shows a view similar to FIG. 27, but for an improper (all front) film feed arrangement.

FIG. 29 provides a closer view (with the fold portion of the C-fold film cut-away for added viewing) showing both film webs WF and WR having been improperly fed both to the front of dispenser housing 194 and the difficulty an operator faces in knowing whether or not the film is properly positioned to the rear of housing 194, which is made more difficult when considering the C-fold edge has been cutaway in FIG. 20 and, in this instance, the film is shown to be non-transparent (although even with a transparent or highly translucent film material an improper feed may still be difficult to detect by the operator). FIG. 27 shows a similar view to that of FIG. 29 but with proper film web WF, WR placement.

FIGS. 21 and 21A provide a view of the uncovered front face of dispenser housing 196 with the L-shaped view window 3042 with sensors 3012, 3014 viewport and rear view illustrated.

As an example of a foam up prevention system in operation, there is described below a bag forming start sequence and an associated detection sequence designed to preclude foam dispensing when the proper positioning of the film material is not sensed. That is, at the start of a bag making cycle (e.g., upon an operator depressing a selected bag size button as described in PCT Publication No. PCT/US04/14516 which is incorporated herein by reference), the machine control unit checks the sensor status. Again, there is preferably one sensor for each side of the dispenser housing although an alternate embodiment has a sensor only on one side which checks the status of film on that one side as in the rear side for determination of an improper feed or no film having reached the area due to an upstream jamming of film travel or, as an added example, looks to whether a proper V-fold is present outward of the dispenser). Under a preferred front and rear face of dispenser monitoring, correct installation of film within the machine will result in both sensors "seeing" a reflection of their emitted light off the film as shown in FIG. 26. If both sensors detect the presence of film, the machine will continue its bag making cycle and, if not, the chemical feed system and also preferably the bag making cycle will be precluded from activation until the film is properly positioned. As an example of, a sequence of steps that are monitored by the control unit in a preferred embodiment of the present invention there is included the following analysis steps:

1) Has the bag making cycle been initiated by the operator (e.g., has the operator initiated the start button)?

2) If so, is each sensor of the spill prevention system sensing the presence of film material (e.g., on the applicable sides of the dispenser housing)?

3) If not, discontinue bag making cycle and send out warning signal.

4) If so, initiate chemical precursor and film feed and edge sealing cycles to form bag with foam fill.

As seen, the above sequence operates under the notion of the material dispenser having a biased closed or shut dispenser outlet at initiation (advantageous in systems such as the described FIB system with pressure in lines) and thus there is not needed a go to shut off dispenser outlet, although alternate embodiments of the invention can include such a step if the sensing system detects a problem and the dispenser outlet is not in a current no flow from outlet state (this would be the case where some flow was initiated and then a problem detected and the flow then shut off).

Also, in a preferred embodiment, if a problem is detected, the initial enablement or initiate cycle turn on button is reset requiring a similar run through of 1-3 or 1, 2 and 4 above depending on whether the film feed has been properly set after the above discontinuation. If there is required, for example, more than 2 resets a service signal is preferably generated as there is likely an internal problem with the sensing system assuming the film is fed correctly in accordance with for example the schematic of proper film feed provided in sticker form on the front of the dispenser housing as shown in FIG. 30. In addition, there is preferably a self diagnostic system interfacing with the sensor(s) and the control unit which also triggers a non-enablement mode until the sensing system is properly operating.

In a preferred embodiment, the two sensor utilized are Banner Engineering (Minneapolis, Minn. USA) "T8 Series Diffuse Mode" miniature, solid state sensors which are connected via wiring (e.g., pigtail connection) to the control unit. These solid state sensors have either an NPN (current sinking) output cabled hook up or are sensors with an PNP (current sourcing) output cabled hookup and which come in either light operate (N.O.) or dark operate (N.C.) models. In a preferred embodiment the diffusion sensor utilized in one that involves visible red light and also features a red LED signal means which signals when film is present (or, optionally, when film is not present) by way of the LED light that is provided on the rear side of the main body. To provide for ready visibility, sensor view windows 3042, 3042' are each provided with an elongated view port (e.g., the long leg of the L-shaped window aperture 3044) through which the signal means of the sensor (as in the noted LED light) is visible. FIGS. 30 and 31 show an example of the viewing of the rear of the sensor so as to enable a determination of the status of the sensor (e.g., through the sufficiently translucent film material for example).

The present invention also preferably has a design that allows for the spill prevention system 3000A to be either readily retrofitted to an existing dispenser housing as, for example, the foam-in-bag dispenser system described above as well as being easily assembled as a component of a newly manufactured combination dispensing housing and sensor assembly. FIGS. 35 and 36 illustrate a preferred embodiment of a versatile securement assembly which provides for ready retrofitting of foam-in-bag dispensing system with a dispenser housing to include a proper film feed prevention means as in spill prevention system 3000A.

As shown in FIG. 24, an alternate embodiment of the invention features a combination material spill avoiding dispenser system. The combination (see the schematic box in FIG. 24—showing communication from the two sensor systems to the control unit as in respective logic control boards, software, etc.) of sensor systems 3000 and 3000A in dispensing system 1000 thus provides for even an added degree of material spill prevention protection. These two film based material spill prevention systems can thus be used together to monitor for both proper feed through the system (system 3000) following confirmation of proper installation of the film for feeding (system 3000A) with each representing determining means for determining proper film criteria. In addition, there can also be provided, as a supplement to the combination film sensor systems, the below described flow controller sensing system 3000B (e.g., determining means for determining proper flow controller criteria) which is preferably integrated with the other systems 3000 and 3000A but can also be used alone or in any combination as discussed above.

New machines in production can easily be equipped with the material spill prevention system of the present invention. Additionally, retrofit assemblies are available for easy and quick installation on existing machines.

Figure 39:
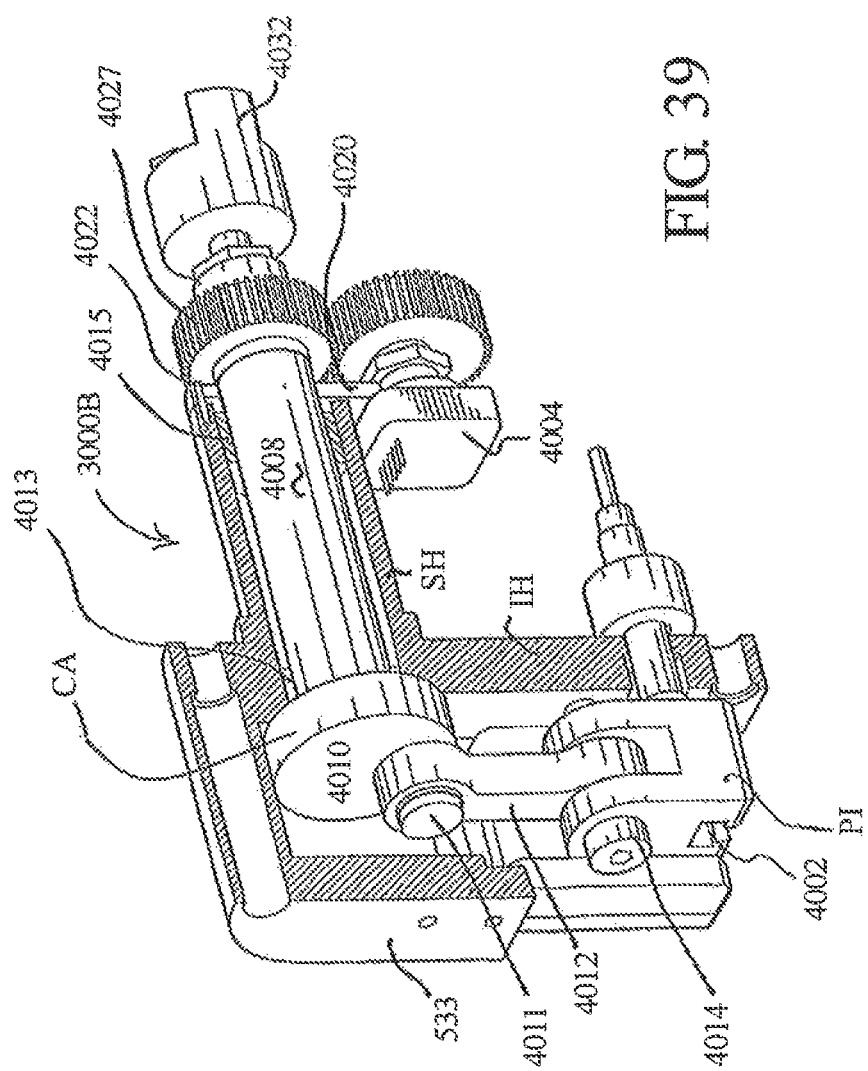
FIG. 39 shows a similar view as that in FIG. 38 but with the dispenser crank housing is cut away and one of the guide shoes removed to show more of the piston and how it interacts mechanically with the proximity sensor as well as the slot in the face of the piston that mates with the end of the valving rod.

An additional embodiment of the inventive comprises material spill prevention system 3000B with monitoring system 4000 having means 4004 for keeping abreast of positioning of a moving object such as a moving object that is in the form of a component for controlling flow or no flow mode in the dispenser system (e.g., a flow controller in the form of the above described valving rod 814 shown in FIG. 17) and/or a driving component that directly or indirectly provides to the flow controller a drive force (e.g. a component in a transmission line extending from motor 200M in FIG. 35 to grabber 4002 shown in FIGS. 35 and 39 as having a slot which receives an enlarged back end of valve rod or flow control means 814). In a preferred embodiment, the monitoring system 4000 includes a position monitoring device 4004 able to keep track of all positions that the monitored component assumes during operation and preferably also during shut down and start up of the driving system being used to move the moving object (an "absolute" monitoring means). One embodiment of the position monitoring device 4004 includes a device that generates a position transducer based electronic signal with respect to rotary or linear positioning of the moving object such as an encoder with a preferred embodiment featuring an absolute position transducer such as an absolute encoder device. The position transducer's means of communication preferably is a digital based system which uses a digital signal that is sent to the system control processor or control means 3006 (FIG. 24). This signal is related to the rotational (or linear depending on which moving object is being monitored) position of the flow controller so the system processor knows where the moving object (e.g., valving rod) is at all times, even on system startup.

Figure 37:
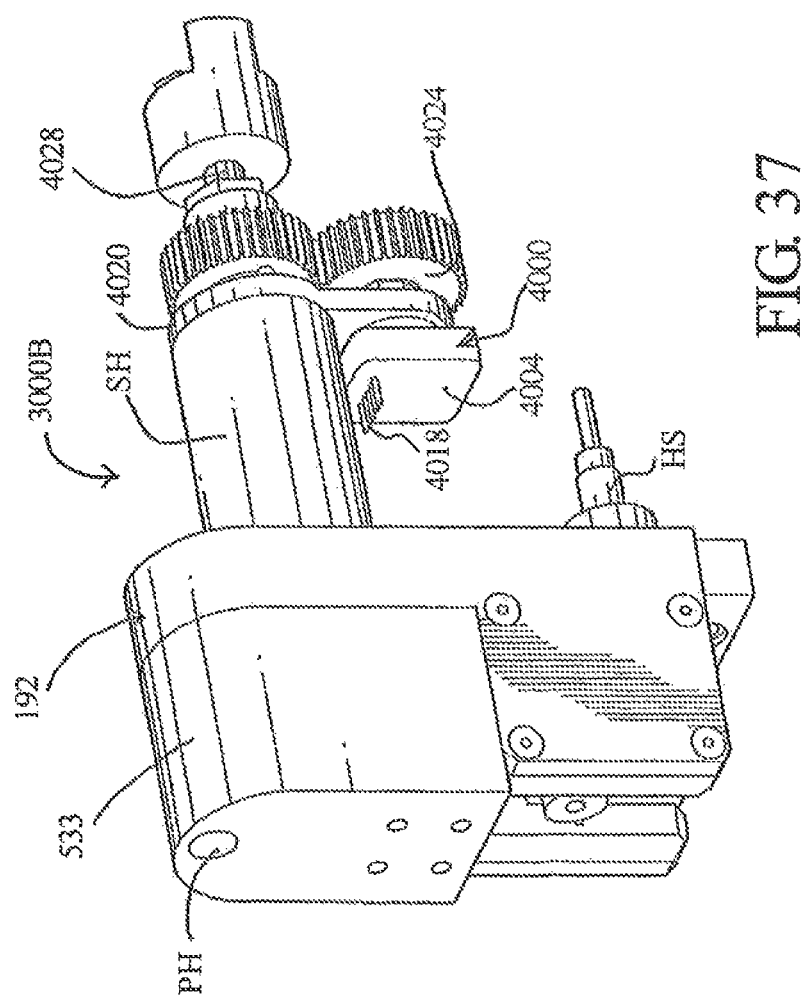
FIG. 37 shows a cut away view of a dispenser assembly free end such as shown in FIG. 16 with a mounted model of an absolute position encoder.

FIGS. 37 to 45 show one possible set up for spill prevention system 3000B which is well suited for operation with a drive system similar to that described in PCT Publication WO2004/101245 to Intellipack (which is incorporated by reference and describes a similar drive system as shown in FIG. 35 of the present application, and with some differences in the respective drive systems of FIG. 35 and FIG. 37 being discussed below). For background purposes provided below is a discussion as to a working embodiment of the driving system featured in the noted PCT publication and generally presented in FIG. 35.

The drive system featured in FIG. 35 includes crank assembly CA which is attached to piston PI at its downstream end and to a flex coupling FC at its upstream end. The coupling FC is attached to drive shaft DS driven by motor 200M through drive coupling DC. Crank assembly CA moves the valving rod 814 of the mixing module and is free to rotate a full 360 degrees. The crank assembly CA features a front/rear bearing support assembly with an outer bearing supported in cover 533 and the opposite end is supported on internal housing section IH of dispenser assembly 192. A comparison with crank assembly CA' in FIG. 39 shows a different bearing assembly that is free from contact with cover 533 and features shaft housing extension SH extending internally and receiving an enlarged crank drive shaft 4008 attached to crank cam 4010 with bearing rings 4013 and 4015. Pin 4011 is supported by cam 4010 and extends into a first end of crank link 4012 which is connected at its opposite end via pin 4014 to piston PI. Thus the arrangement is somewhat different than that featured in FIG. 35.

In the embodiment featured in FIG. 35 the crank is driven by an electric motor 200M that is under control of the main system control processor (see FIG. 24 with control means 3006 and proximity sensor/motor encoder connections). Electric motor 200M is attached to drive shaft DS running most of length of the dispenser housing support. The crank assembly thus converts the rotary motion of the electric motor to reciprocating linear motion in piston PI. As the piston is connected via grabber 4002 to the rear end of the valving rod of the mixing module, when the piston reciprocates within its low friction containment plates, the valving rod moves with it. In the FIG. 35 embodiment, the motor and crank rotate 180 degrees to open the mixing module thus converting it from a no flow mode to a dispense material mode. This rotation also pulls the piston and the attached valving rod back (e.g., 0.87 inches) to open the A and B chemical ports. To place the valving rod back into the closed position, the crank rotates another 180 degrees, in the same rotation direction as before. This additional rotation pushes the piston and the attached valving rod back (e.g. 0.87 inches) to its closed position The position of the valving rod along its open/close stroke is of importance for proper controlling of flow operation as the control system needs to "know" its position at all times. Relative to the above described PCT Publication, the proximity sensor PS is used to monitor the position of the piston PI. In the FIG. 35 embodiment, this sensor is either on or off. It has no analog or digital output proportional to position. It turns on when the piston is in or near its home position, which is typically defined as the position where the valving rod is in the desired stop position between shots The proximity sensor shown in FIG. 35 is designed to show the piston to be in home position when the crank mechanism is plus or minus a few degrees of bottom dead center. This tolerance band translates into a piston position of plus or minus a small fraction of an inch, which was deemed good enough for its intended purpose in that embodiment. The proximity sensor HS also turns off when the piston is in any position other than home. Therefore, the proximity sensor is unable to tell the system control processor anything about valving rod position unless it's near its home position, which generally is only about 5 degrees out of the 360 degree rotation cycle. The dispenser drive motor has an encoder built into its integrated control board. In a working embodiment of the PCT Publication noted the motor encoder provides 216 pulses per revolution, a resolution of 1.67 degrees per pulse, which was deemed adequate for that type of effort to control the dispenser. However, the encoder merely puts out a string of digital pulses as the motor rotates. These pulses are all identical, and are not related to the position of the motor shaft. The system control processor has to count these pulses in an effort to track valving rod position as the motor turns.

In normal system operation of that embodiment, things should work as follows:

1. The piston starts in home position—and the proximity sensor verifies this with an "On" signal to the system control processor.
2. If the "On" signal is not present, the shot cycle will not start, and a system shutdown will be annunciated.
3. Once a signal to start a shot has been received from the operator and the proximity sensor shows that the valving rod is in its home position, the dispenser motor starts to turn.
4. As the motor turns its internal encoder sends out pulses to the system processor.
5. The system processor counts these pulses.
6. When the system processor counts that the motor has sent out close to 108 pulses, which translates into 180 degrees, the motor is told to decelerate to a fall stop by the control unit.
7. In this position, with the crank assembly rotated half way, the valving rod is in its open position, and foam is being dispensed.
8. When the desired shot time has elapsed—the system processor tells the motor to start turning again.
9. The motor again rotates in the same direction, and the system processor again counts the encoder pulses.
10. When the motor is rotated to close to its home position, the system controller decelerates and stops the motor.

The piston and valving rod should stop in the home position, where they started at the beginning of the cycle, and the proximity sensor should turn "On" again. However, as outlined in the background portion, a number of failure modes are possible which can be generally attributed to the system losing control of the valving rod position. For example, the working embodiment featured in the above noted PCT Publication based system has occasionally been powered up, with the valving rod in the open position allowing the mixing module to dispense foam immediately on system startup. Since the system control processor cannot know where the valving rod is in its cycle, unless it's at home position where the proximity sensor can "see" the piston, the dispenser system cannot respond intelligently at startup and the system does not know that foam is coming out of the mixing module. Another failure mode includes the occasional proximity sensor failure resulting in the system not being able to find home position. When this happens, the mixing module can sometimes stop in an open position, again shooting foam when it's not desired. An additional failure mode possibility includes the encoder signal failure relative to the motor resulting in the loss of pulses or an overall stoppage in the sending pulses. Again, this prevents the system control processor from knowing when the dispenser is open, but it can still theoretically find home position if the proximity sensor is still working.

All of these failure modes are difficult for the system to manage because it never fully really knows the position of the valving rod unless its at home, and the proximity sensor is working properly. The control processor can only infer the position of the valving rod, at all other positions, by counting pulses from the motor encoder.

Material spill prevention system 3000B whether used alone or in combination with a proximity sensor arrangement like that described above represents an effort to address the failure problems noted above. In a preferred embodiment device 4004 is an absolute position encoder or similar functioning position transducer means. Device 4004 is preferred so that the system control processor knows with fairly high accurately where the valving rod 814 is at all times. Thus, relative to, for example the above noted PCT publication embodiment with home sensor HS, with the inclusion of an absolute encoder in accordance with the present invention there is avoided a need to count pulses away from a home position. Thus the home sensor system can be removed. However, in a preferred embodiment the home positioner HS (with preferred communication with the motor 200M encoder) can be retained as a supplement to the absolute encoder. For example, in a monitoring system using an absolute encoder technology there can still be uses a proximity sensor as a means to further check on operation. For example, if a proximity sensor signals that a valving rod is in a closed (flow shut off) position, but the absolute encoder indicates a positional output that is contrary to what the proximity sensor indicates, then the means for precluding material flow is initiated and the system is shutdown until the contradiction is resolved. Alternatively or in addition, a review of the encoder output from a dispenser motor (e.g. an internalized motor encoder) can be carried out, but only as a check on the operation of the absolute encoder, which, in a preferred embodiment, would be the primary source of information regarding valving rod position. Absolute encoder 4004 preferably also provides a resolution of better than one degree (when dealing with a rotary encoder or essentially equal percentage of accuracy relative to a linear monitoring system).

Absolute position encoder 40004 preferably provides relatively precise positional information as soon as it's powered up. There are a variety of absolute encoder types including optical and magnetic types that are, for instance, rotary or linear based. Some examples of preferred absolute encoders include: Novotechnik US Inc's (Southborough Mass., USA) RSC2200 Series non-contacting angle sensors measuring absolute up to 360 degrees using VERT-X® Hall technology which has an analog and/or digital output and is able to hold position monitoring even during a power failure, or Novotechnik'sRSC2800-100 series which features a non-contacting sensor that utilizes the orientation of a magnetic field for the determination of the measurement angle where a magnet is attached to the sensor shaft, while the magnetic field orientation is captured with an integrated circuit and an output signal represents the calculated angle. (a 30 to 180 degree range is applicable for this sensor). Additional examples include "Encoder Devices" ED-22 series magnetic encoder which is a rotary magnetic encoder having end of shaft mounting for the sensor and a flange mount for the encoder housing, and "Contelec AG" of Switzerland Vert-X 13 compact sensor as well as the aforementioned "Bei" linear position transducer if the device being monitored is a linear moving object.

Encoder 4004 can be mounted anywhere along the drive train (transmission, motor drive shaft, moving object itself) where it can sufficiently accurately sense the position of a component that will provide the information associated with an absolute encoder device as in the shaft rotation state or a non-rotative component as in a reciprocating piston/piston housing arrangement. With reference to FIGS. 37 to 45 there is described a preferred material spill prevention system 3000B arrangement relative to a material-in-bag dispenser system. As seen in FIG. 37, encoder 4004 with electrical connectors 4018 (for signal transference to the control unit) is attached to the shaft housing SH (representing a stationary component in the dispenser system) at its upstream end by way of the intermediate encoder mount bracket 4020. As shown in FIG. 39, bracket 4020 is secured with a fastener 4022 to shaft housing SH. Spur gear 4024 (e.g. a plastic spur gear) is attached (fixed, common drive attachment) to the encoder shaft 4026. This gear mates with another plastic spur gear 4027 that is attached to drive shaft section 4028 (fixed, common drive attachment) of drive shaft assembly 4031 which comprises drive shaft DS in driving communication with motor 200M and having upstream coupler component 4030 designed to couple with downstream coupler component 4030 secured to drive shaft section 4028 connected with the crank shaft. This gear train allows the encoder to rotate in lock step with the drive shaft, allowing the encoder to know the exact angular position of the drive shaft assembly and the crank mechanism attached to it.

Figure 38:
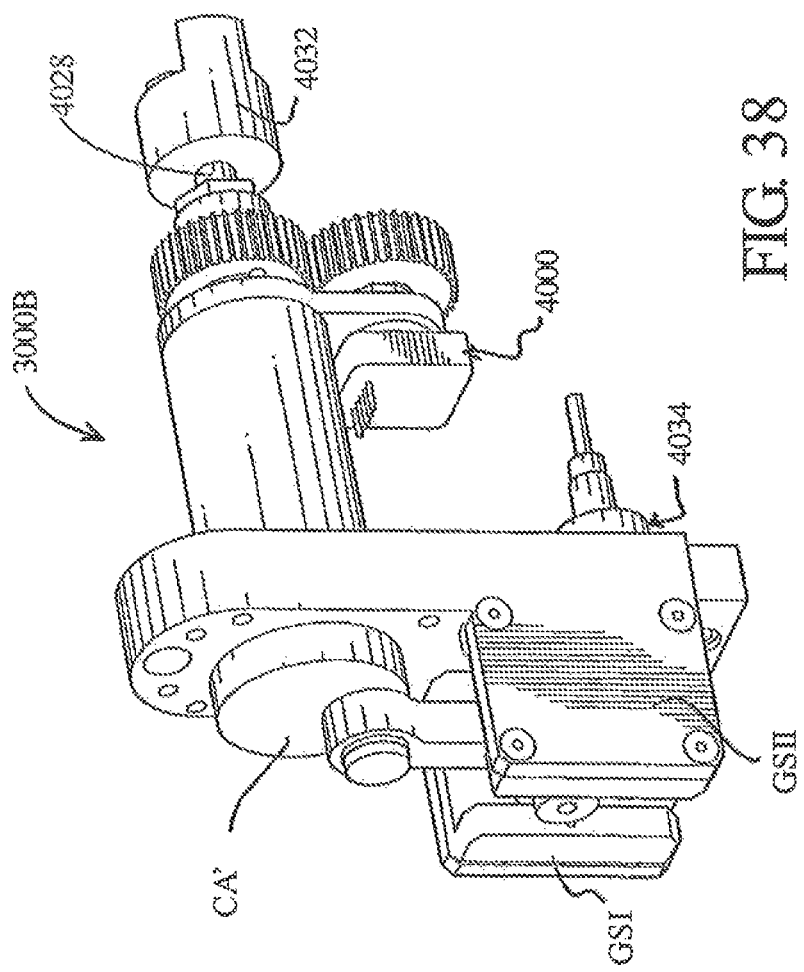
FIG. 38 shows a similar view as that in FIG. 37 but with the crank assembly housing removed and with the crank assembly drive mechanism in in its bottom dead center position with the proximity sensor sensing the piston is in its home position.

FIG. 38 shows material spill prevention system 3000B as comprising the absolute encoder monitoring system 4000 in combination with a proximity sensor position sensing means 4034 which includes home sensor and the preinstalled motor encoder contained in motor 200M (FIG. 41) which work together such as in the ways described above. (e.g., the absolute encoder system 4000 being the primary sensor system and the proximity sensor based system 4034 being the secondary or backcheck sensor system). As noted above, however, absolute position transducer system 4000 works alone in an alternate embodiment of the invention with the proximity sensor being removed and the motor need not having an encoder system. FIG. 38 also shows piston PI in a bottom dead center position with the proximity sensor sensing that the piston is in this position (e.g., its home position). As seen, piston PI is constrained in linear movement by way of opposite facing low friction guide plates GSI and GSII. This is also an area of movement where linear absolute monitoring may be employed such as an absolute position monitoring of the piston relative to its linear travel with the position transducer mounted on for example a suitable location on a guide plate either monitoring the linear movement of the piston directly or an object connected thereto and translating in similar linear fashion.

Figure 40:
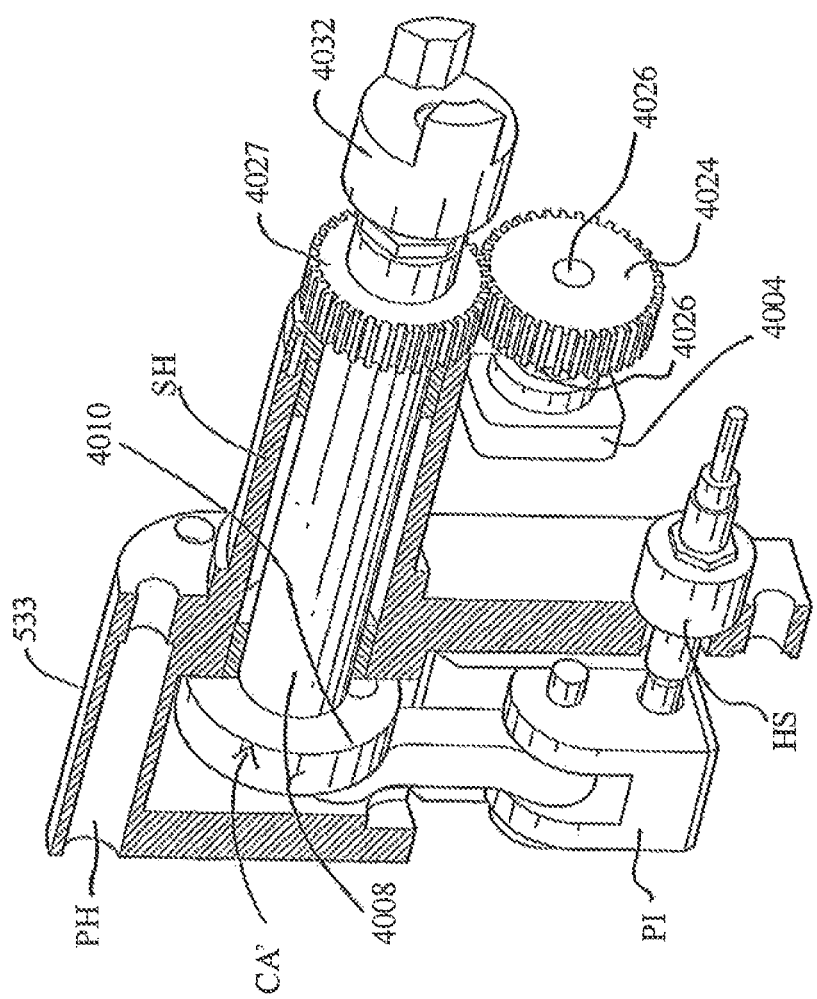
FIG. 40 shows FIG. 39 rotated to better illustrate the steel pin shown pressed into the side of the piston, that the proximity sensor uses to sense the position of the piston.
Figure 41:
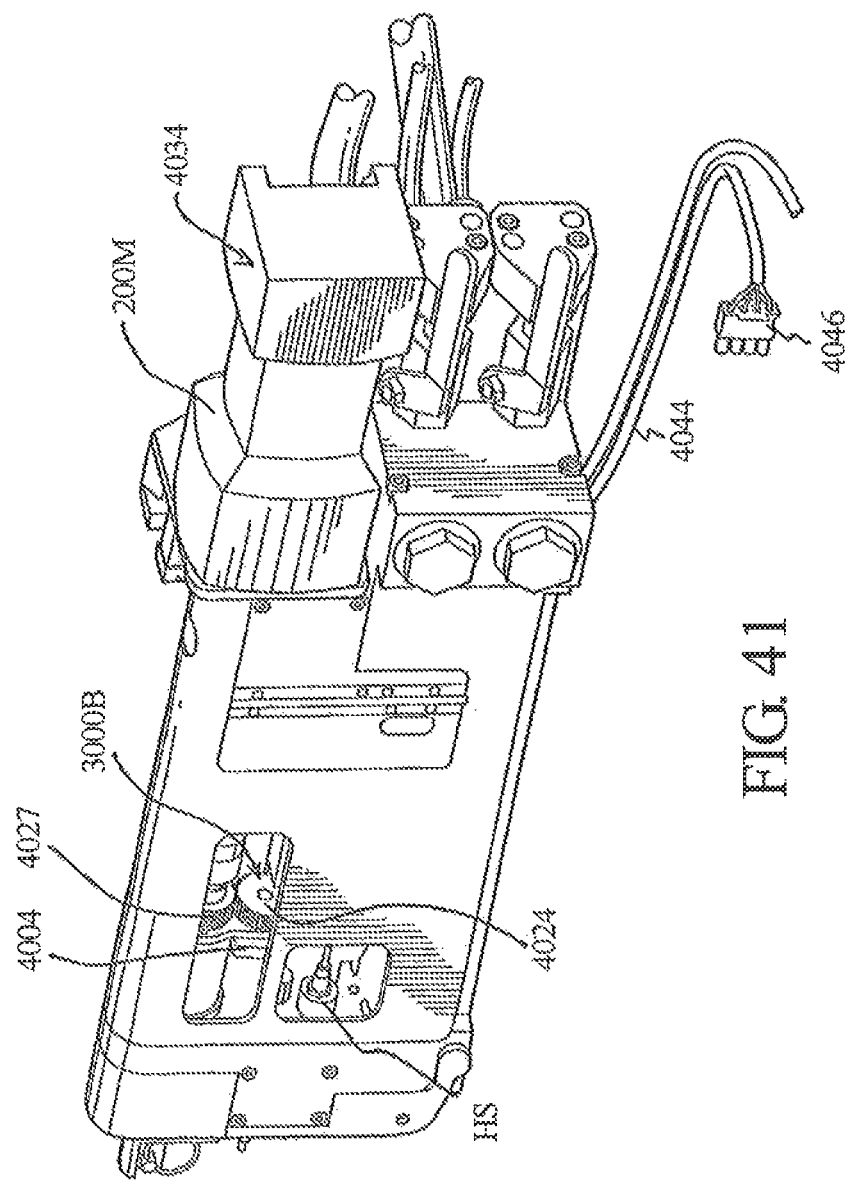
FIG. 41 shows the dispenser assembly of FIG. 37 with a segment removed (e.g., a cover plate) towards the mixing module end of the assembly, to further illustrate the components of FIG. 40.
Figure 42:
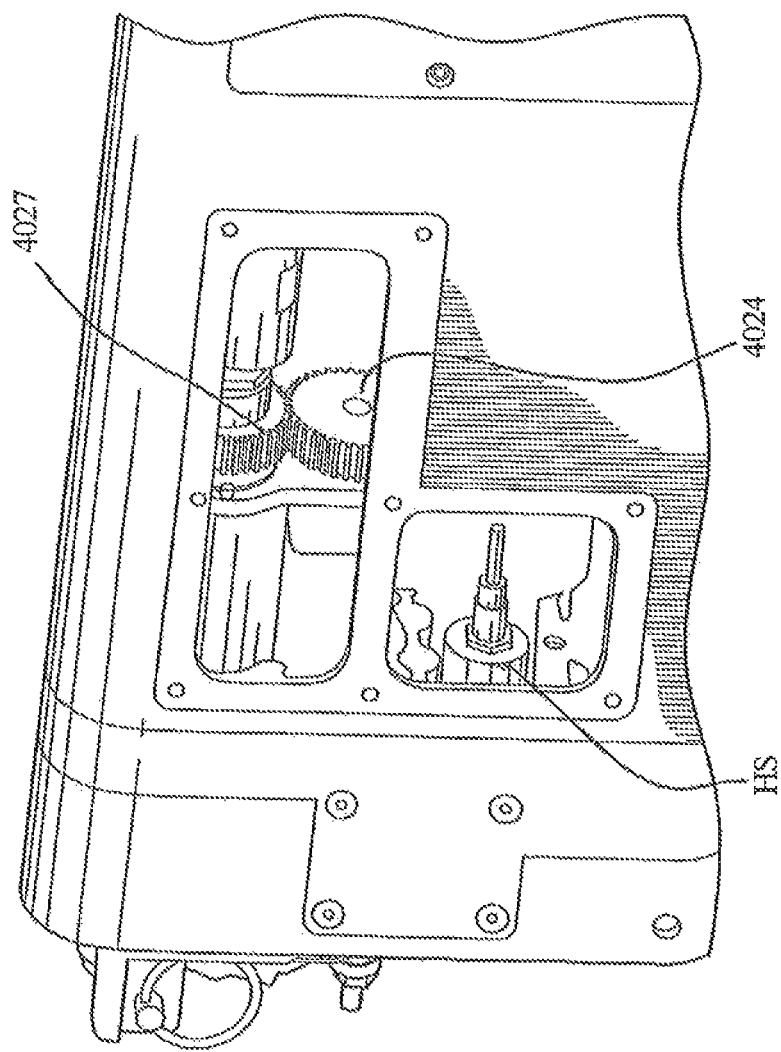
FIG. 42 shows a closer up view of the front region of FIG. 41.
Figure 43:
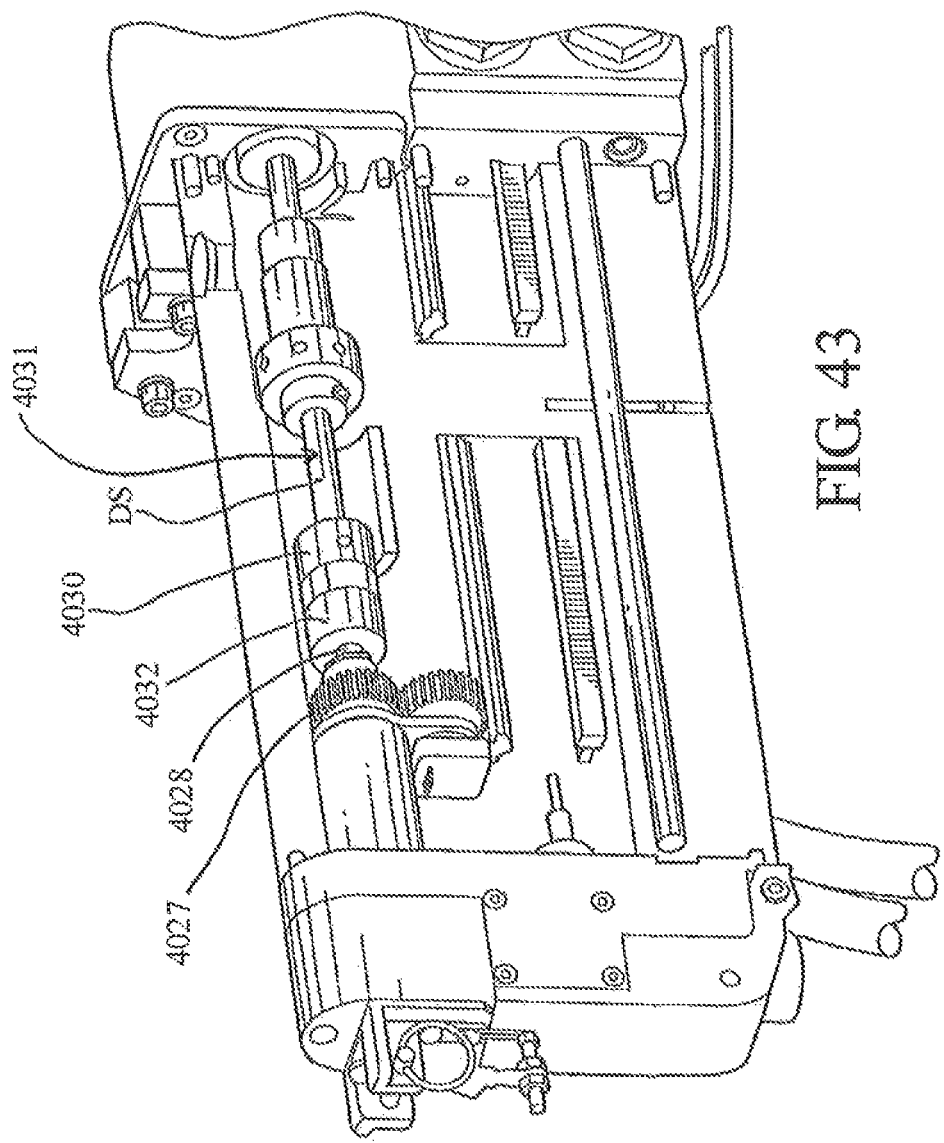
FIG. 43 shows a cutaway view of the drive shaft featured in FIG. 37 and how it is connected to the motor and how the encoder is mounted with respect to other components within the dispenser housing.
Figure 44:
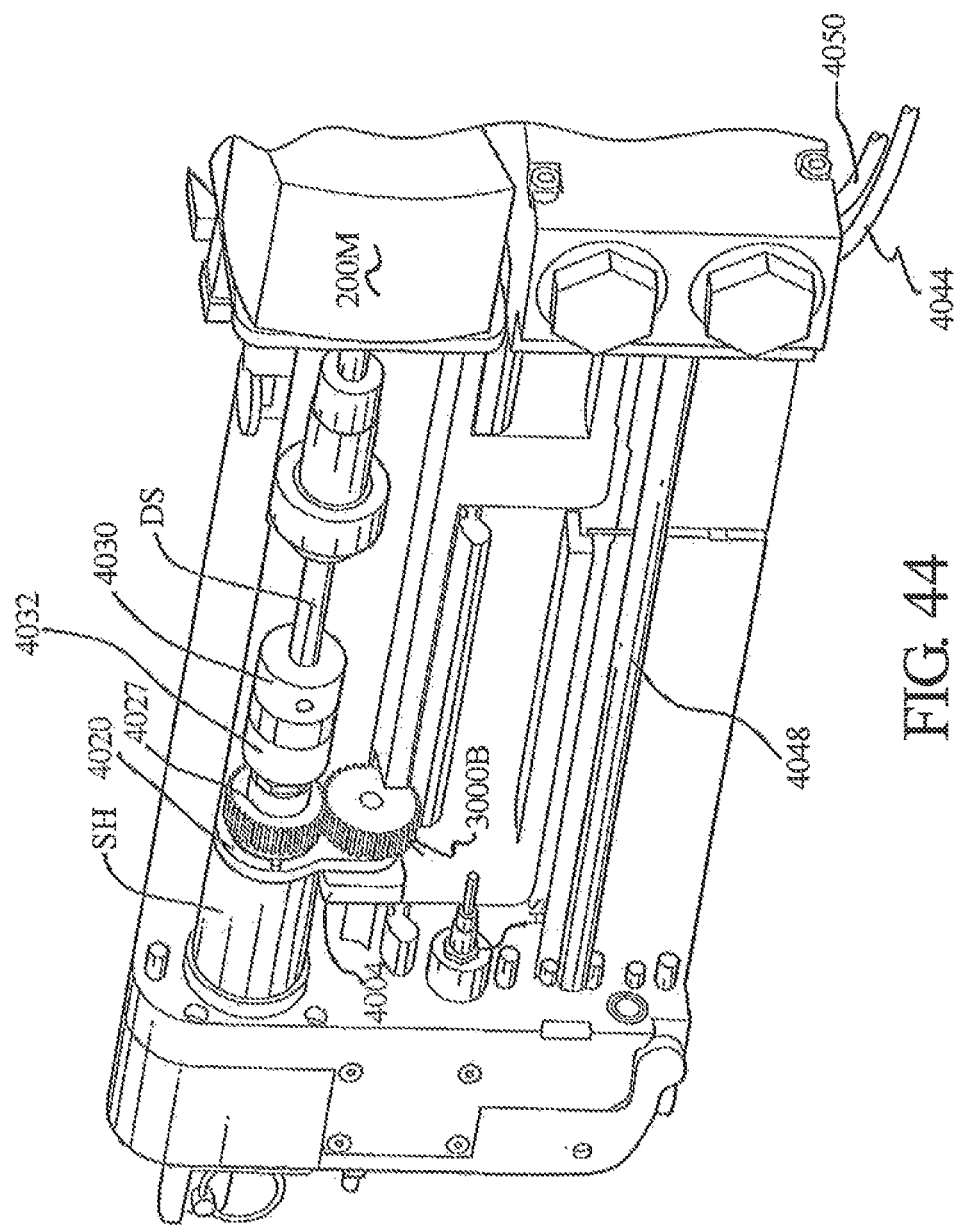
FIG. 44 shows a rotated view of that which is shown in FIG. 43.
Figure 45:
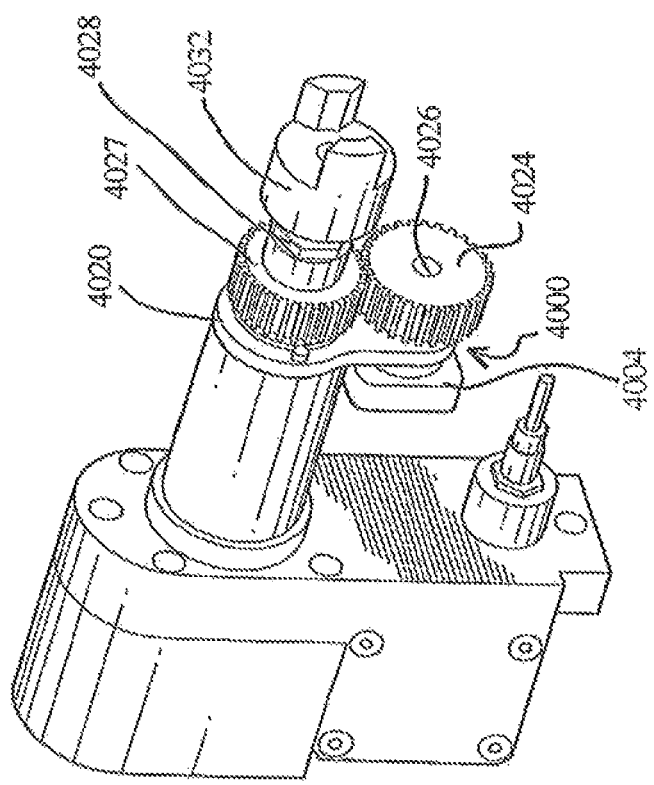
FIG. 45 shows a rotated view of that which is shown in FIG. 37.

FIG. 40 shows the steel contact pin 4036 that is pressed into the side of piston PI that the proximity sensor uses to sense the position of the piston. FIG. 41 shows a view of dispenser assembly 192 with the sheet metal plate removed towards the mixing module end of the dispenser assembly providing for access to the components described above. Also, in the embodiment shown in FIG. 41 there is not featured any of the other material spill prevention systems 3000 and 3000A although in alternate embodiments there is included one (e.g. the dispenser set up shown in FIG. 41 with an added spill prevention system 3000A secured to the top of dispenser housing 194) and preferably both of these material spill prevention systems with material spill prevention system 3000B as each provides an added degree of protection against material spill prevention. FIGS. 42 to 45 provide added views of the material spill prevention system 3000B with FIGS. 43 and 44 providing cutaway view of dispenser housing 194 having a ribbed interior cavity within which is received material spill prevention system in an enclosed, protected fashion. Although not shown, suitable electronic signal transfer cabling is preferably provided and joined in a electronics cable 4044 for connection with input/output plug of the control unit via for example plug 4046 shown in FIG. 41 supported support 4042. FIG. 44 further shows electric resistance chemical flow heater cartridge 4048 also positioned within the interior of dispenser housing 194 and which can have its electric cabling 4050 commonly exiting dispenser housing for connection to a suitable control unit coupling port.

Figure 46:
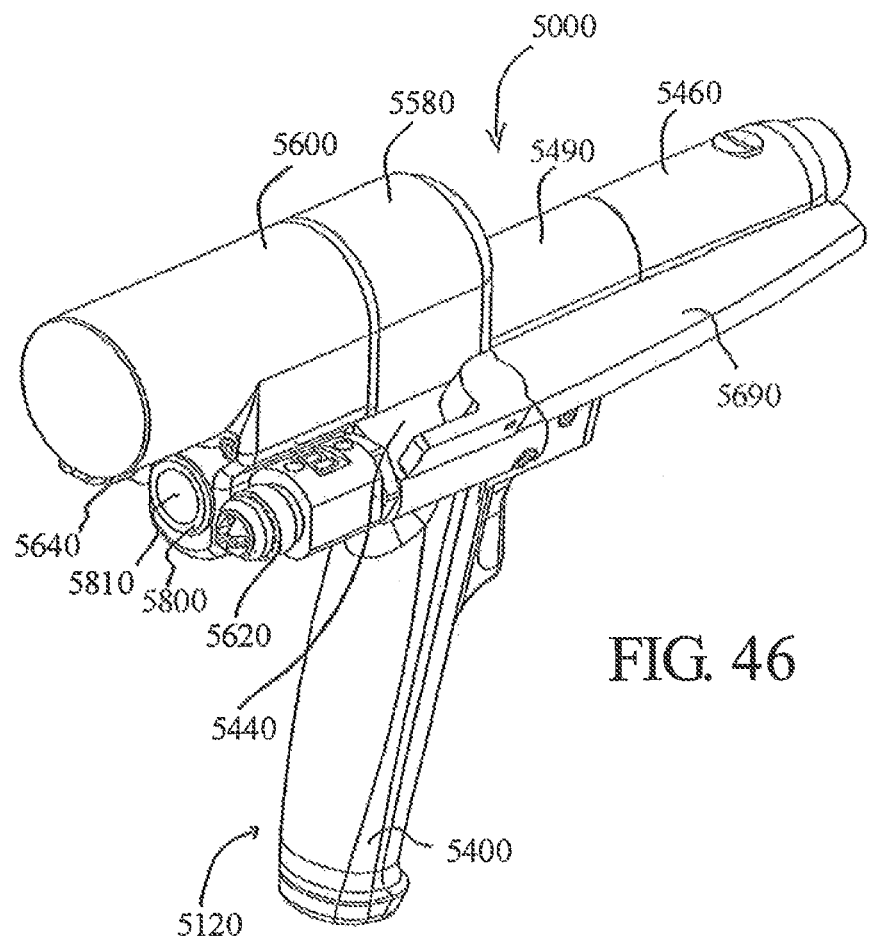
FIG. 46 shows a perspective view of a handheld dispenser.
Figure 47:
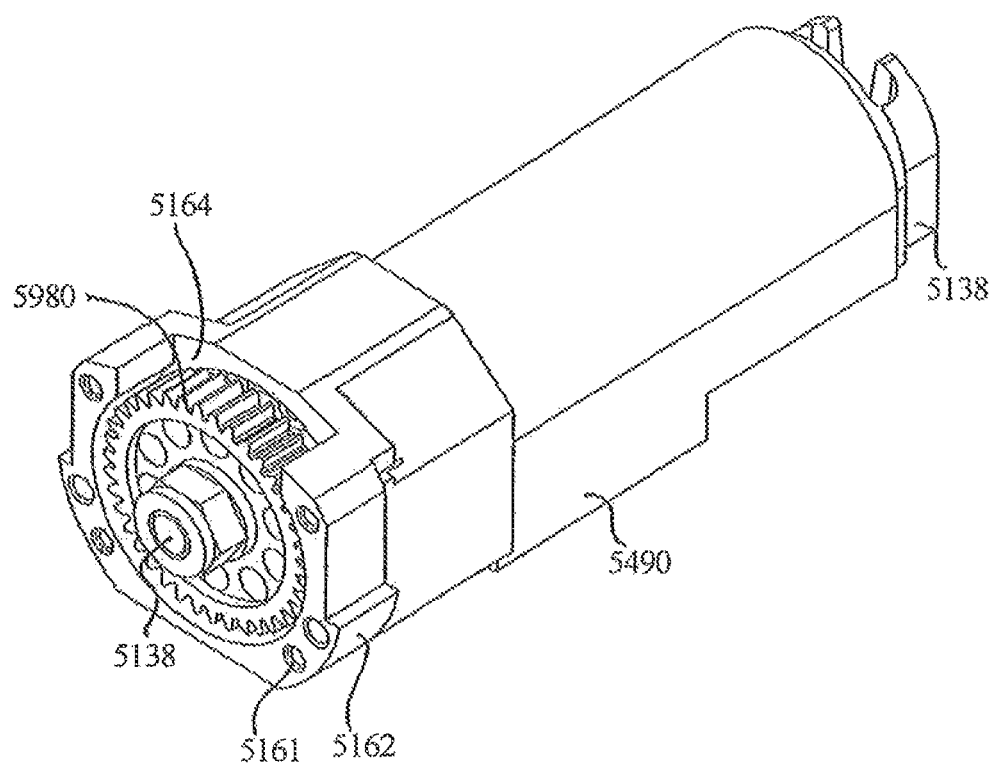
FIG. 47 shows a top perspective view of the transmission for driving a valve rod in the dispenser shown in FIG. 46.
Figure 48:
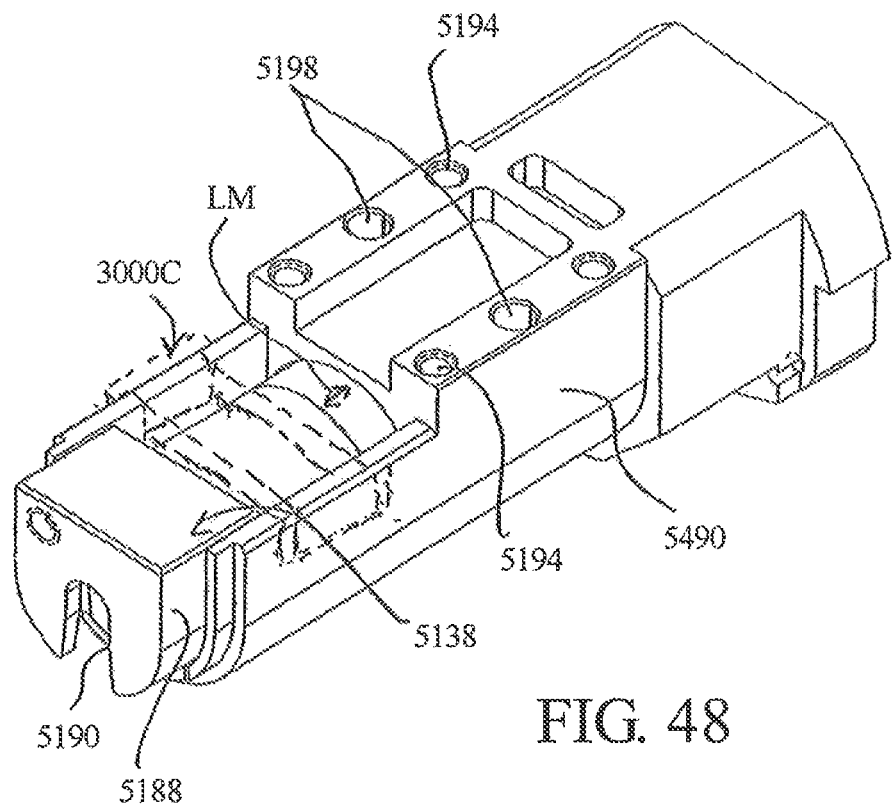
FIG. 48 shows a bottom perspective view of that which is shown in FIG. 47.

With reference now to FIGS. 46 to 48 there is illustrated a dispenser system 5000 featuring in combination an alternate type of absolute position based material spill prevention system 3000C used in association with a hand held dispenser 5120. FIG. 46 shows a rear view of the hand held dispenser 5120 and shows the rear end of the cantilevered motor cover 5600 having a back end wall placed axially rearward of the chemical hose swivel fittings 5620 and 5640 due to its cantilever extension off from manifold 5440. FIG. 46 also shows the electrical line connector 5800 which is centered (widthwise of manifold) between the two chemical line swivel fittings 5620, 5640 and slightly raised above those connections to provide an electrical line infeed port 5810 for friction or plug in connection of an electrical umbilical cable (not shown a bundle of wires for feeding electrical power to the motor and other electrical components and for allowing for communication of sensed parameters as in for example, the pressure transducer 5001 and other components as in a temperature sensor, and manifold chemical flow heater combination). The drive cartridge 5490 side wall edges are designed to provide a no gap, essentially seamless transition relative to the contacted section of the underlying portion of rear end of the manifold assembly and the adjacent motor/transmission drive connection cover 5580 and mixing module 5460. FIGS. 46-48 shows drive cartridge 5490 having a housed ball screw transmission assembly 5138 together with driven gear 5980 (driven by another gear in gear train closer to the drive motor 5600) which drives the ball screw assembly and is received in recess of housing 5164 having mounting means 5161 and 5162 for stationary fixation in the hand held dispenser frame structure. In addition FIG. 47 shows piston 5138 with grabber 5190 and sliding flat side walls 5188 which like the above described piston PI is secured to an enlarged end of the valve rod for providing flow controller means in the mixing cartridge. Cartridge also has bottom holes 5194 and 5198 for receiving pins and/or fasteners for mounting stability on the remainder of the gun framework. FIG. 48 also shows a schematic view of one potential mounting location for an absolute linear position transducer which forms a part of material spill prevention system 3000C for absolute monitoring of the linear motion shown by arrow LM of piston shaft 5200 driven by an internalized drive assembly as in the screw drive featured in PCT/US2005/008378 entitled handheld dispenser to Intellipack and which application is incorporated by reference. Thus, material spill prevention system 3000C can provide absolute monitoring of the position of the piston assembly that is directly connected to the valving rod. Additional embodiments include monitoring linear moving components both upstream and downstream as in monitoring the valve rod's linear movement directly although, for the embodiment shown, that position relationship is harder to achieve due the dispensing gun's structure and the desire to maintain a streamlined handheld dispenser. Also, while the rotary encoder described above preferably monitors rotary movement of a rotating component driving a linear moving flow controller 814, with a flow controller of a rotary type the absolute encoder can also be positioned to monitor movement of the flow controller directly.

Priority is claimed to each of provisional applications 60/679,645 and 60/679,646 filed on the same date and entitled DISPENSING SYSTEM WITH MATERIAL SPILL PREVENTION SYSTEM, which applications are incorporated by reference.

What is claimed is:

1. A foam-in-bag system, comprising:
a foam-in-bag device that forms a plurality of foam-in-bag bags from opposing film webs of film material, the foam-in-bag device including:
a foam precursor dispenser having a dispenser outlet that distributes a foam precursor between the film webs;
a drive assembly that drives the film webs past the outlet to receive the precursor, and
a cutter that cuts the film webs to form the plurality of bags; and
a monitoring system comprising a sensor having a detection location downstream of the dispenser outlet and the cutter that detects whether the film material is present at the detection location downstream of the dispenser outlet and the cutter, the monitoring system being configured to determine whether the film material has been detected by the sensor in a predetermined period, wherein the monitoring system is connected to the foam-in-bag device to cause the foam-in-bag device to preclude initiation of or discontinue distribution of the foam precursor by the foam-in-bag device based on the monitoring system determining that the film was not detected during the predetermined period.

2. The foam-in-bag system of claim 1, wherein the predetermined period is a predetermined period of time from a predetermined moment.

3. The foam-in-bag system of claim 1, wherein the predetermined period represents a distance traveled by the film webs from a predetermined position.

4. The foam-in-bag system of claim 1, wherein the monitoring system comprises a drive sensor that senses parameters of the drive assembly, and wherein the monitoring system determines the predetermined period based on the sensed parameters.

5. The foam-in-bag system of claim 4, wherein the drive sensor monitors rotation of the sensed parameter of the drive assembly.

6. The foam-in-bag system of claim 4, wherein the drive sensor detects a speed of the drive assembly.

7. The foam-in-bag system of claim 4, wherein the drive sensor comprises a motor encoder.

8. The foam-in-bag system of claim 1, wherein the predetermined period is determined based on a predetermined time period after the foam-in-bag system receives a user input to initiate an operation.

9. The foam-in-bag system of claim 1, wherein the sensor is a photoelectric sensor.

10. The foam-in-bag system of claim 1, wherein the foam precursor comprises a plurality of foam precursor chemicals, which, when mixed, react and expand to form foam.

11. The foam-in-bag system of claim 1, wherein:
the foam-in-bag device includes a sealer that seals together the film webs to form the foam-in-bag bags; and
the sensor is located downstream of the dispenser, the cutter, and the sealer.

12. The foam-in-bag system of claim 1, wherein the bag feature is a leading edge of the bag.

13. The foam-in-bag system of claim 1 further comprising:

a spill prevention system, comprising a second sensor that detects whether a film web is present on at least one lateral side of the dispensing outlet at the longitudinal location;

wherein, based on determining that the second sensor has not detected the film web on the at least one lateral side at the longitudinal location, the spill prevention system causes the dispenser assembly to preclude initiation of or discontinue distribution of the foam precursor.

14. The foam-in-bag system of claim 13, wherein the at least one side comprises two sides of the dispensing outlet and the second sensor detects whether the dispenser outlet is positioned between the pair of film webs.

15. The foam-in-bag system of claim 13, wherein:
a first side of dispensing outlet is relatively unobstructed to a user compared to a second side; and
the at least one side of the dispensing outlet includes the second side.

16. The foam-in-bag system of claim 15, wherein:
the foam-in-bag system includes a control panel, which a user can use to control operation of the foam-in-bag device; and
the first side of the dispensing outlet is located closer to the control panel relative to the second side.

17. The foam-in-bag system of claim 15, further comprising a controller that a user can use to control operation of the foam-in-bag device.

18. A foam-in-bag system, comprising:
a foam-in-bag device that forms a plurality of foam-in-bag bags from opposing film webs of film material, the foam-in-bag device including:
  a foam precursor dispenser that distributes a foam precursor between the film webs; and
  a drive assembly that drives the film webs past the outlet to receive the precursor;
  a cutter that cuts the film webs to form the plurality of bags; and
a monitoring system comprising a bag sensor that detects whether the film material is present, and a drive sensor that detects a parameter of the drive assembly, the monitoring assembly being configured to:
  determine, based on the detected parameter, a predetermined period,
  determine whether the bag sensor detects that the film material is present within the predetermined period, and
  cause the foam-in-bag device to preclude initiation or discontinue distribution of the foam precursor based on the monitoring system determining that the film material was not detected during the predetermined period;
wherein the drive assembly is located upstream of the sensor, and the bag is downwardly biased from the drive assembly towards the bag sensor due to gravity, such that in response to the cutter cutting the film webs, a foam filled bag falls away from a lower edge of the film webs.

19. The foam-in-bag system of claim 18, wherein the predetermined period is a predetermined period of time from a predetermined moment.

20. The foam-in-bag system of claim 18, wherein the predetermined period is a distance traveled by the film material from a predetermined position.

21. The foam-in-bag system of claim 18, wherein the parameter includes a speed of the drive assembly.

22. The foam-in-bag system of claim 18, wherein the parameter includes rotational speed of the sensed parameter of the drive assembly.

23. The foam-in-bag system of claim 18, wherein the drive sensor comprises a motor encoder.

24. The foam-in-bag system of claim 18, wherein the bag sensor is a photoelectric sensor.

25. The foam-in-bag system of claim 18, further comprising a controller that a user can use to control operation of the foam-in-bag device.

26. The foam-in-bag system of claim 19, wherein the sensor detects the presence of the bags by detecting the leading edge of the bags.

27. The foam-in-bag system of claim 19, further comprising a cutter comprising heated wires that cut the film webs to form the plurality of bags, wherein the sensor is located adjacent the cutter.

28. The foam-in-bag system of claim 19, further comprising a cutter comprising heated wires that cut the film webs to form the plurality of bags, wherein the sensor is located downstream of the cutter.

* * * * *